(12) United States Patent
Bramlet et al.

(10) Patent No.: US 11,514,806 B2
(45) Date of Patent: Nov. 29, 2022

(54) LEARNING SESSION COMPREHENSION

(71) Applicant: Enduvo, Inc., Peoria, IL (US)

(72) Inventors: Matthew Bramlet, Peoria, IL (US); Justin Douglas Drawz, Chicago, IL (US); Steven J. Garrou, Wilmette, IL (US); Joseph Thomas Tieu, Tulsa, OK (US); Gary W. Grube, Barrington Hills, IL (US)

(73) Assignee: Enduvo, Inc., Peoria, IL (US)

( * ) Notice: Subject to any disclaimer, the term of this patent is extended or adjusted under 35 U.S.C. 154(b) by 193 days.

(21) Appl. No.: 16/927,595

(22) Filed: Jul. 13, 2020

(65) Prior Publication Data

US 2020/0388183 A1  Dec. 10, 2020

Related U.S. Application Data

(63) Continuation-in-part of application No. 16/888,928, filed on Jun. 1, 2020.

(60) Provisional application No. 62/858,647, filed on Jun. 7, 2019.

(51) Int. Cl.
*G09B 7/00* (2006.01)
*G09B 7/02* (2006.01)
*G09B 7/06* (2006.01)

(52) U.S. Cl.
CPC .............. *G09B 7/00* (2013.01); *G09B 7/02* (2013.01); *G09B 7/06* (2013.01)

(58) Field of Classification Search
CPC ... G09B 7/00; G09B 7/02; G09B 7/06; G09B 7/04; G09B 7/08
See application file for complete search history.

(56) References Cited

U.S. PATENT DOCUMENTS

| | | | |
|---|---|---|---|
| 6,288,753 | B1 | 9/2001 | Denicola |
| 7,733,366 | B2 | 6/2010 | Beavers |
| 8,682,241 | B2 | 3/2014 | Huerta |
| 9,179,100 | B2 | 11/2015 | Guo |
| 10,629,083 | B1 * | 4/2020 | Higgins ................. G09B 19/00 |
| 2010/0138369 | A1 * | 6/2010 | Ando ....................... G09B 7/02 706/12 |
| 2011/0123972 | A1 | 5/2011 | Friedman |
| 2011/0165542 | A1 * | 7/2011 | Campbell ................ G09B 5/00 434/219 |
| 2012/0251992 | A1 | 10/2012 | Huerta |
| 2013/0314421 | A1 | 11/2013 | Kim |

(Continued)

*Primary Examiner* — Eddy Saint-Vil
(74) *Attorney, Agent, or Firm* — Gary W. Grube

(57) ABSTRACT

A method for improving learning comprehension regarding a lesson includes issuing a first learning illustrative model to a set of learner computing entities. The method further includes obtaining a first comprehension evaluation associated with a first learner computing entity for the first learning illustrative model. The method further includes obtaining a second comprehension evaluation associated with a second learner computing entity for the first learning illustrative model. The method further includes modifying the fundamental illustrative model to illustrate a second set of learning assets of a second learning object based on at least one of the first and second comprehension evaluations to produce a second learning illustrative model. The method further includes sending the second learning illustrative model to the set of learner computing entities.

12 Claims, 64 Drawing Sheets

(56) References Cited

U.S. PATENT DOCUMENTS

| | | | |
|---|---|---|---|
| 2014/0308647 A1* | 10/2014 | Shimata | G09B 7/00 434/362 |
| 2014/0335497 A1* | 11/2014 | Gal | G09B 7/00 434/323 |
| 2015/0206448 A1 | 7/2015 | Loudermilk | |
| 2018/0232567 A1 | 8/2018 | Dolsma | |

* cited by examiner

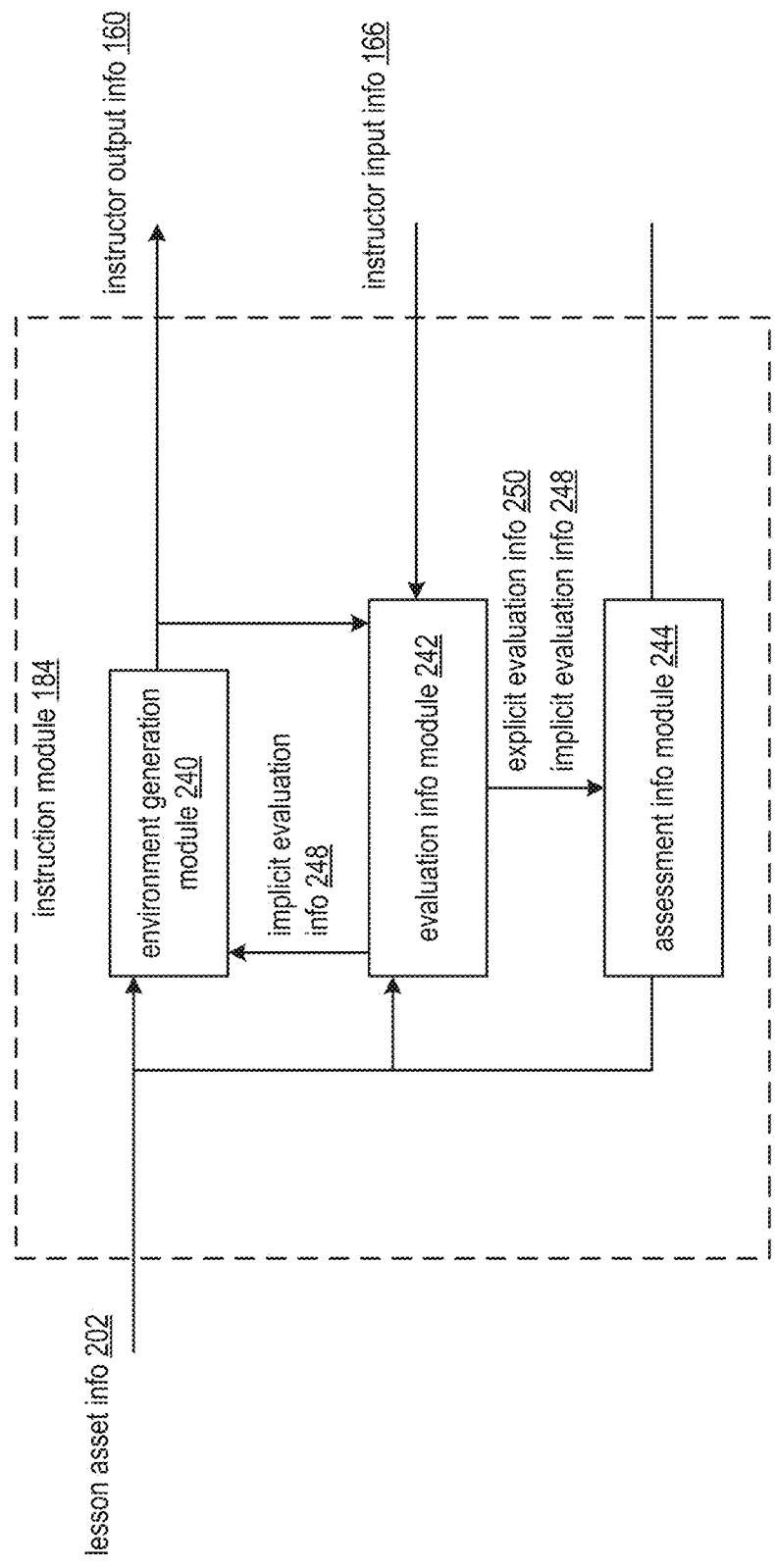

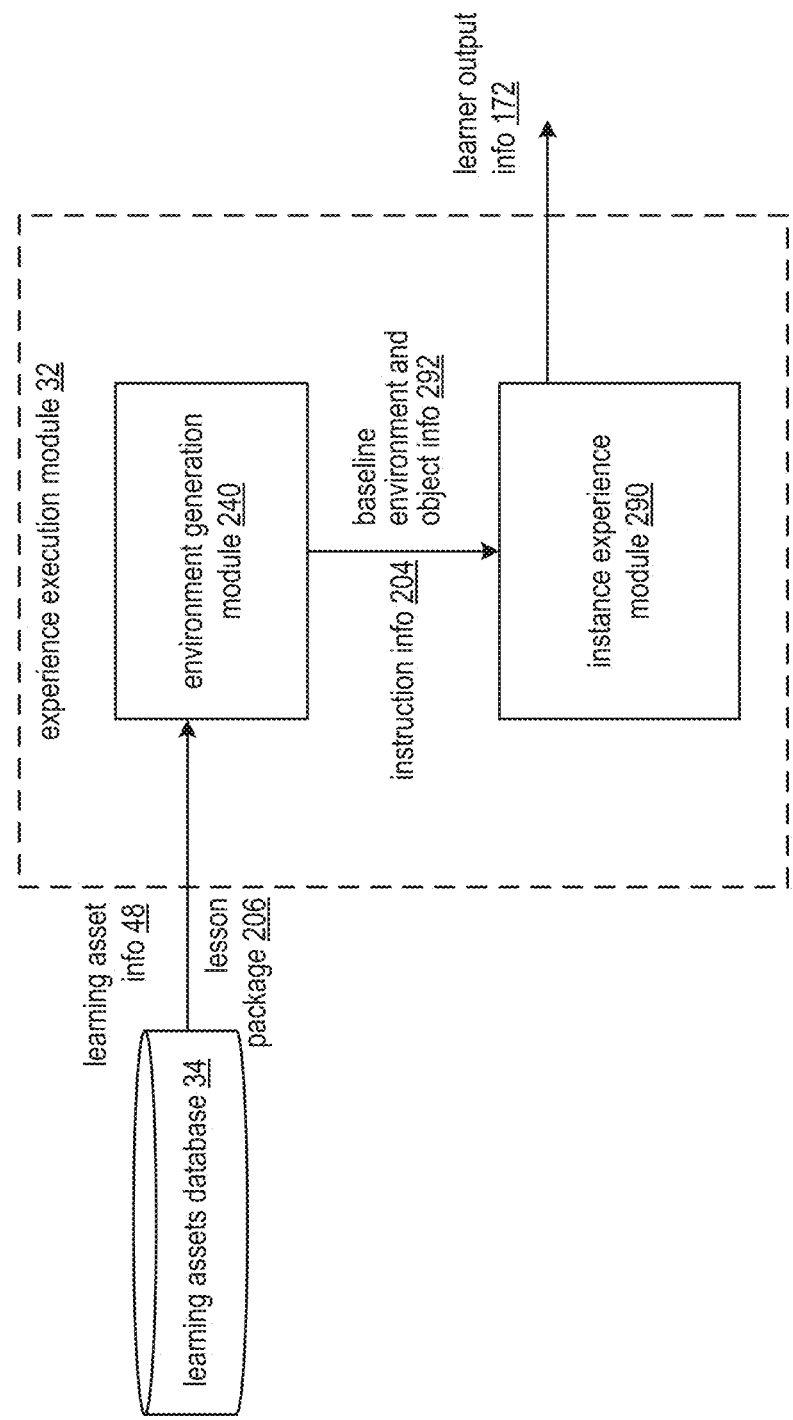

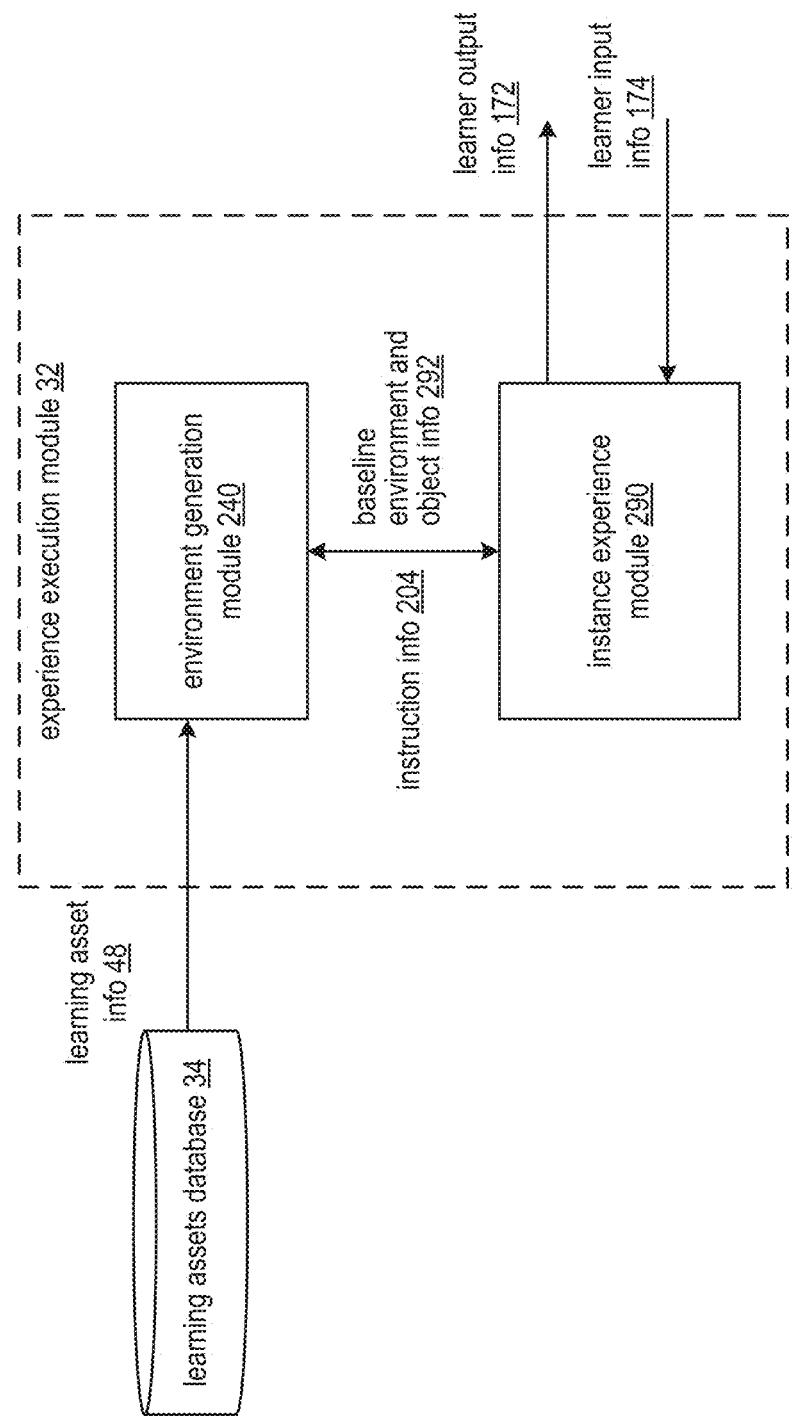

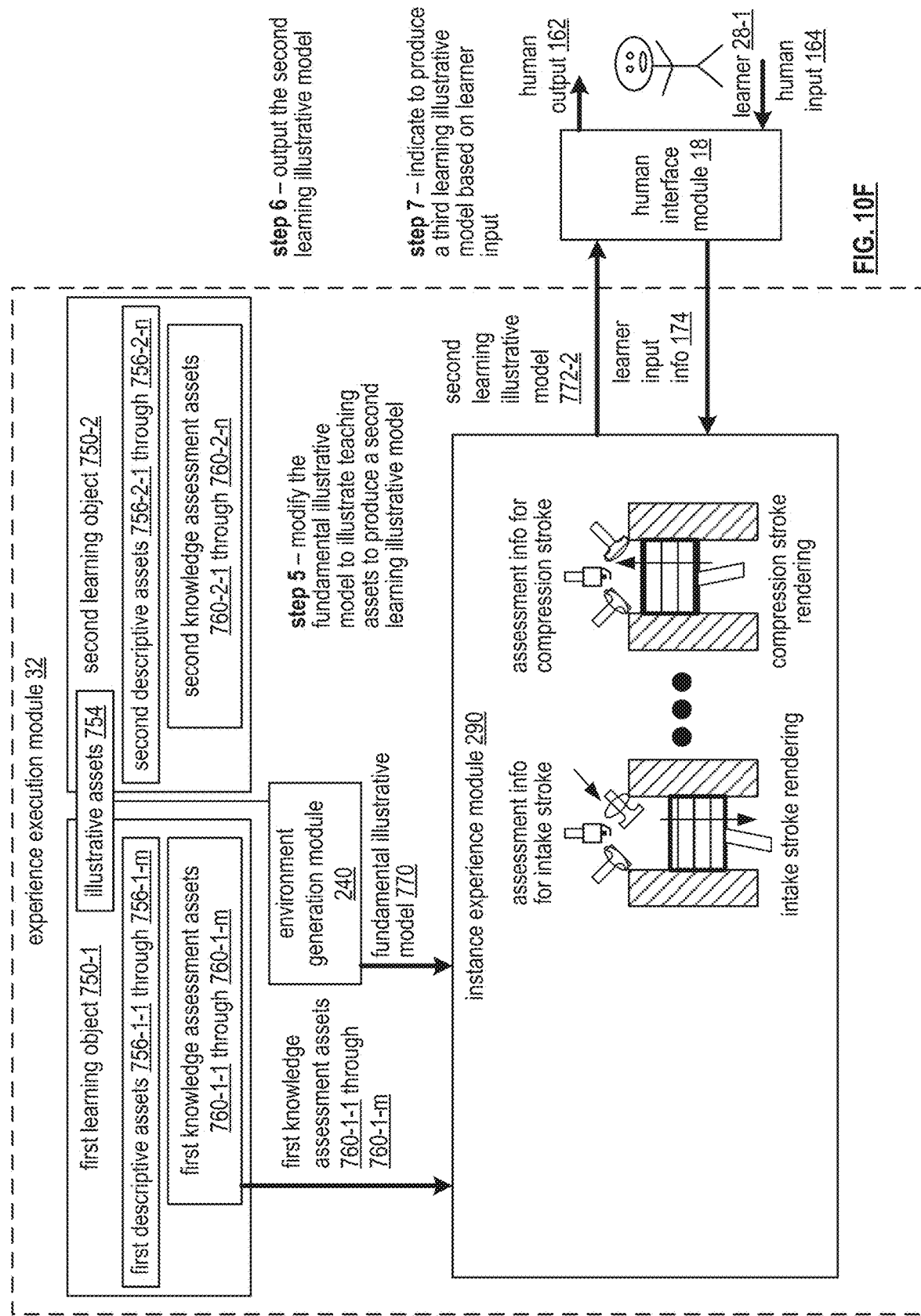

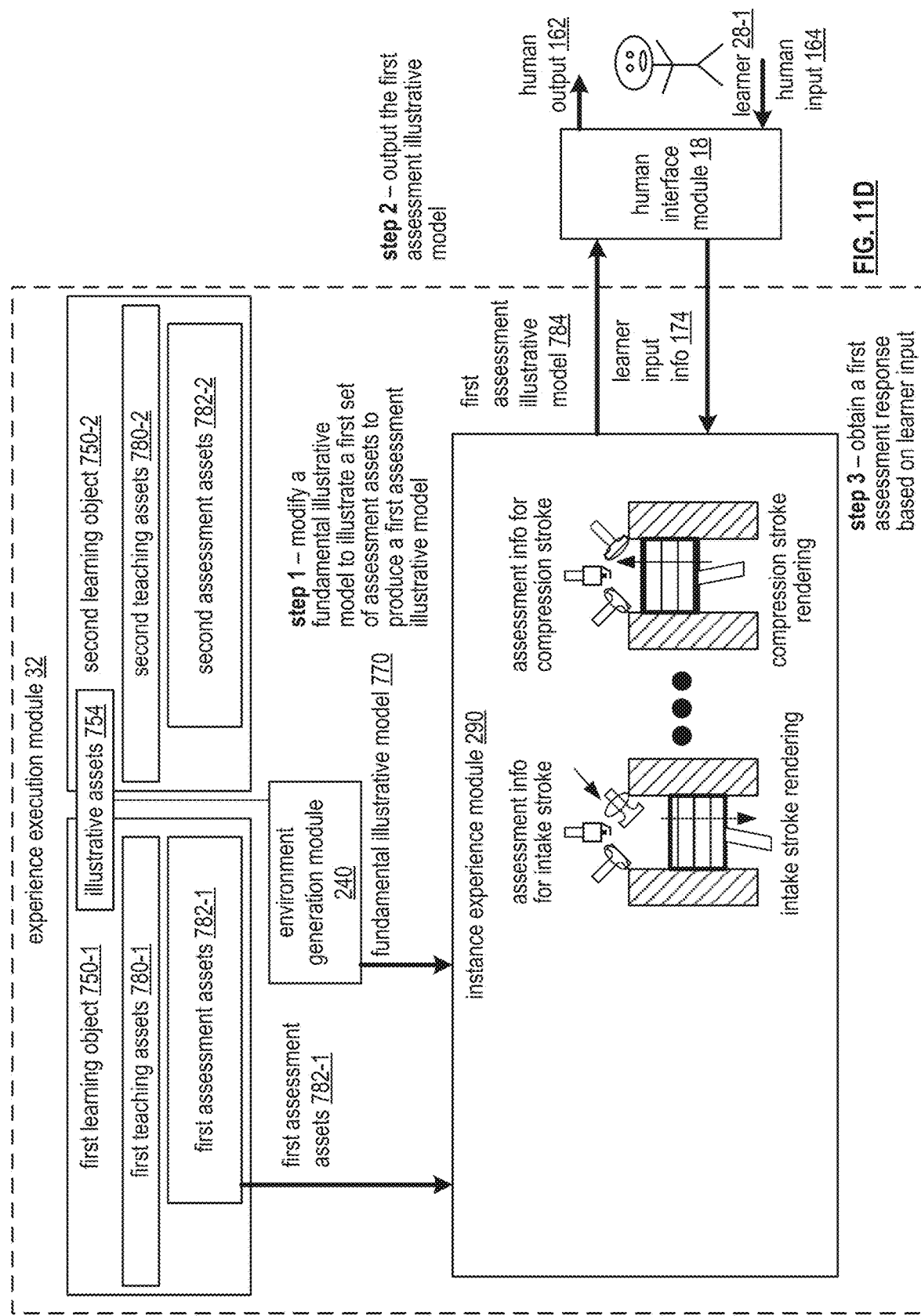

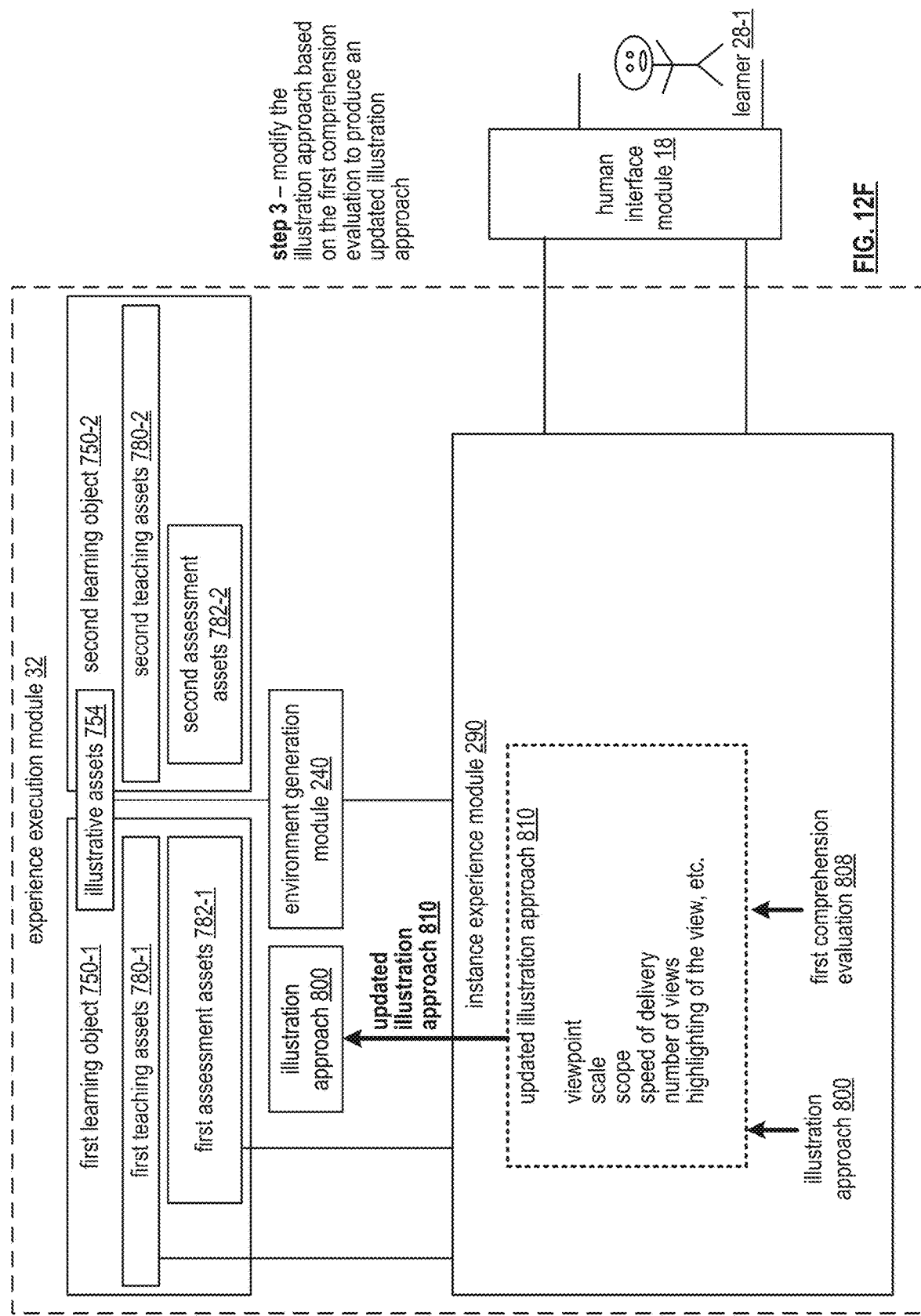

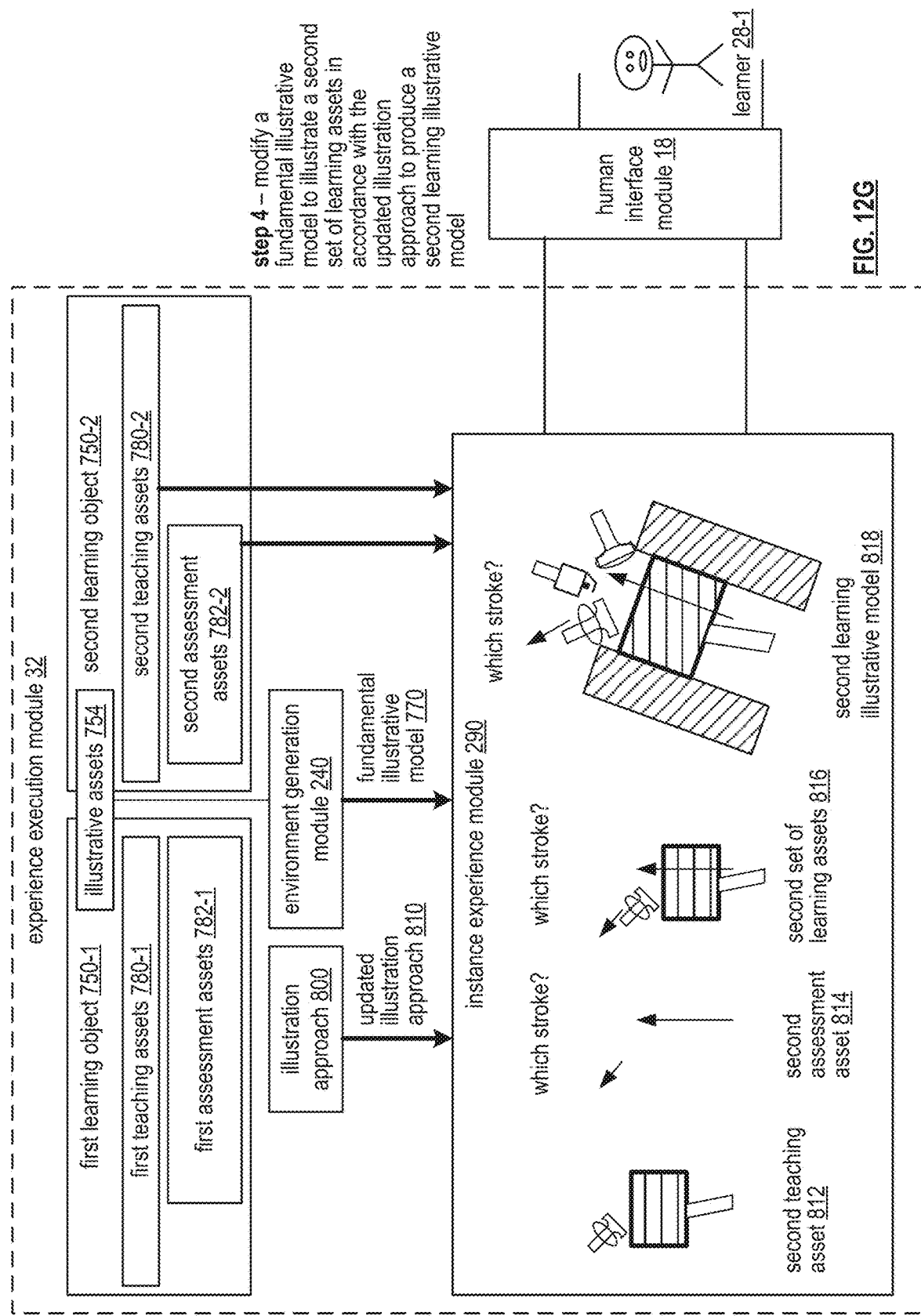

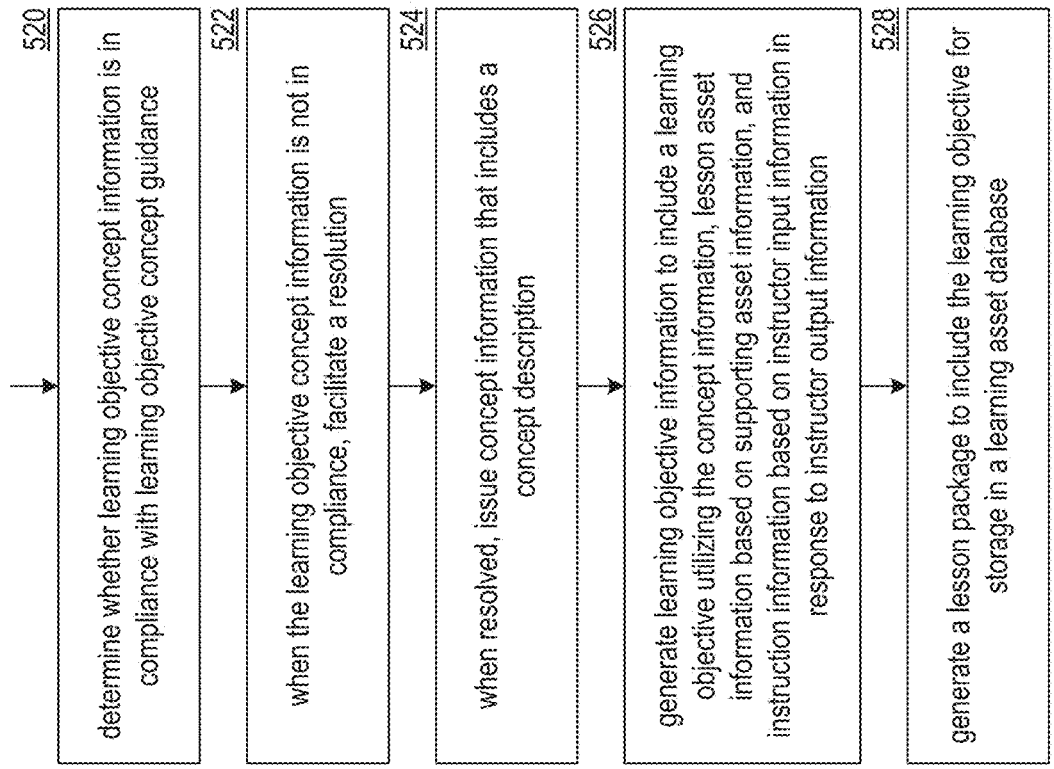

LEARNING SESSION COMPREHENSION

CROSS-REFERENCE TO RELATED APPLICATIONS

The present U.S. Utility Patent Application claims priority pursuant to 35 U.S.C. § 120 as a continuation in part of U.S. Utility application Ser. No. 16/888,928, entitled "ASSESSING LEARNING SESSION RETENTION UTILIZING A MULTI-DISCIPLINED LEARNING TOOL," filed Jun. 1, 2020, pending, which claims priority to U.S. Provisional Application No. 62/858,647, entitled "GENERATING AND EXECUTING A LEARNING EXPERIENCE," filed Jun. 7, 2019, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing educational, training, and entertainment content.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to facilitate education, training, and entertainment. Examples of visual content includes electronic books, reference materials, training manuals, classroom coursework, lecture notes, research papers, images, video clips, sensor data, reports, etc.

A variety of educational systems utilize educational tools and techniques. For example, an educator delivers educational content to students via an education tool of a recorded lecture that has built-in feedback prompts (e.g., questions, verification of viewing, etc.). The educator assess a degree of understanding of the educational content and/or overall competence level of a student from responses to the feedback prompts.

BRIEF DESCRIPTION OF THE SEVERAL VIEWS OF THE DRAWING(S)

Figure 9B:
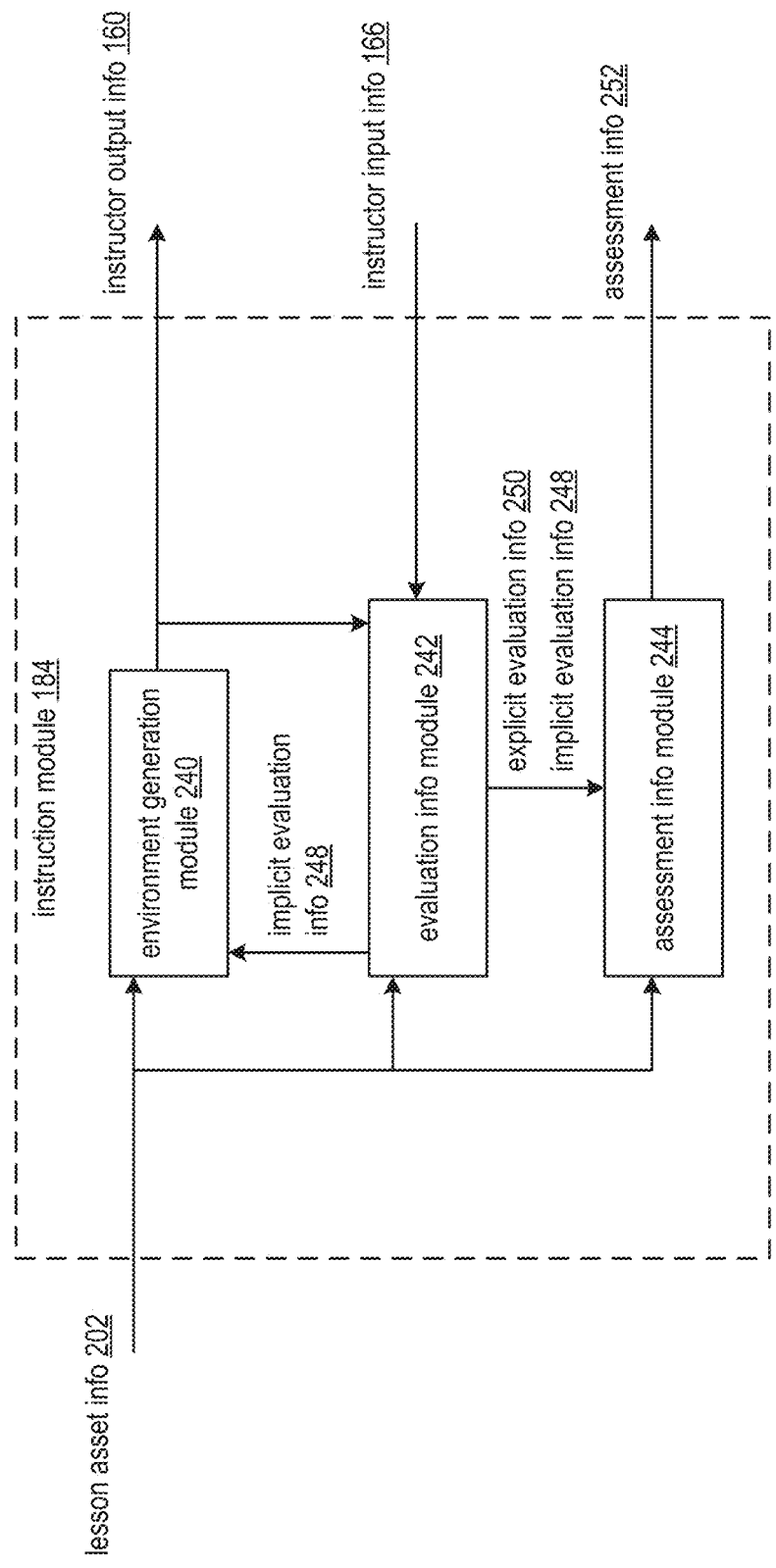
Figure 9C:
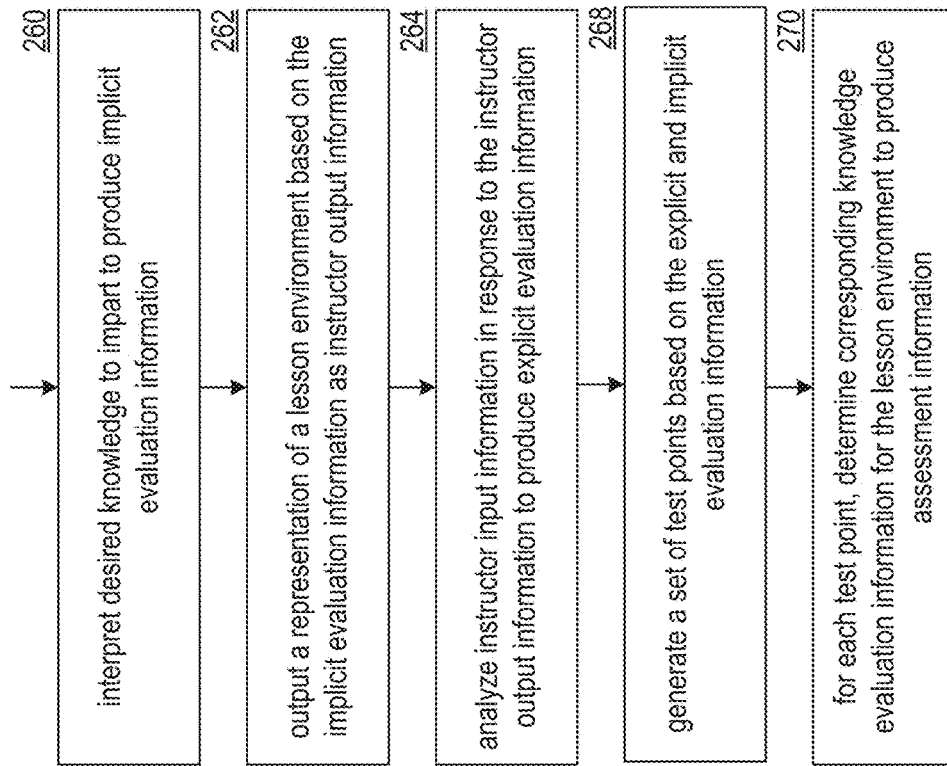
Figure 10C:
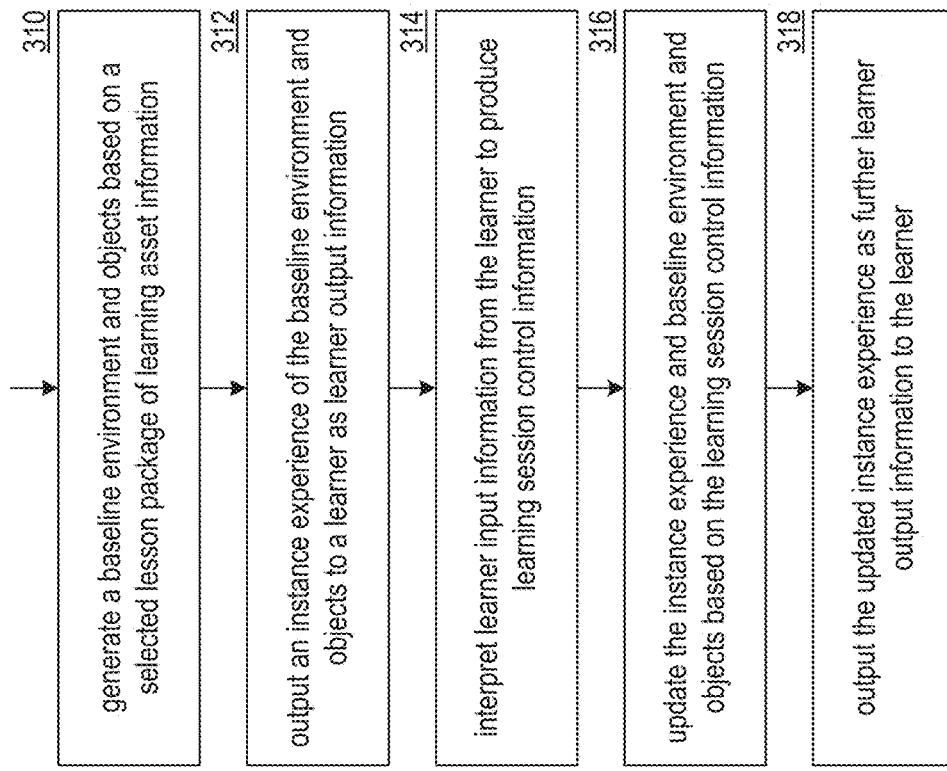
Figure 11A:
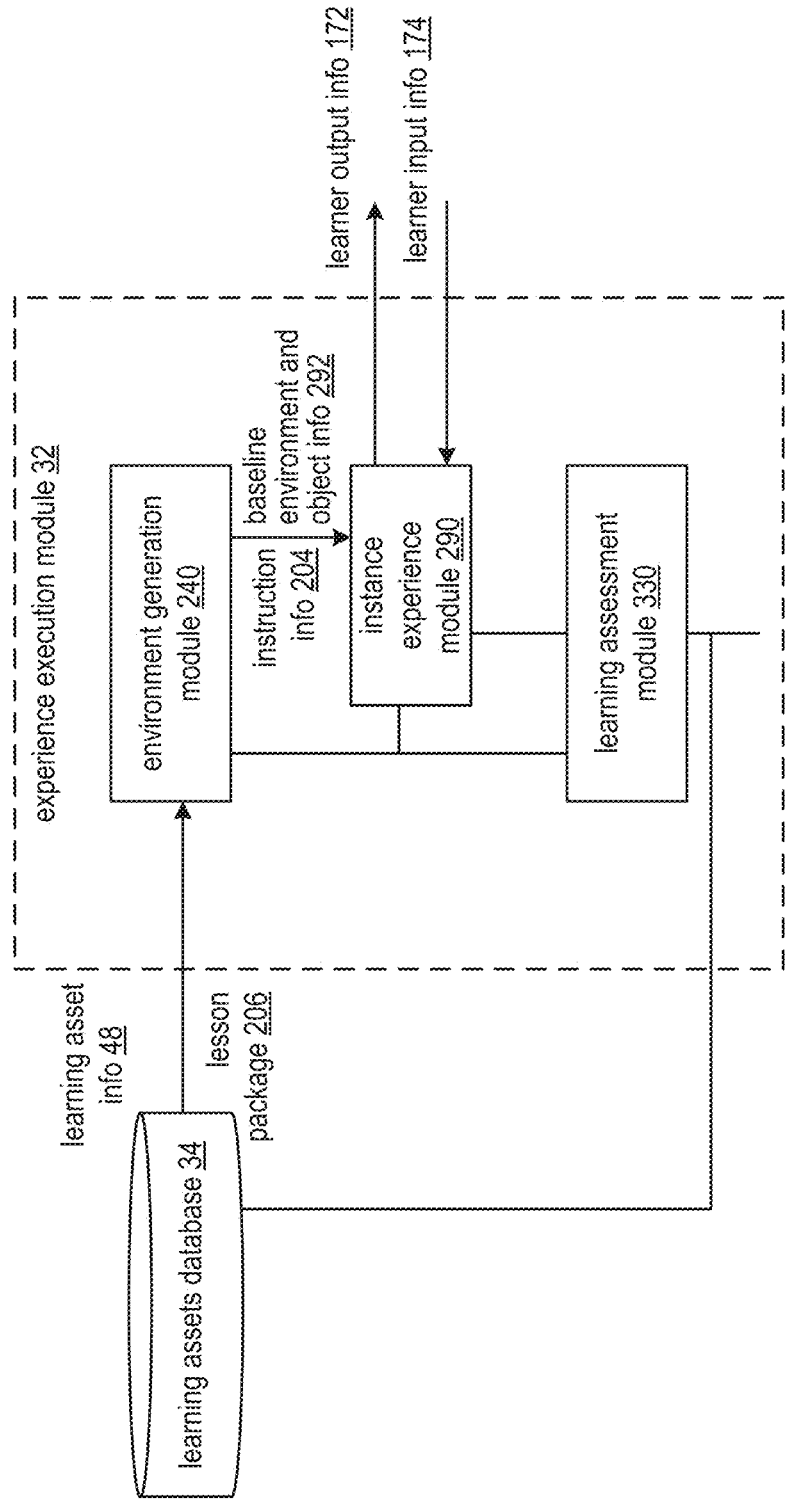
Figure 11B:
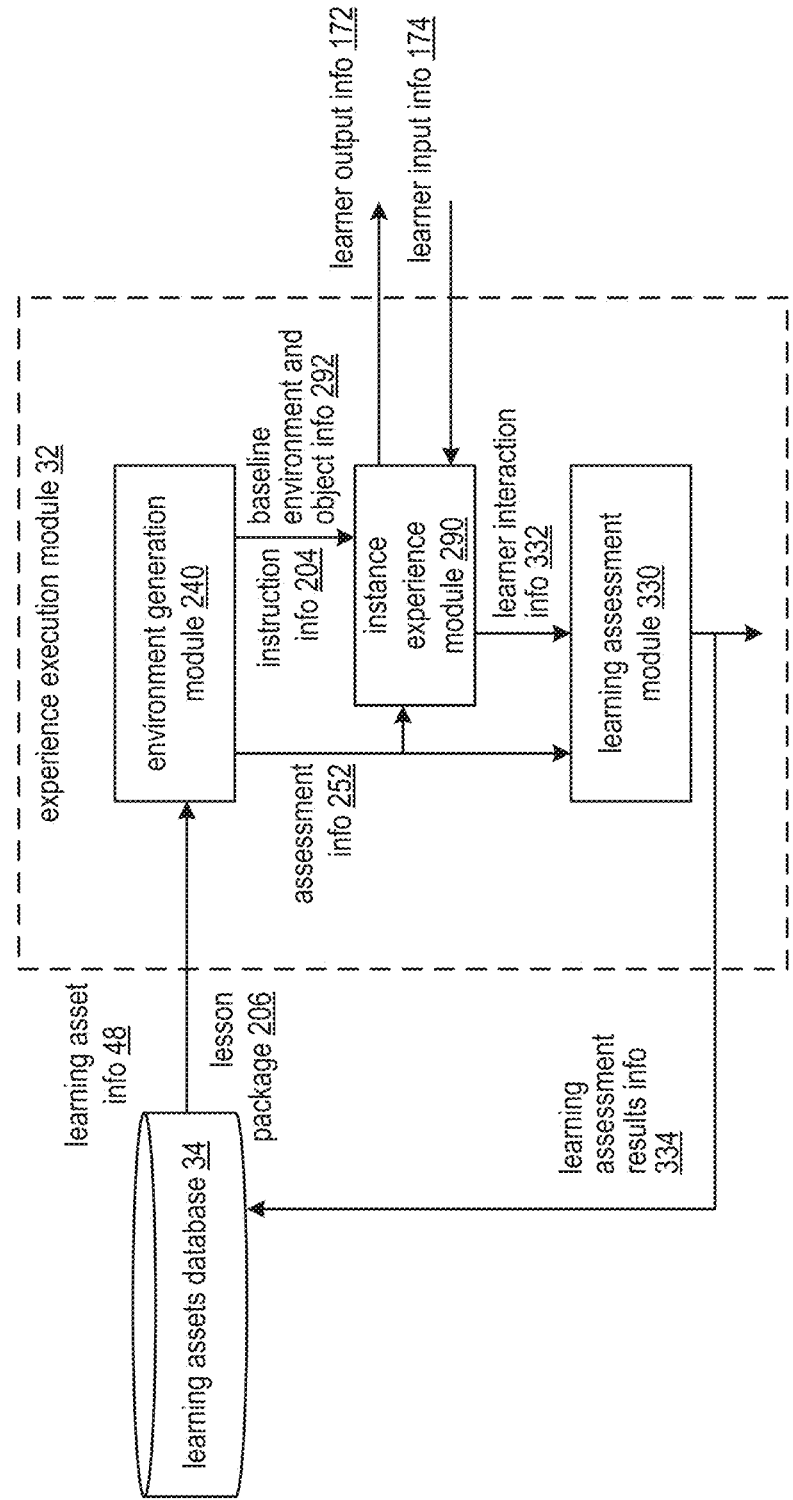
Figure 11C:
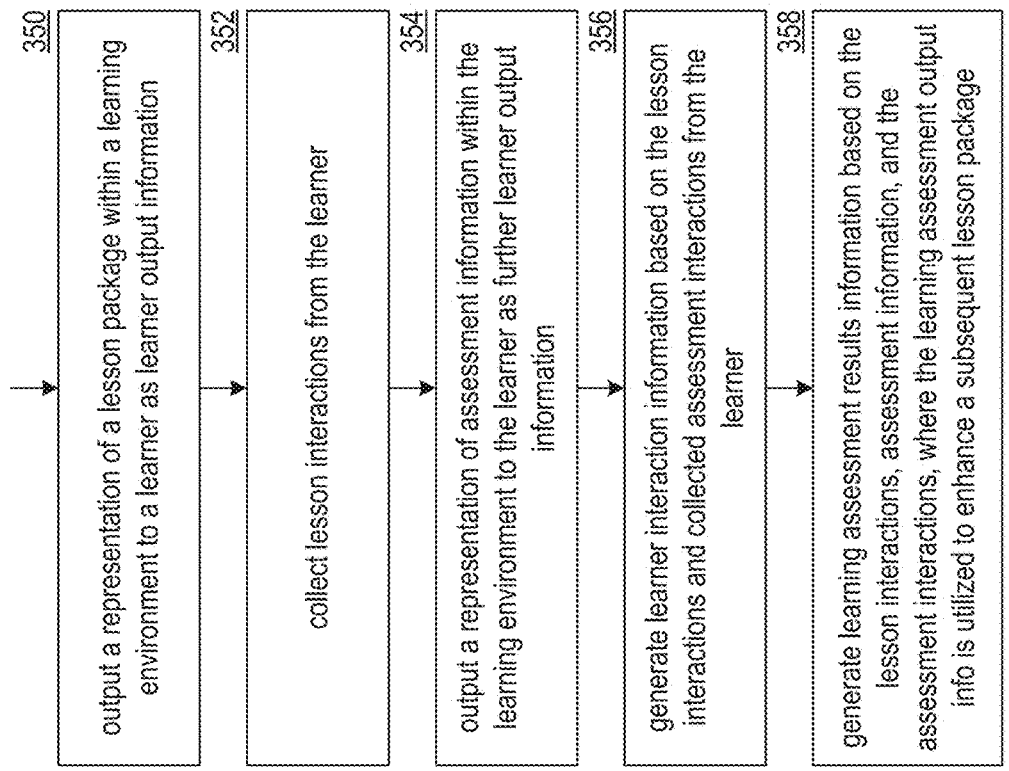
Figure 11E:
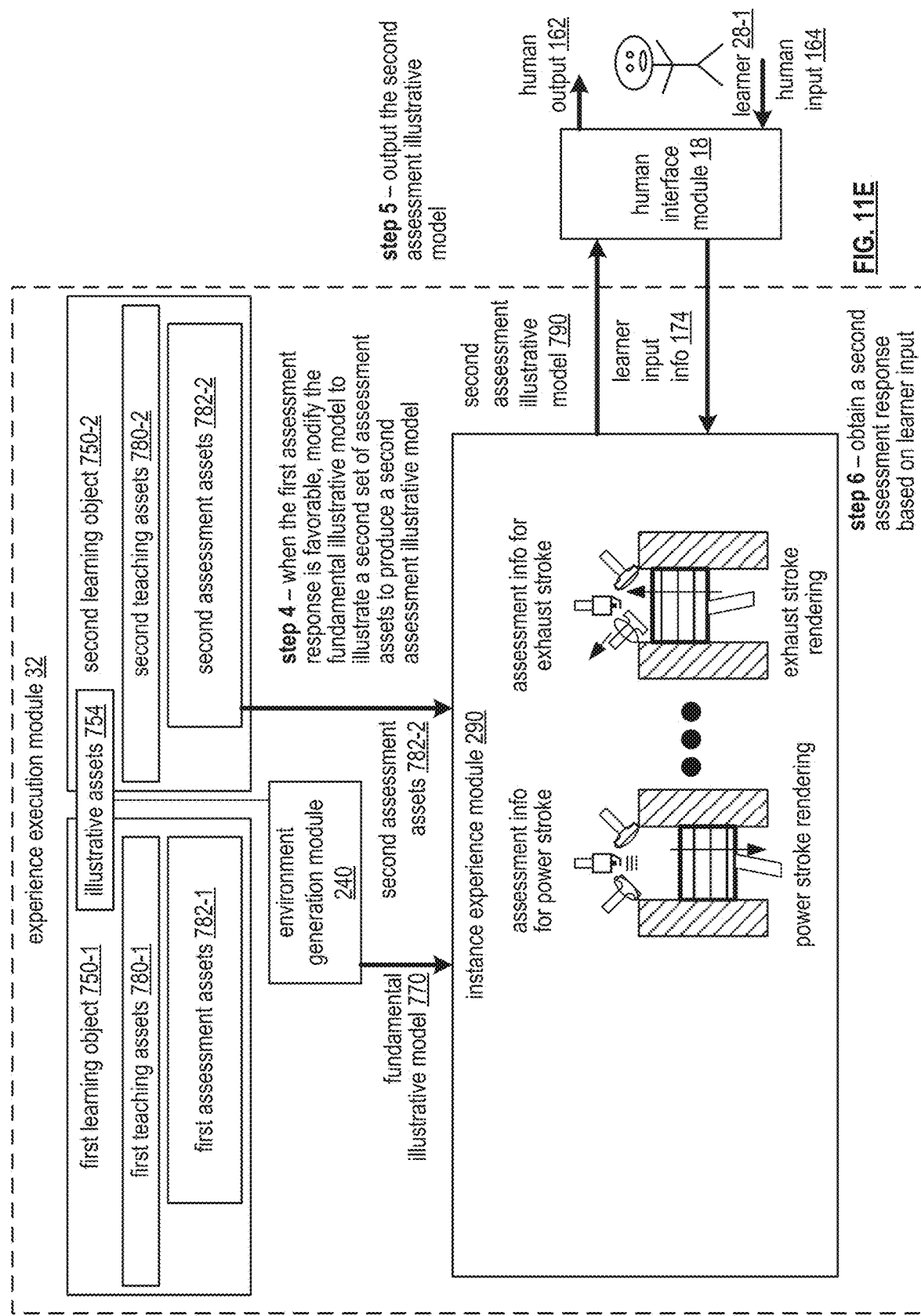
Figure 12A:
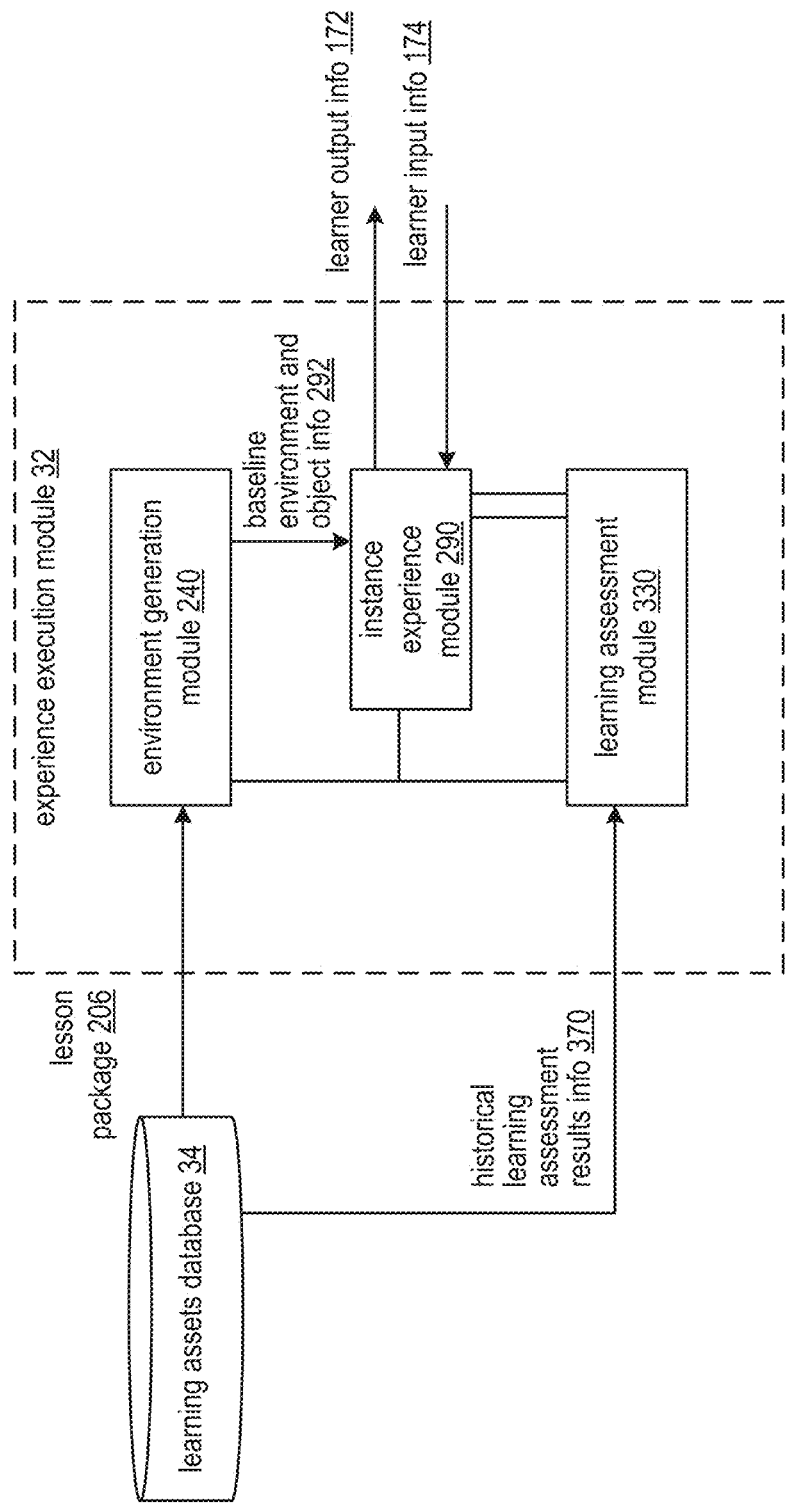
Figure 12B:
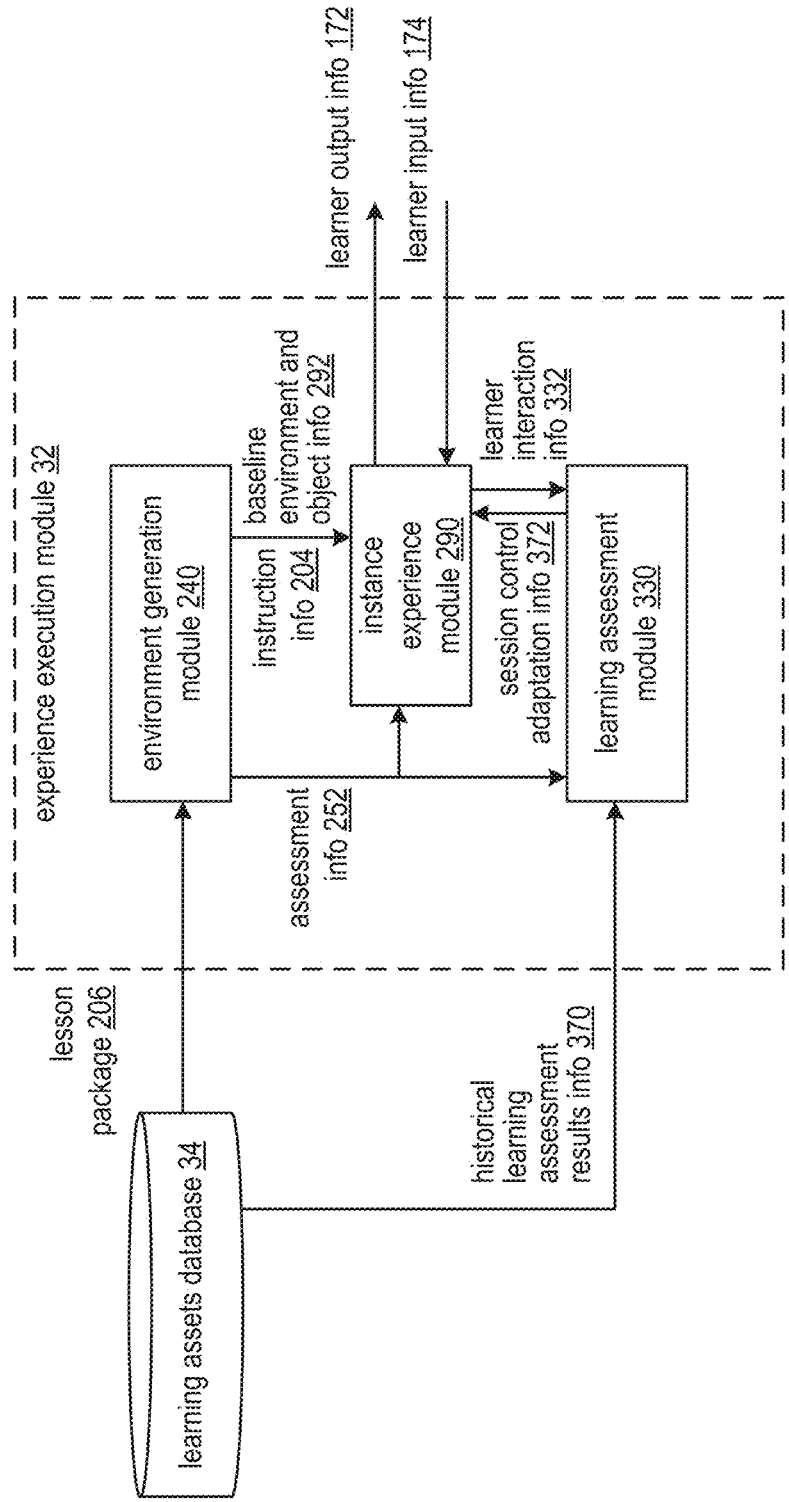
Figure 12C:
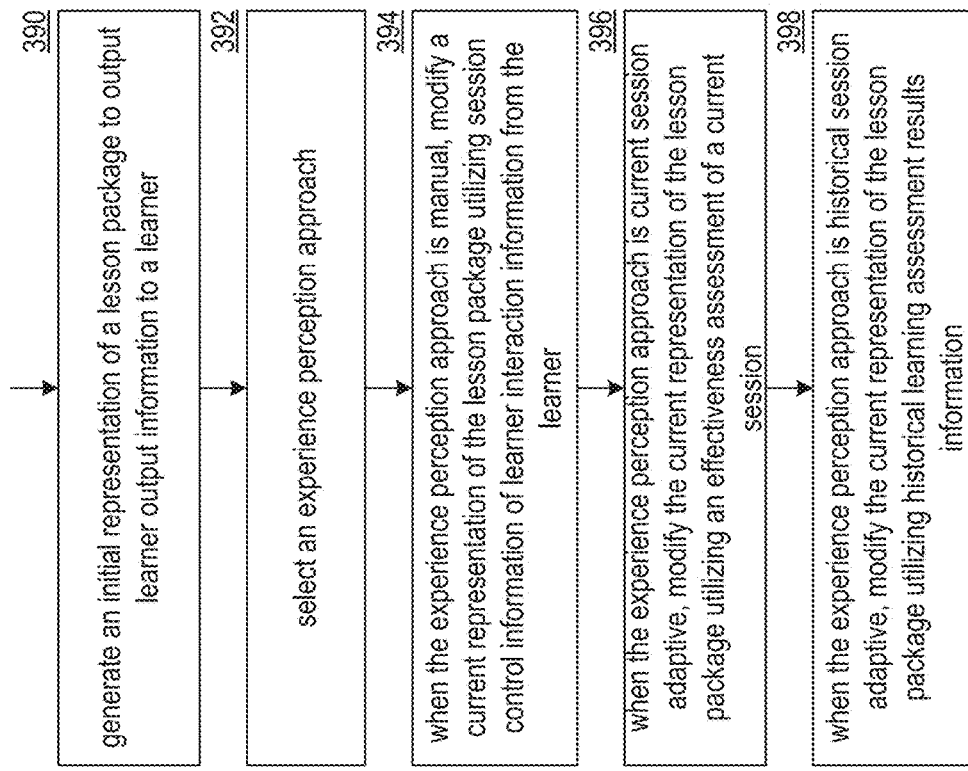
Figure 13A:
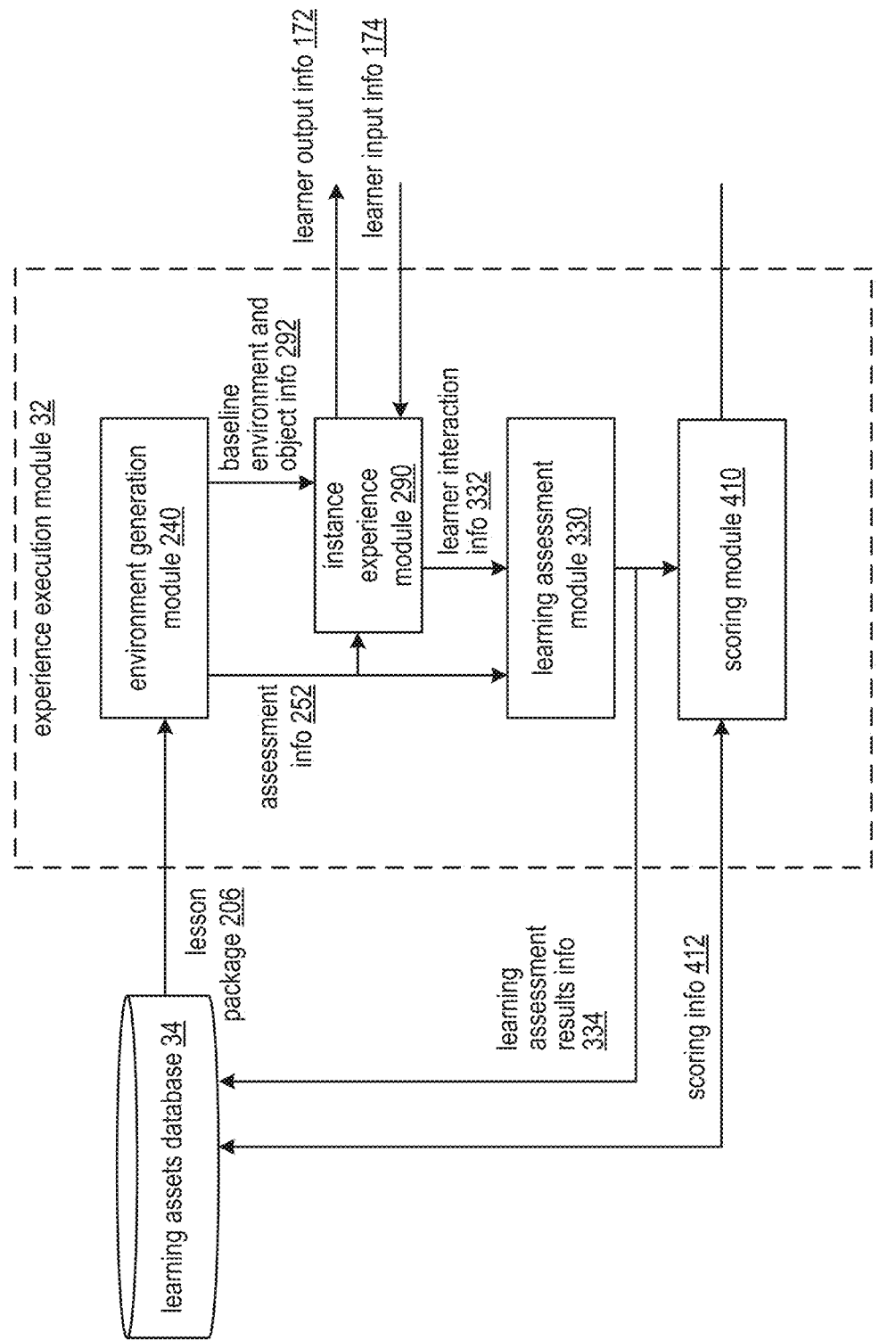
Figure 13B:
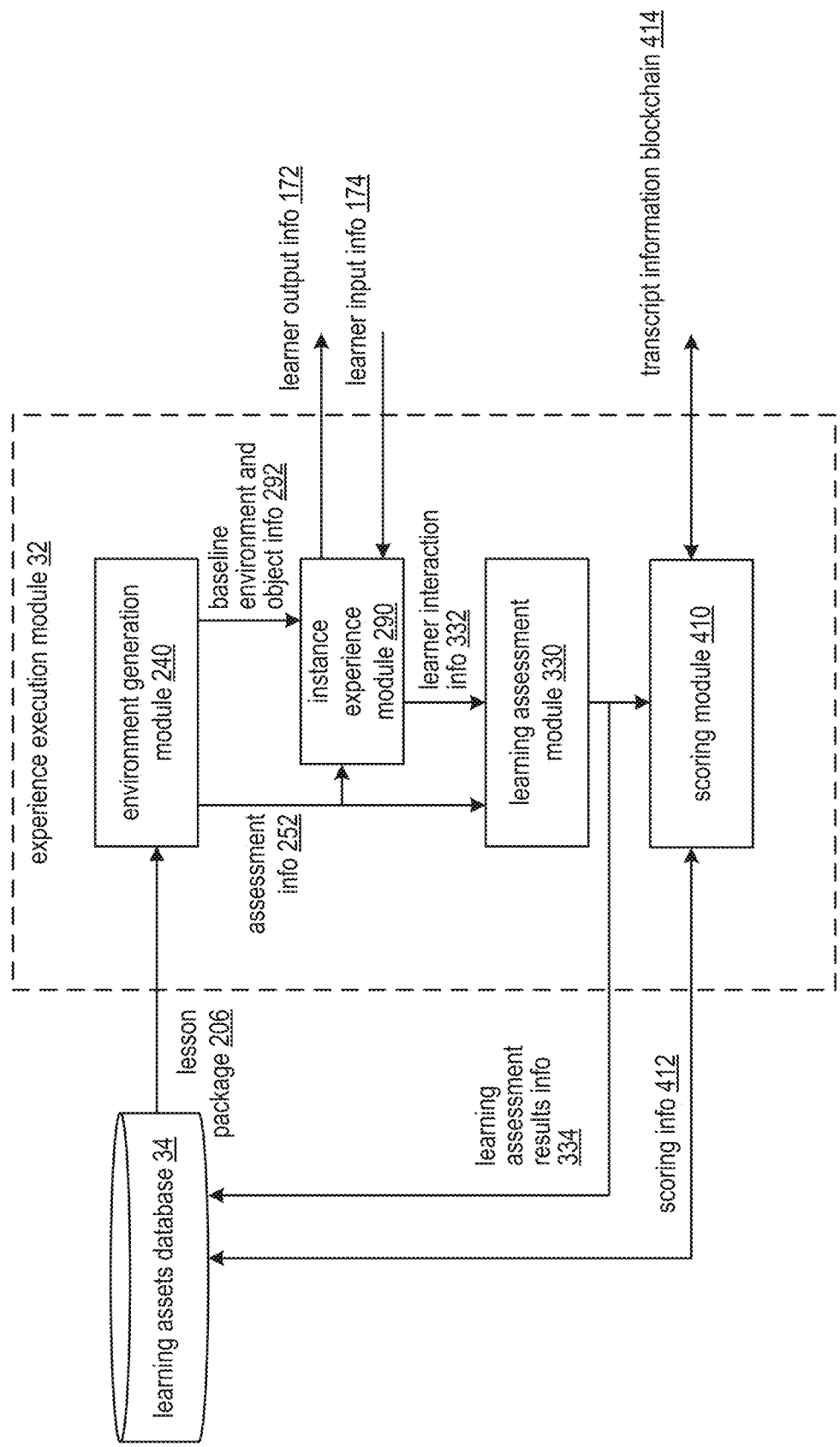
Figure 13C:
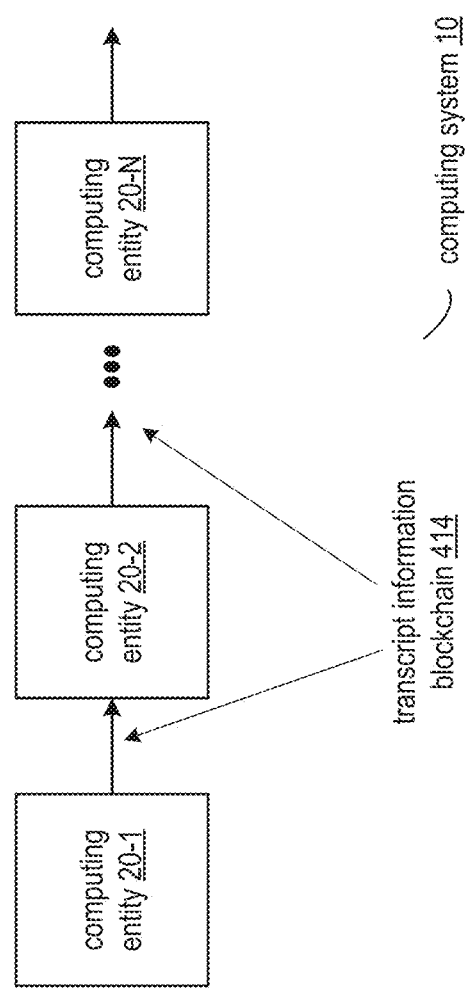
Figure 13D:
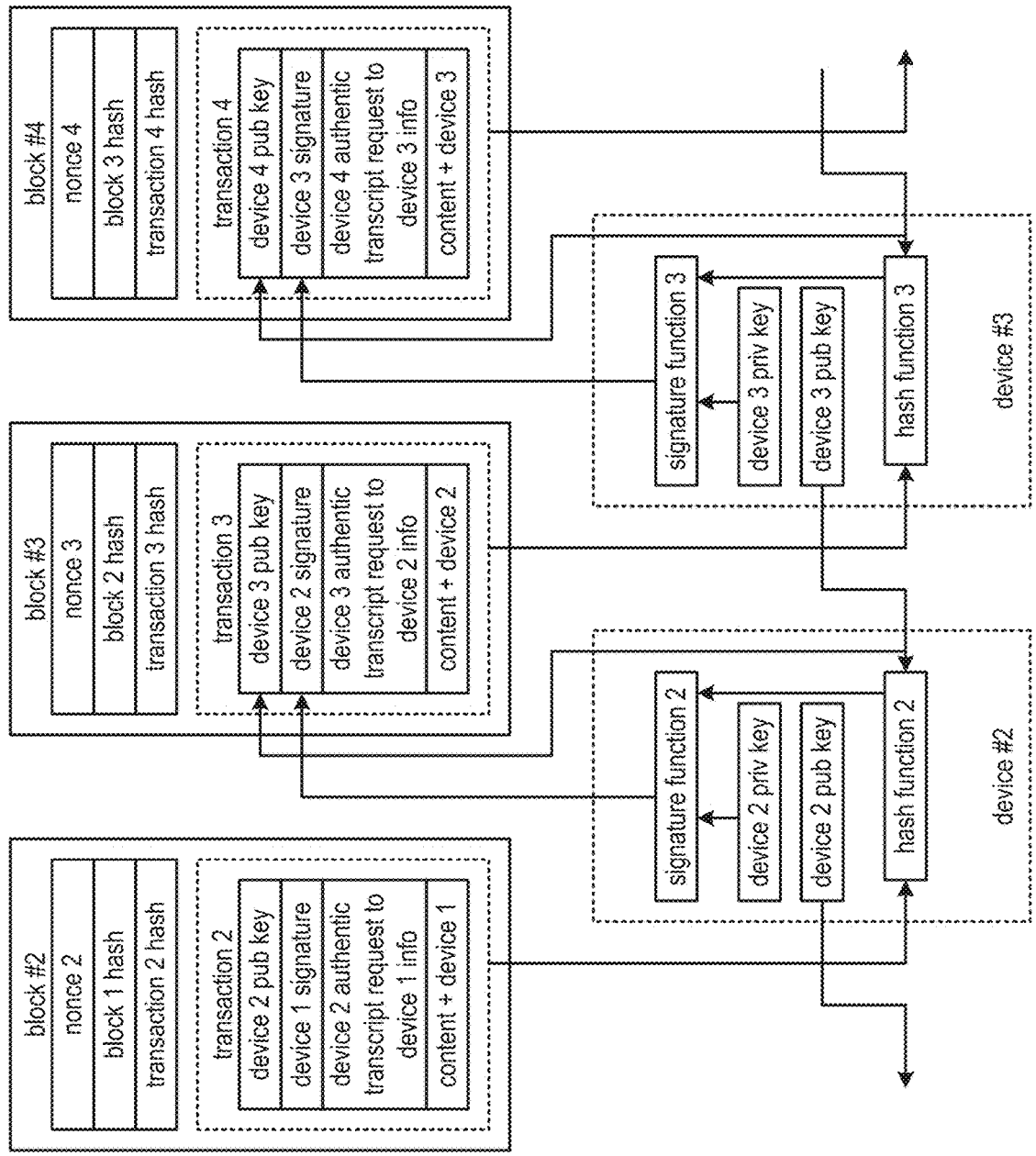
Figure 13E:
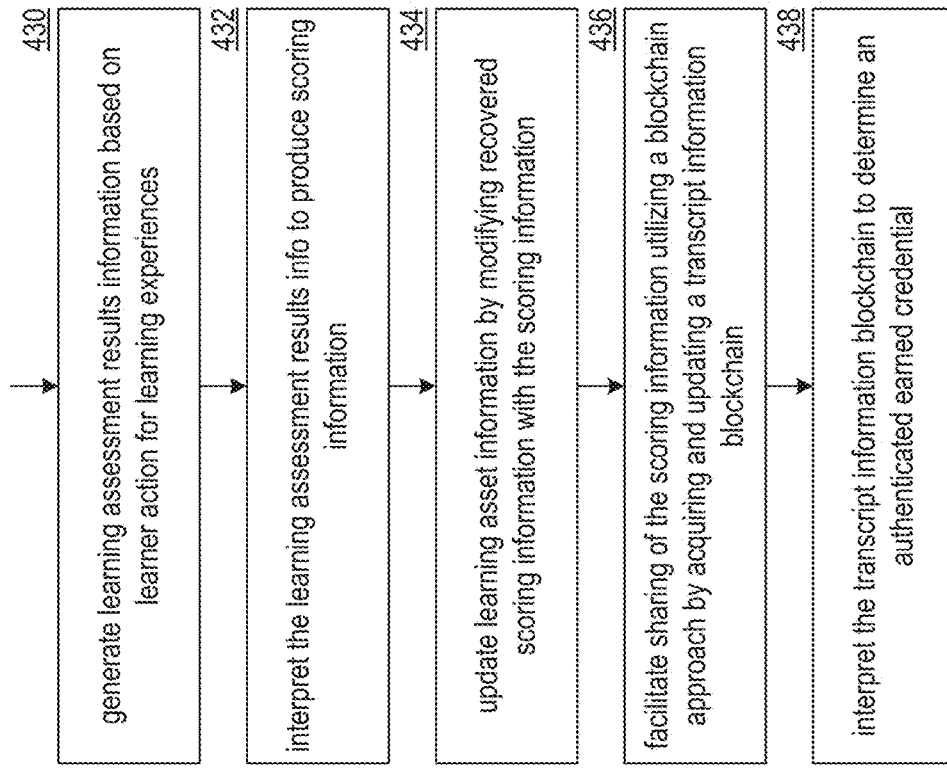
Figure 14A:
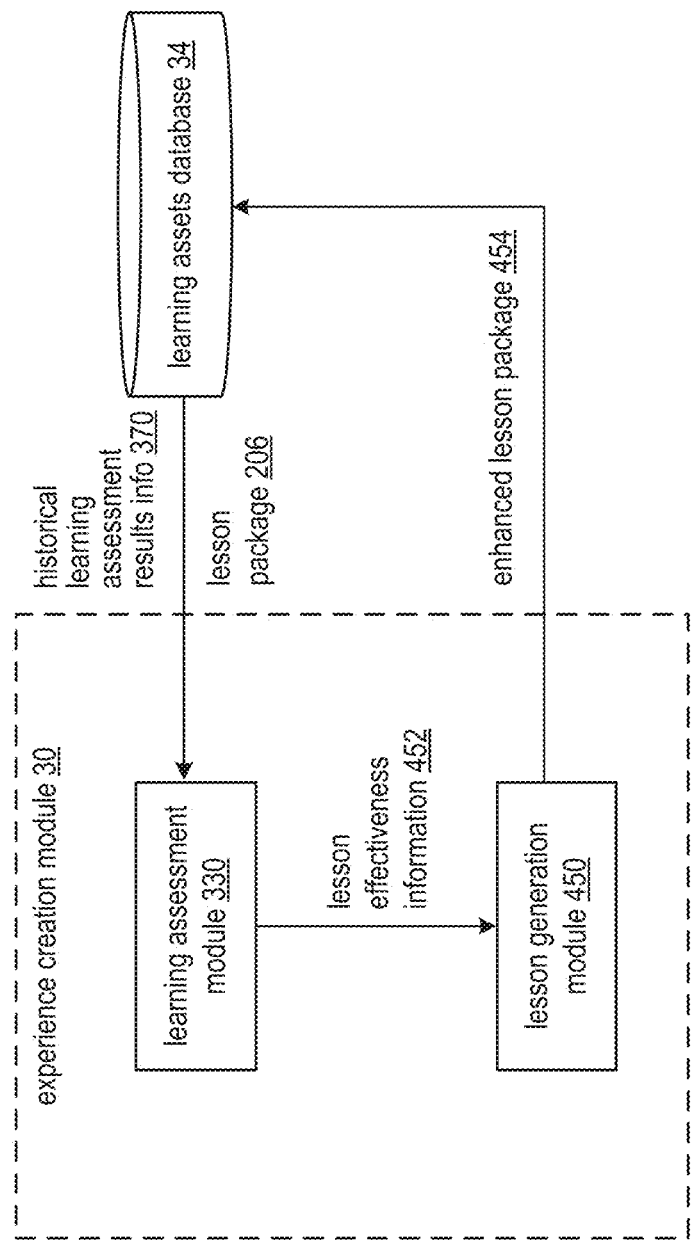
Figure 14B:
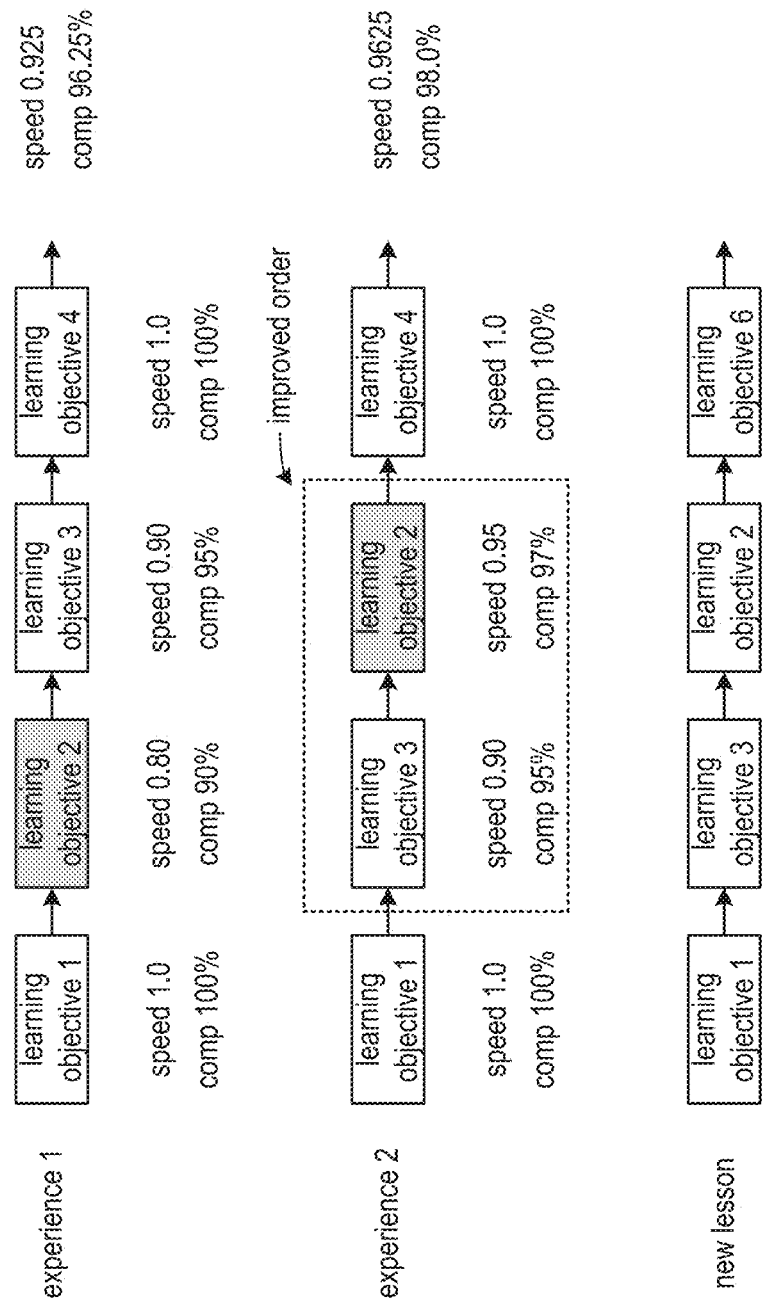
Figure 14C:
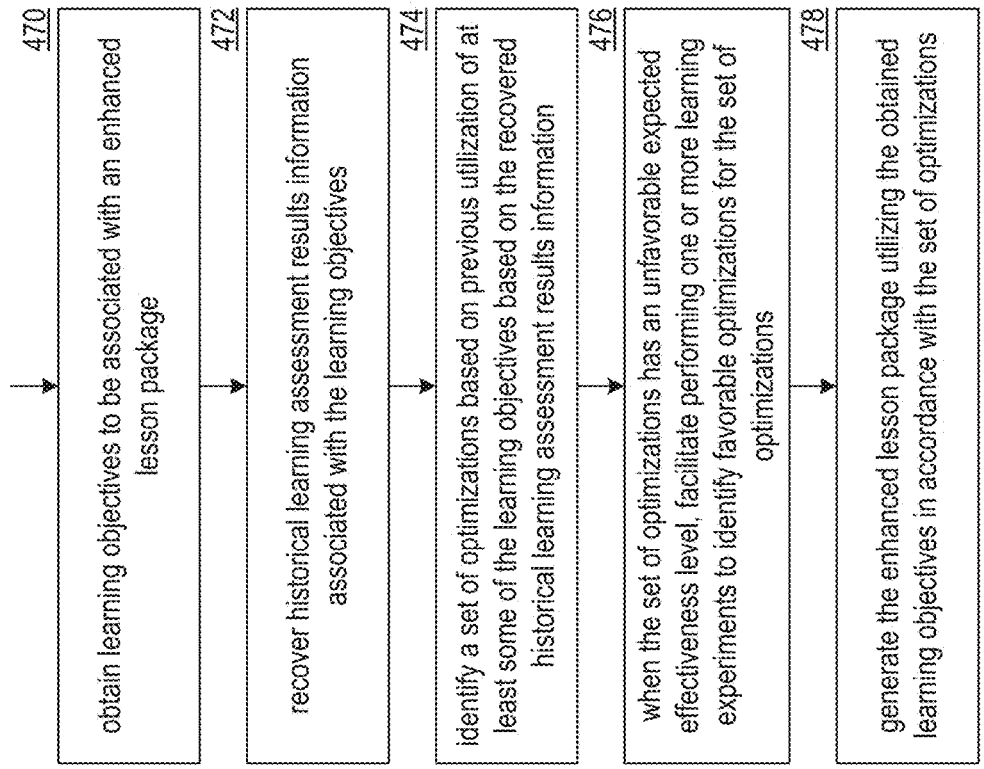
Figure 15A:
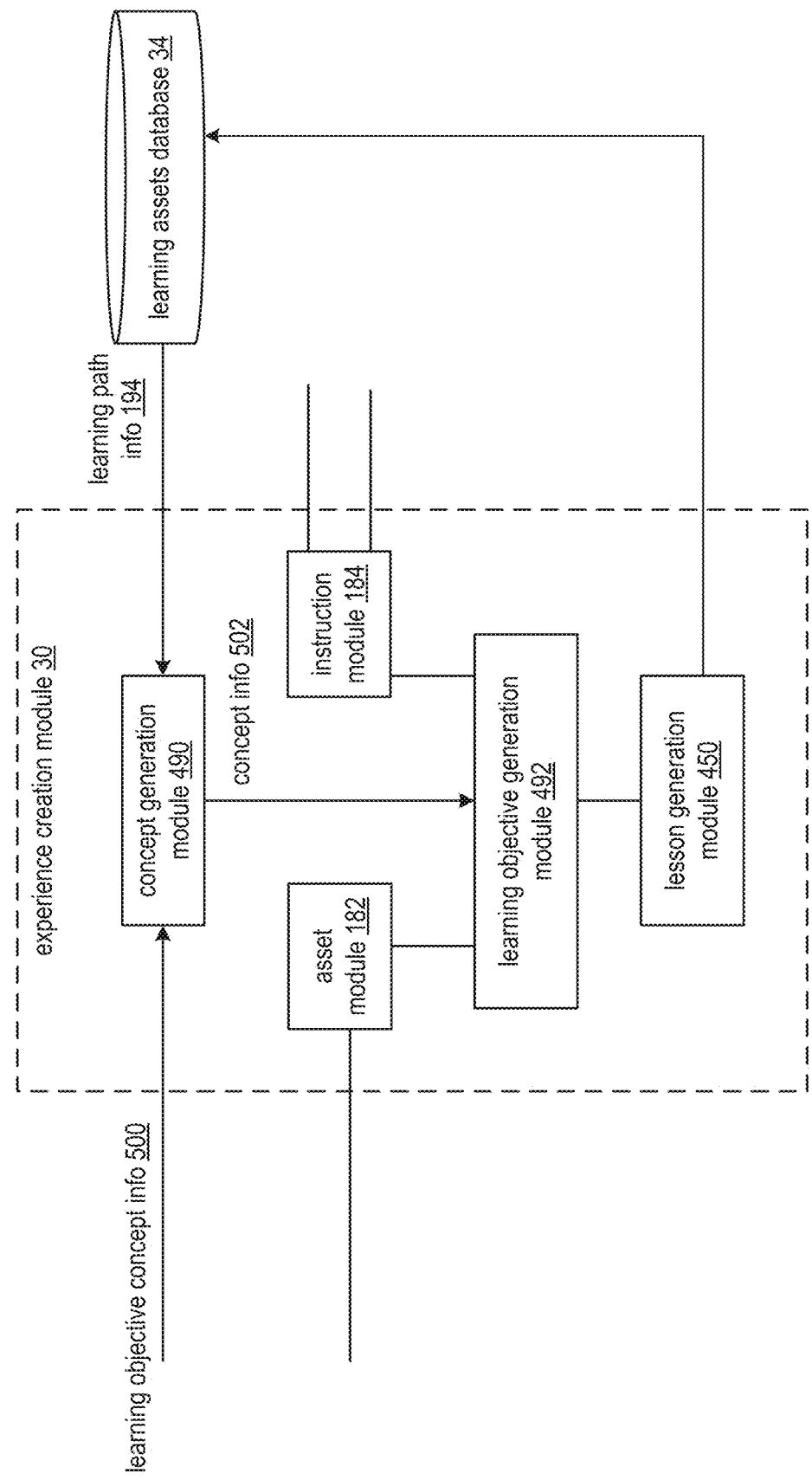
Figure 15B:
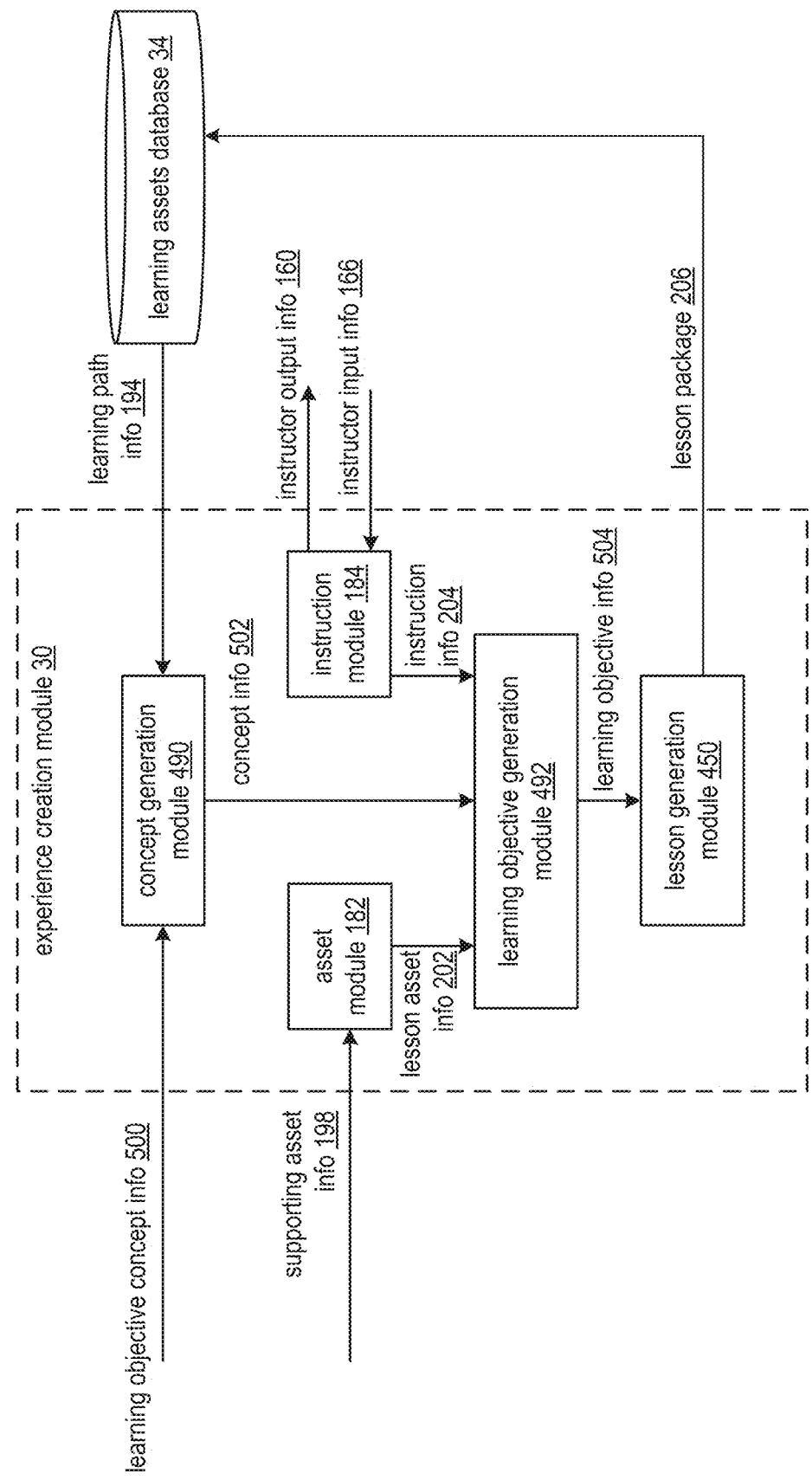
Figure 16A:
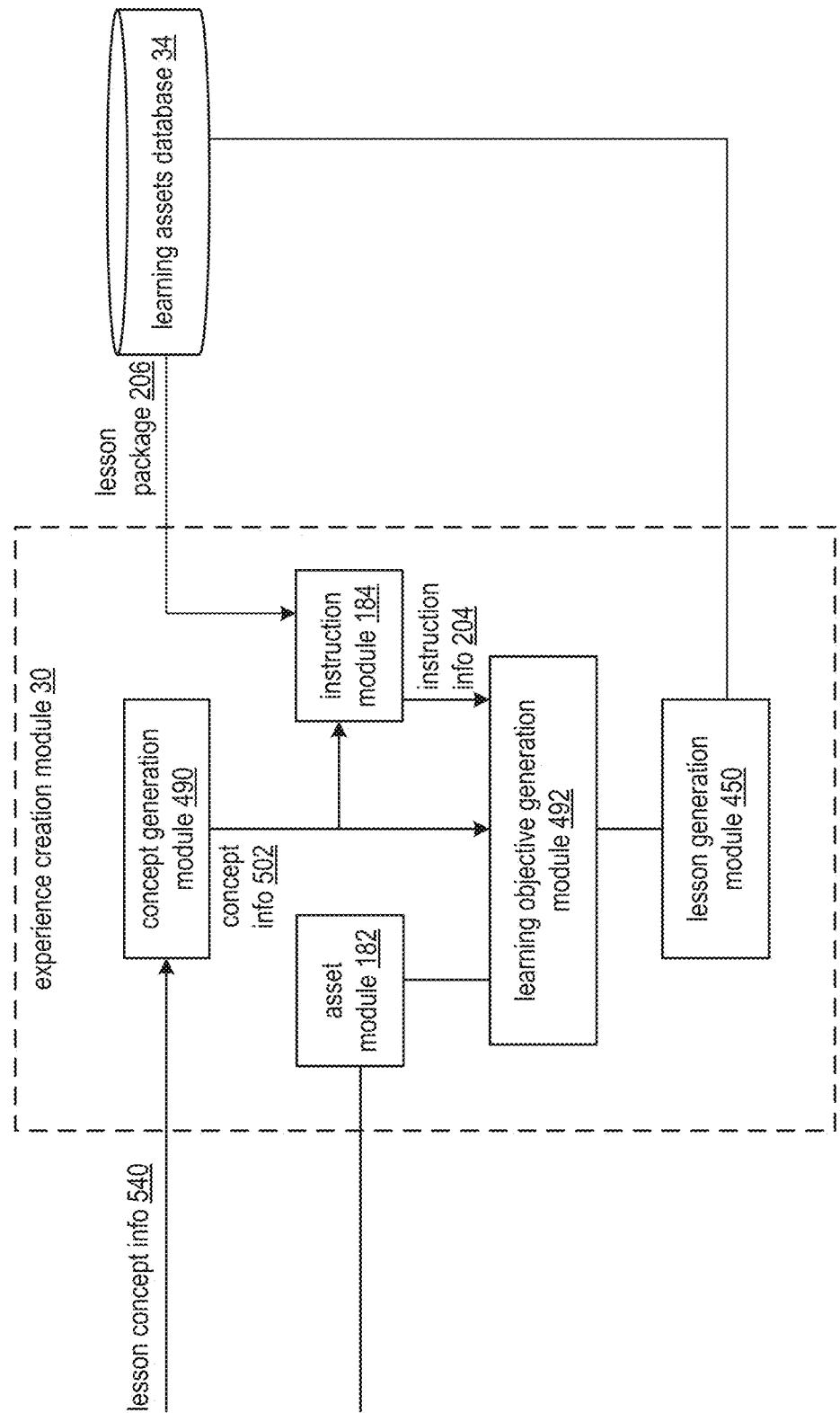
Figure 16B:
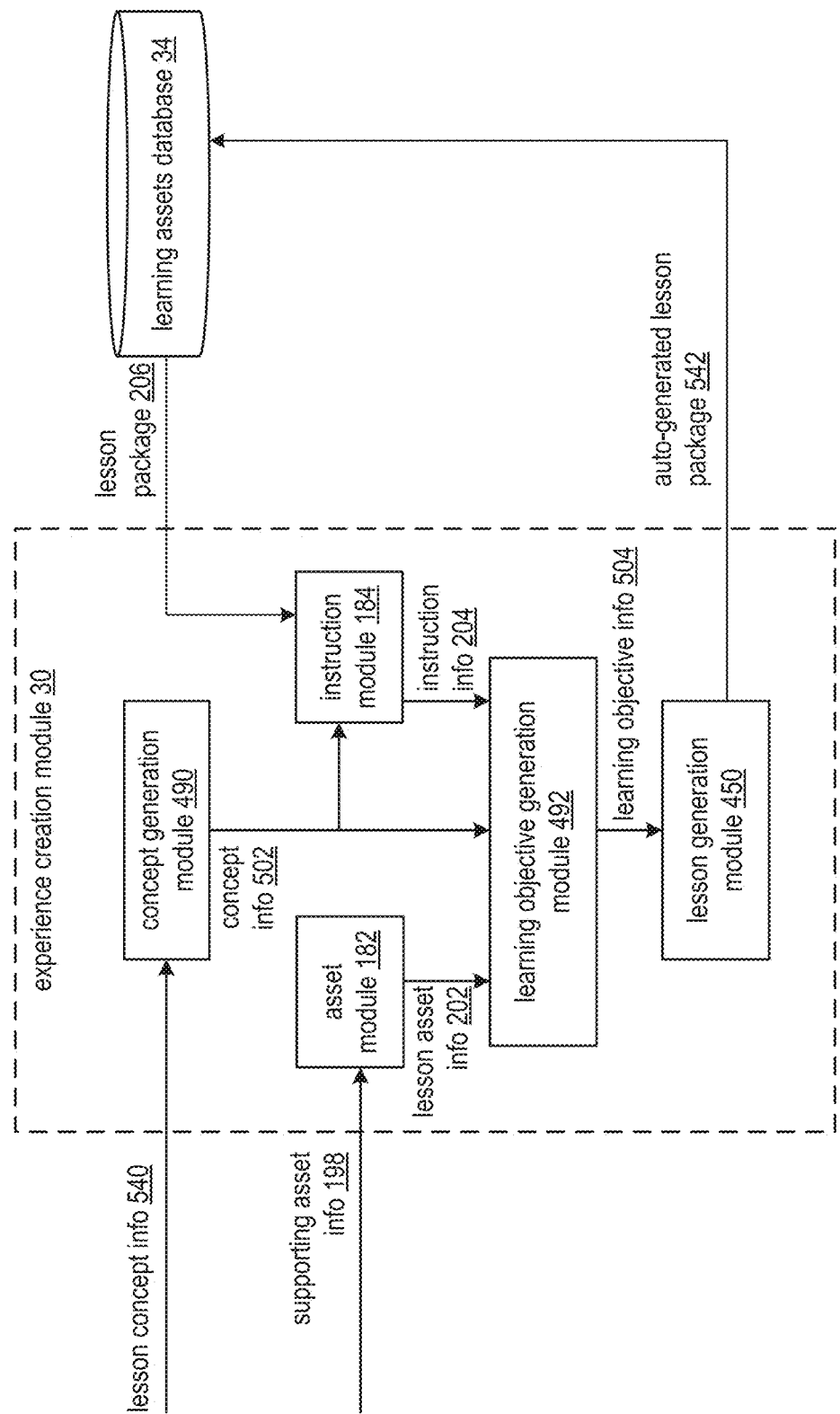
Figure 16C:
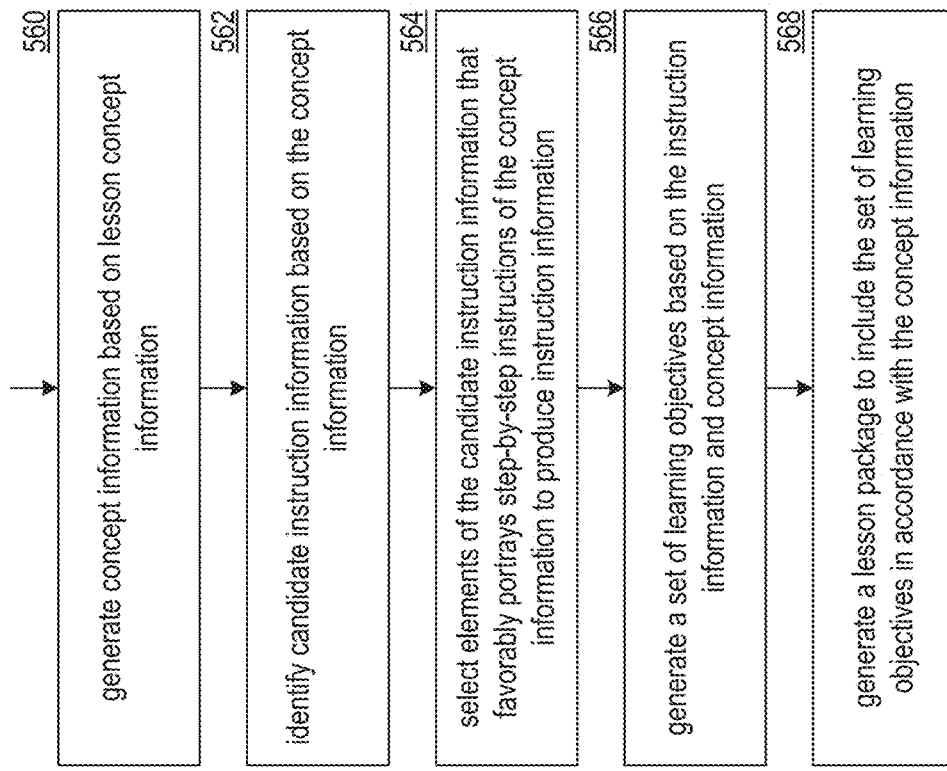
Figure 17A:
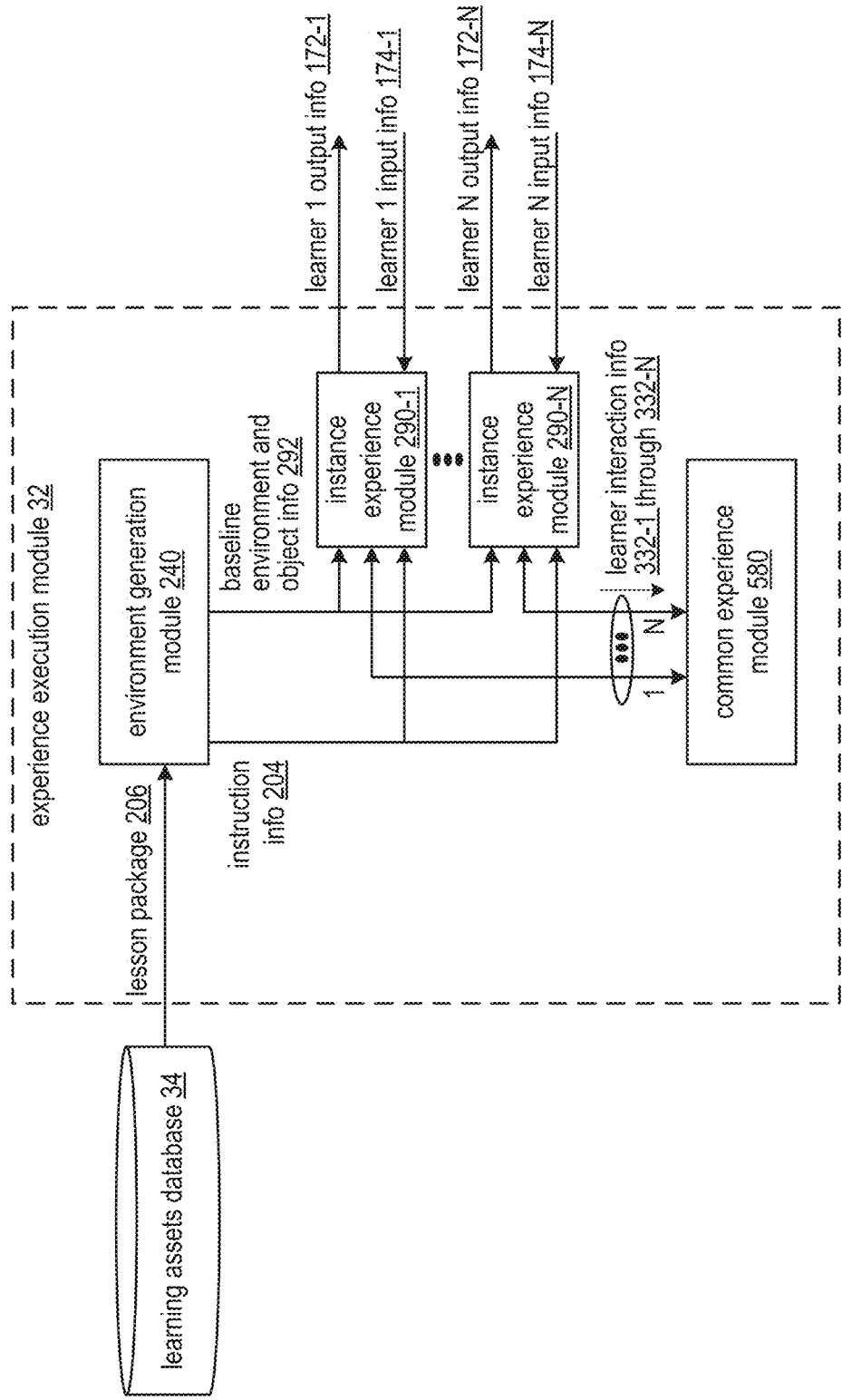
Figure 17B:
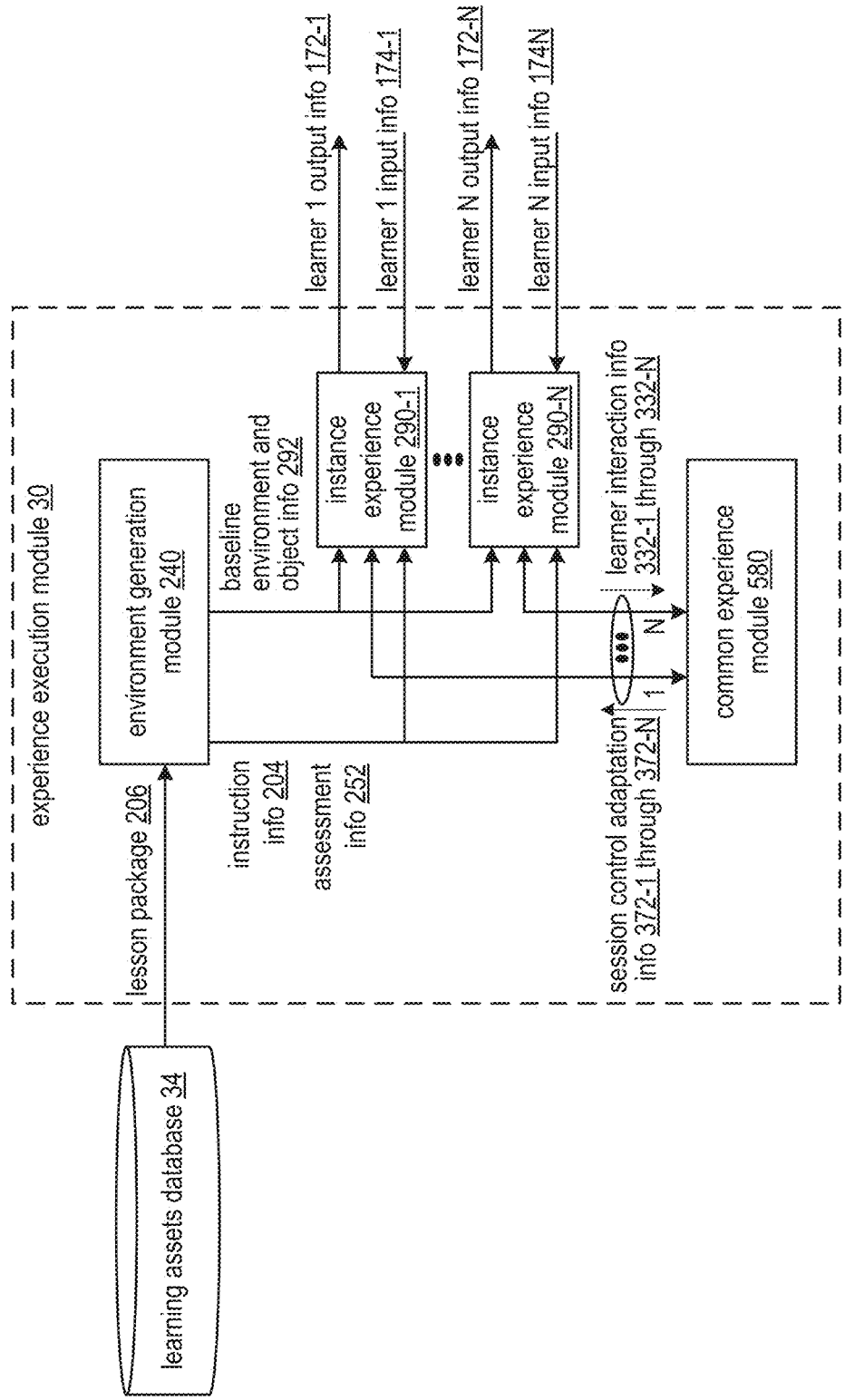
Figure 17C:
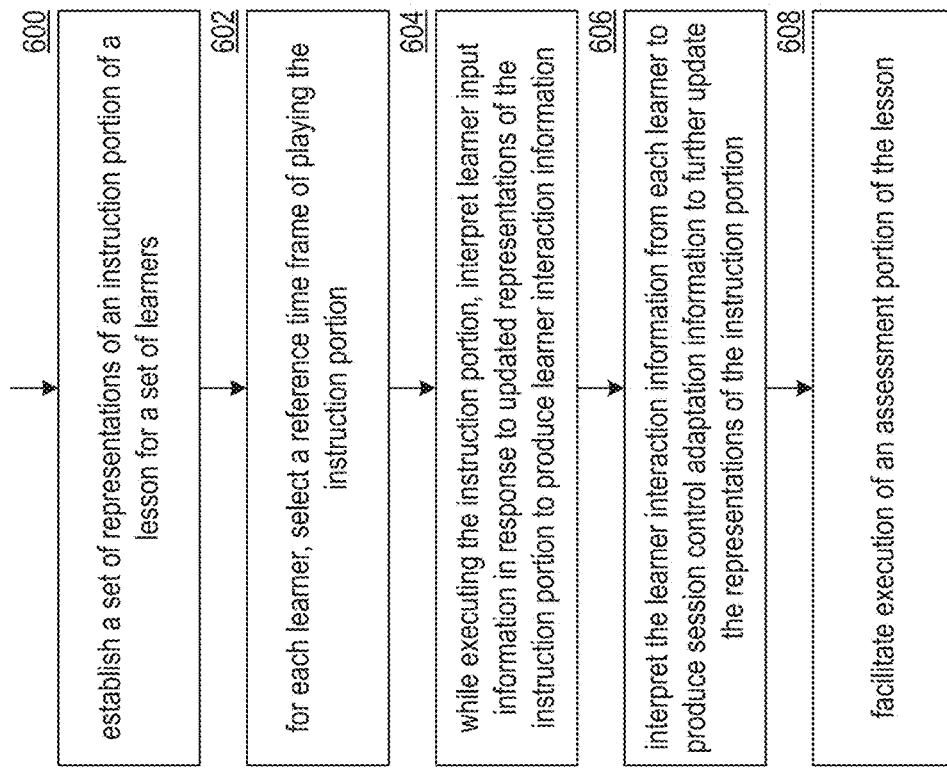
Figure 17D:
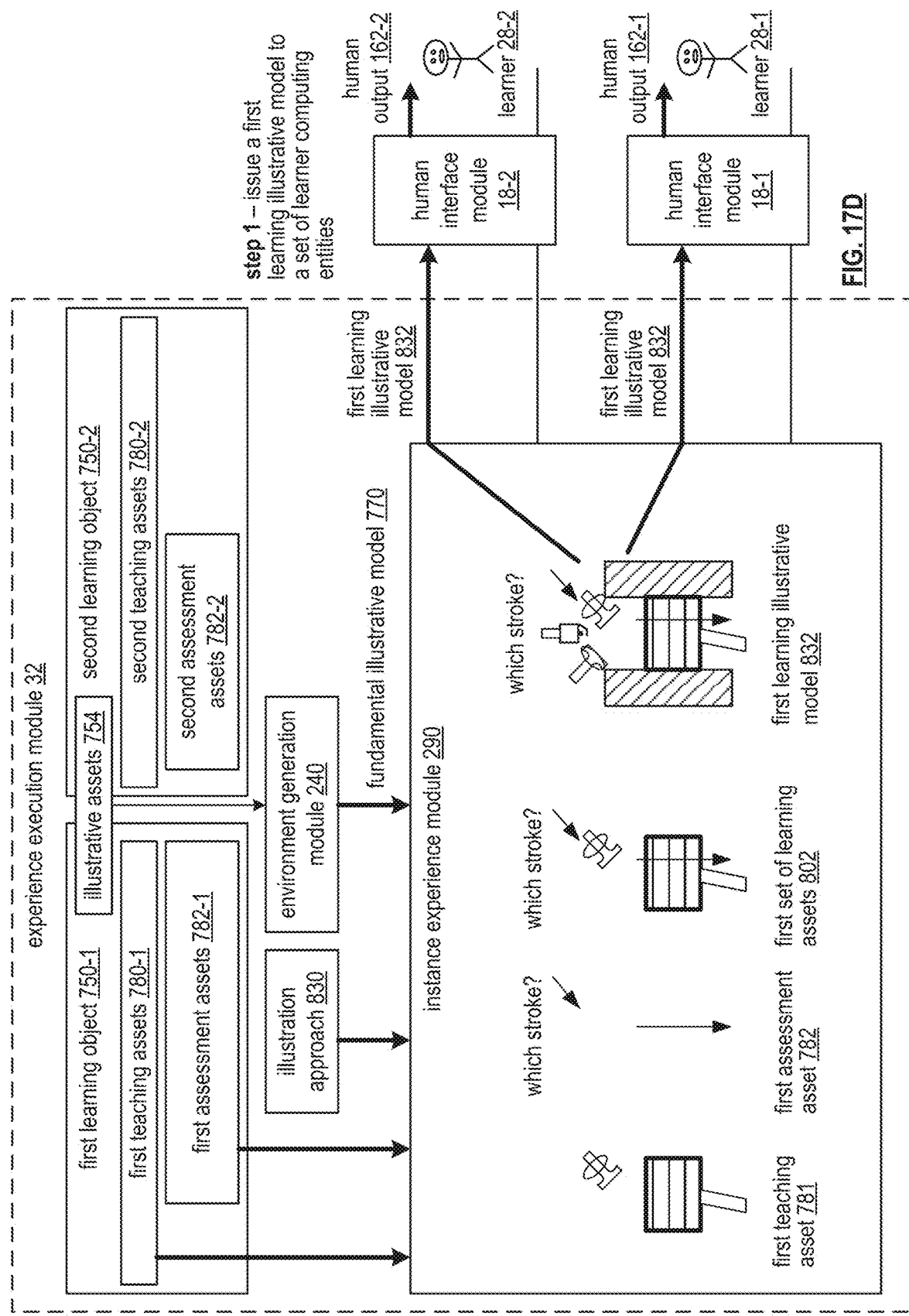
Figure 17E:
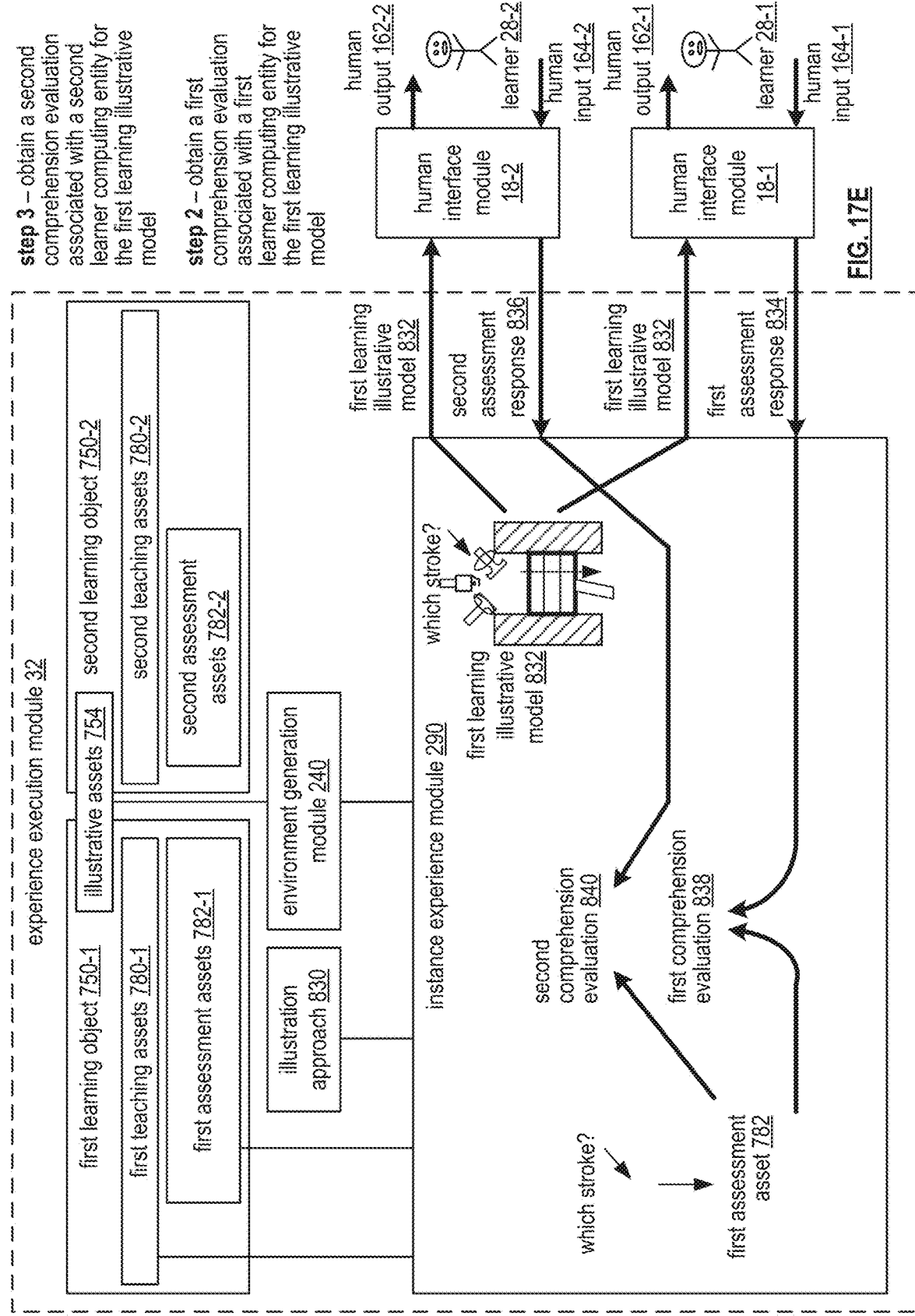
Figure 17F:
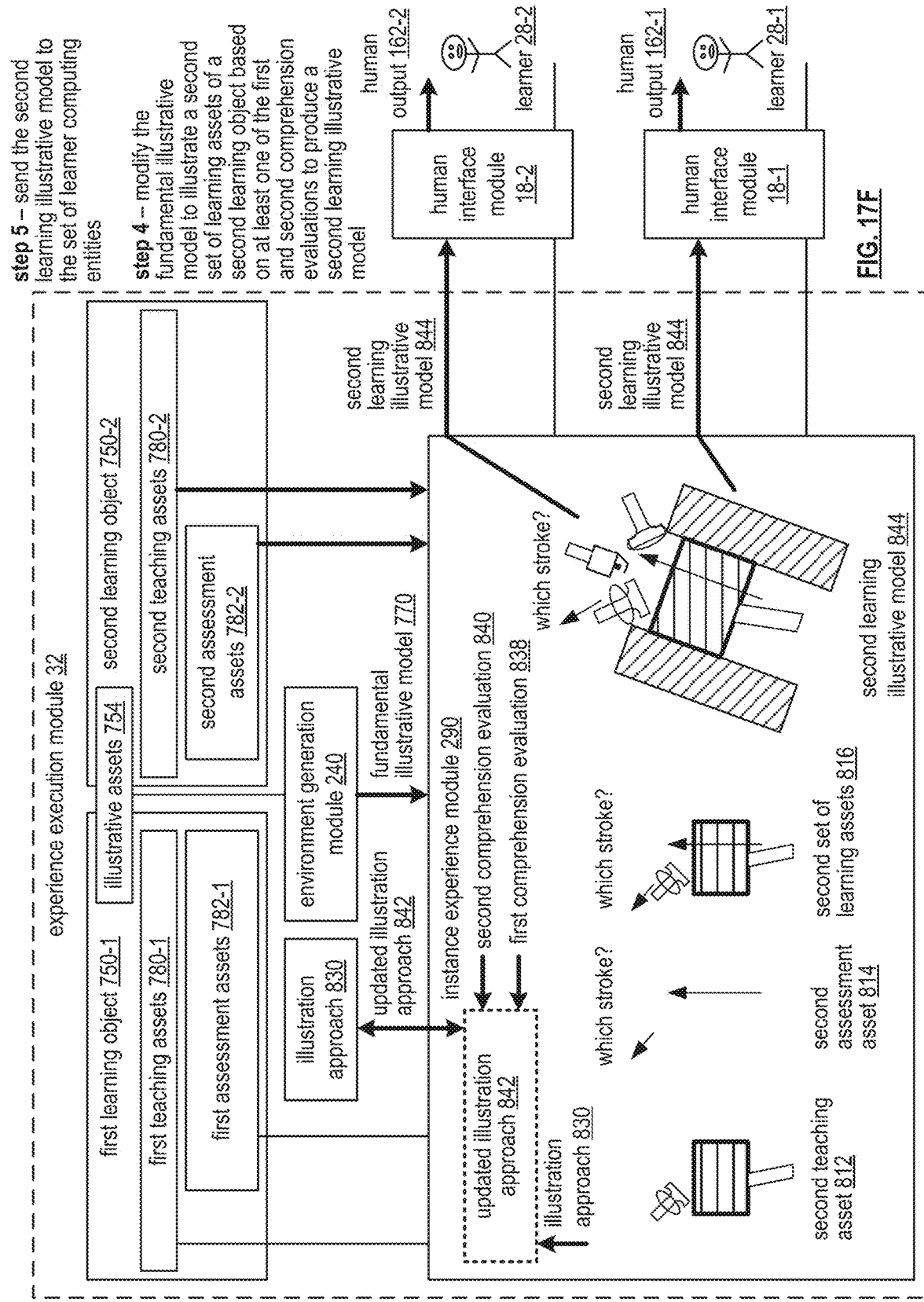

FIGS. 8E, 8F, 8G, 8H, 8J, and 8K are schematic block diagrams of another embodiment of a computing system illustrating another example of creating a learning experience within the computing system in accordance with the present invention;

FIGS. 9A-9B are schematic block diagrams of an embodiment of an instruction module of a computing system illustrating an example of creating a learning experience assessment in accordance with the present invention;

FIG. 9C is a logic diagram of an embodiment of a method for creating a learning experience assessment within a computing system in accordance with the present invention;

FIGS. 9D, 9E, 9F, and 9G are schematic block diagrams of another embodiment of a computing system illustrating another example of creating a learning experience assessment within the computing system in accordance with the present invention;

FIGS. 10A-10B are schematic block diagrams of an embodiment of an experience execution module of a computing system illustrating an example of executing a learning experience in accordance with the present invention;

FIG. 10C is a logic diagram of an embodiment of a method for executing a learning experience within a computing system in accordance with the present invention;

FIGS. 10D, 10E, 10F, 10G, and 10H are schematic block diagrams of another embodiment of a computing system illustrating another example of executing a learning experience within the computing system in accordance with the present invention;

FIGS. 11A-11B are schematic block diagrams of another embodiment of an experience execution module of a computing system illustrating an example of assessing execution of a learning experience in accordance with the present invention;

FIG. 11C is a logic diagram of an embodiment of a method for assessing execution of a learning experience within a computing system in accordance with the present invention;

FIGS. 11D and 11E are schematic block diagrams of another embodiment of a computing system illustrating another example of assessing learning experience retention within the computing system in accordance with the present invention;

FIGS. 12A-12B are schematic block diagrams of another embodiment of an experience execution module of a computing system illustrating another example of executing a learning experience in accordance with the present invention;

FIG. 12C is a logic diagram of another embodiment of a method for executing a learning experience within a computing system in accordance with the present invention;

FIGS. 12D-12G are schematic block diagrams of another embodiment of a computing system illustrating an example of improving learning comprehension of a lesson within the computing system in accordance with the present invention;

FIGS. 13A-13B are schematic block diagrams of another embodiment of an experience execution module of a computing system illustrating an example of sharing an assessment of a learning experience in accordance with the present invention;

FIG. 13C is a schematic block diagram of another embodiment of a computing system illustrating an example of sharing an assessment of a learning experience in accordance with the present invention;

FIG. 13D is a schematic block diagram of an embodiment of a transcript information blockchain of a computing system illustrating an example of sharing an assessment of a learning experience in accordance with the present invention;

FIG. 13E is a logic diagram of an embodiment of a method for sharing an assessment of a learning experience within a computing system in accordance with the present invention;

FIG. 14A is a schematic block diagram of another embodiment of an experience creation module of a computing system illustrating an example of creating a lesson in accordance with the present invention;

FIG. 14B is a schematic block diagram of another embodiment of a representation of a learning experience in accordance with the present invention;

FIG. 14C is a logic diagram of an embodiment of a method for creating a lesson within a computing system in accordance with the present invention;

FIGS. 15A-15B are schematic block diagrams of another embodiment of an experience creation module of a computing system illustrating an example of creating a lesson in accordance with the present invention;

FIG. 15C is a logic diagram of another embodiment of a method for creating a lesson within a computing system in accordance with the present invention;

FIGS. 16A-16B are schematic block diagrams of another embodiment of an experience creation module of a computing system illustrating an example of creating a lesson in accordance with the present invention;

FIG. 16C is a logic diagram of another embodiment of a method for creating a lesson within a computing system in accordance with the present invention;

FIGS. 17A-17B are schematic block diagrams of another embodiment of an experience execution module of a computing system illustrating another example of executing a learning experience in accordance with the present invention;

FIG. 17C is a logic diagram of another embodiment of a method for executing a learning experience within a computing system in accordance with the present invention; and FIGS. 17D-17F are schematic block diagrams of another embodiment of a computing system illustrating an example of improving learning comprehension of a lesson within the computing system in accordance with the present invention.

DETAILED DESCRIPTION OF THE INVENTION

Figure 1:
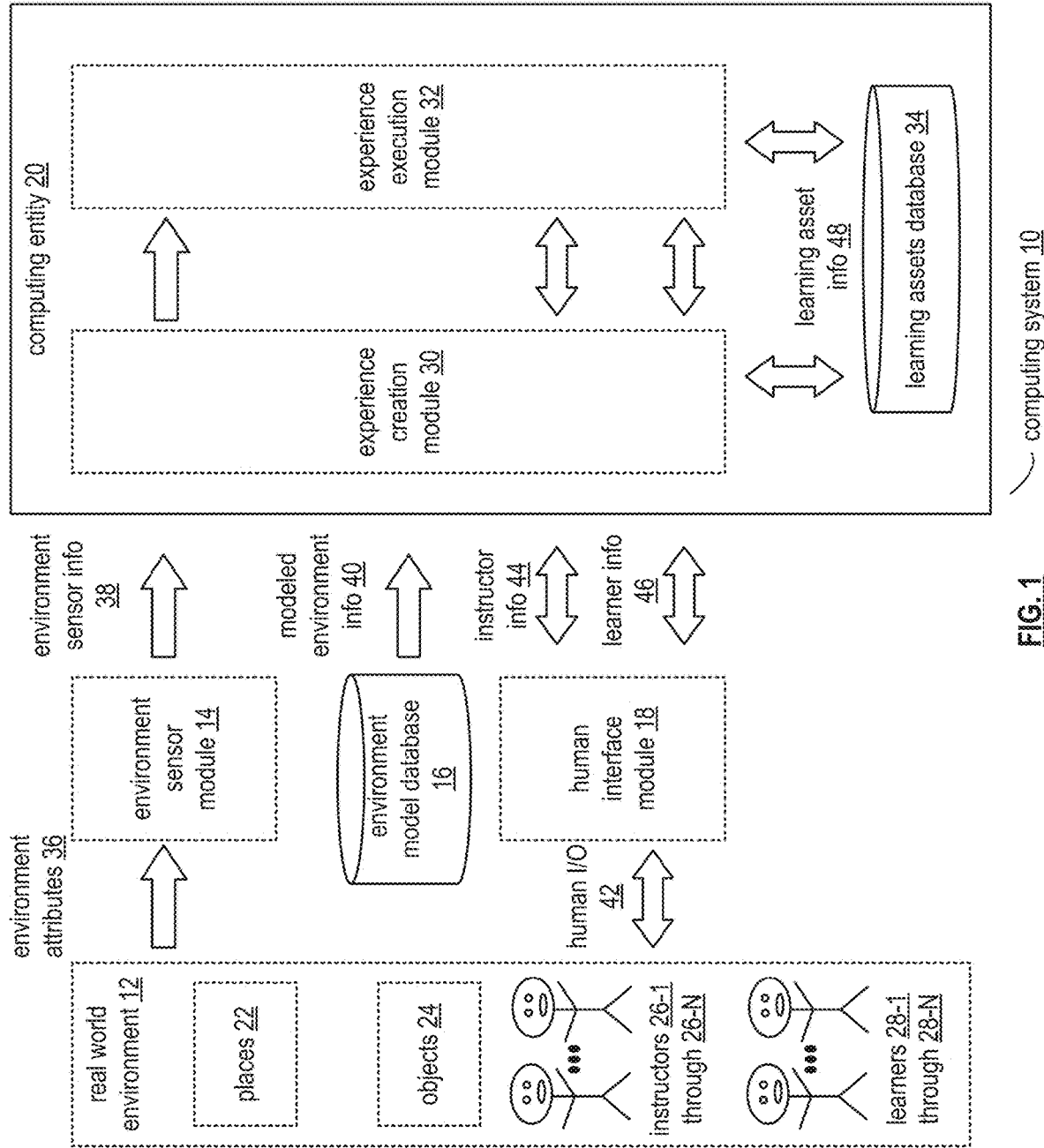
FIG. 1 is a schematic block diagram of an embodiment of a computing system in accordance with the present invention.

FIG. 1 is a schematic block diagram of an embodiment of a computing system 10 that includes a real world environment 12, an environment sensor module 14, and environment model database 16, a human interface module 18, and a computing entity 20. The real-world environment 12 includes places 22, objects 24, instructors 26-1 through 26-N, and learners 28-1 through 28-N. The computing entity 20 includes an experience creation module 30, an experience execution module 32, and a learning assets database 34.

The places 22 includes any area. Examples of places 22 includes a room, an outdoor space, a neighborhood, a city, etc. The objects 24 includes things within the places. Examples of objects 24 includes people, equipment, furniture, personal items, tools, and representations of information (i.e., video recordings, audio recordings, captured text, etc.). The instructors includes any entity (e.g., human or human proxy) imparting knowledge. The learners includes entities trying to gain knowledge and may temporarily serve as an instructor.

In an example of operation of the computing system 10, the experience creation module 30 receives environment sensor information 38 from the environment sensor module 14 based on environment attributes 36 from the real world environment 12. The environment sensor information 38 includes time-based information (e.g., static snapshot, continuous streaming) from environment attributes 36 including XYZ position information, place information, and object information (i.e., background, foreground, instructor, learner, etc.). The XYZ position information includes portrayal in a world space industry standard format (e.g., with reference to an absolute position).

The environment attributes 36 includes detectable measures of the real-world environment 12 to facilitate generation of a multi-dimensional (e.g., including time) representation of the real-world environment 12 in a virtual reality and/or augmented reality environment. For example, the environment sensor module 14 produces environment sensor information 38 associated with a medical examination room and a subject human patient (e.g., an MM). The environment sensor module 14 is discussed in greater detail with reference to FIG. 4.

Having received the environment sensor information 38, the experience creation module 30 accesses the environment model database 16 to recover modeled environment information 40. The modeled environment information 40 includes a synthetic representation of numerous environments (e.g., model places and objects). For example, the modeled environment information 40 includes a 3-D representation of a typical human circulatory system. The models include those that are associated with certain licensing requirements (e.g., copyrights, etc.).

Having received the modeled environment information 40, the experience creation module 30 receives instructor information 44 from the human interface module 18, where the human interface module 18 receives human input/output (I/O) 42 from instructor 26-1. The instructor information 44 includes a representation of an essence of communication with a participant instructor. The human I/O 42 includes detectable fundamental forms of communication with humans or human proxies. The human interface module 18 is discussed in greater detail with reference to FIG. 3.

Having received the instructor information 44, the experience creation module 30 interprets the instructor information 44 to identify aspects of a learning experience. A learning experience includes numerous aspects of an encounter between one or more learners and an imparting of knowledge within a representation of a learning environment that includes a place, multiple objects, and one or more instructors. The learning experience further includes an instruction portion (e.g., acts to impart knowledge) and an assessment portion (e.g., further acts and/or receiving of learner input) to determine a level of comprehension of the knowledge by the one or more learners. The learning experience still further includes scoring of the level of comprehension and tallying multiple learning experiences to facilitate higher-level competency accreditations (e.g., certificates, degrees, licenses, training credits, experiences completed successfully, etc.).

As an example of the interpreting of the instructor information 44, the experience creation module 30 identifies a set of concepts that the instructor desires to impart upon a learner and a set of comprehension verifying questions and associated correct answers. The experience creation module 30 further identifies step-by-step instructor annotations associated with the various objects within the environment of the learning experience for the instruction portion and the assessment portion. For example, the experience creation module 30 identifies positions held by the instructor 26-1 as the instructor narrates a set of concepts associated with the subject patient circulatory system. As a further example, the experience creation module 30 identifies circulatory system questions and correct answers posed by the instructor associated with the narrative.

Having interpreted the instructor information 44, the experience creation module 30 renders the environment sensor information 38, the modeled environment information 40, and the instructor information 44 to produce learning assets information 48 for storage in the learning assets database 34. The learning assets information 48 includes all things associated with the learning experience to facilitate subsequent recreation. Examples includes the environment, places, objects, instructors, learners, assets, recorded instruction information, learning evaluation information, etc.

Execution of a learning experience for the one or more learners includes a variety of approaches. A first approach includes the experience execution module 32 recovering the learning assets information 48 from the learning assets database 34, rendering the learning experience as learner information 46, and outputting the learner information 46 via the human interface module 18 as further human I/O 42 to one or more of the learners 28-1 through 28-N. The learner information 46 includes information to be sent to the one or more learners and information received from the one or more learners. For example, the experience execution module 32 outputs learner information 46 associated with the instruction portion for the learner 28-1 and collects learner information 46 from the learner 28-1 that includes submitted assessment answers in response to assessment questions of the assessment portion communicated as further learner information 46 for the learner 28-1.

A second approach includes the experience execution module 32 rendering the learner information 46 as a combination of live streaming of environment sensor information 38 from the real-world environment 12 along with an augmented reality overlay based on recovered learning asset information 48. For example, a real world subject human patient in a medical examination room is live streamed as the environment sensor information 38 in combination with a prerecorded instruction portion from the instructor 26-1.

Figure 2A:
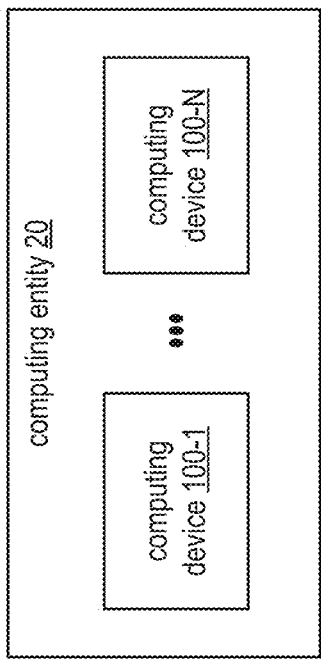
FIG. 2A is a schematic block diagram of an embodiment of a computing entity of a computing system in accordance with the present invention.

FIG. 2A is a schematic block diagram of an embodiment of the computing entity 20 of the computing system 10. The computing entity 20 includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
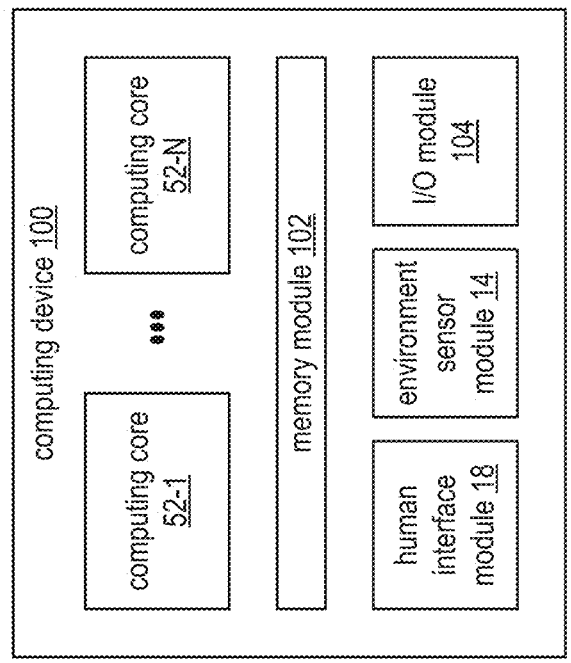
FIG. 2B is a schematic block diagram of an embodiment of a computing device of a computing system in accordance with the present invention.

FIG. 2B is a schematic block diagram of an embodiment of a computing device 100 of the computing system 10 that includes one or more computing cores 52-1 through 52-N, a memory module 102, the human interface module 18, the environment sensor module 14, and an I/O module 104. In alternative embodiments, the human interface module 18, the environment sensor module 14, the I/O module 104, and the memory module 102 may be standalone (e.g., external to the computing device). An embodiment of the computing device 100 will be discussed in greater detail with reference to FIG. 3.

Figure 3:
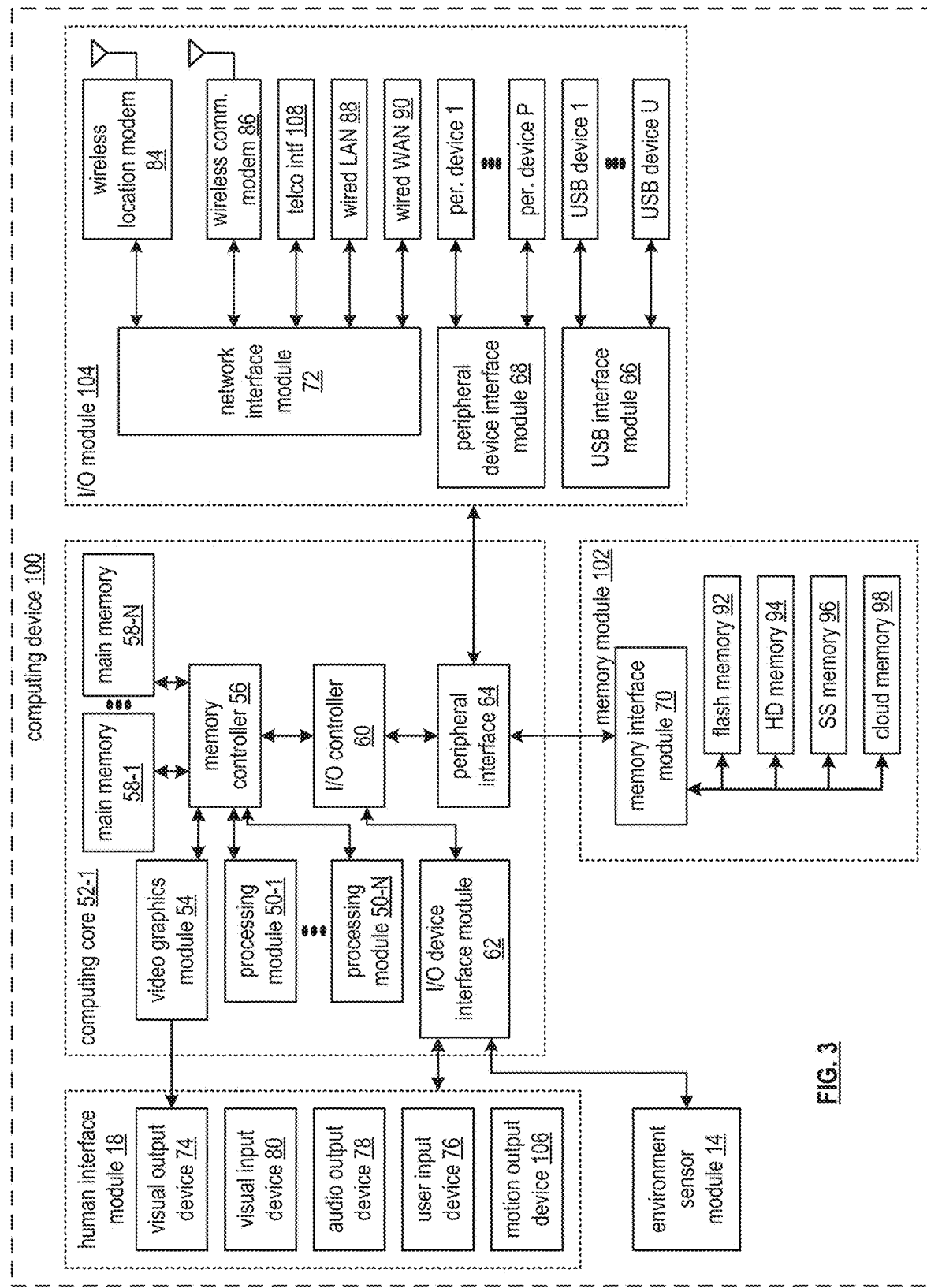
FIG. 3 is a schematic block diagram of another embodiment of a computing device of a computing system in accordance with the present invention.

FIG. 3 is a schematic block diagram of another embodiment of the computing device 100 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100 may include more or less devices and modules than shown in this example embodiment.

Figure 4:
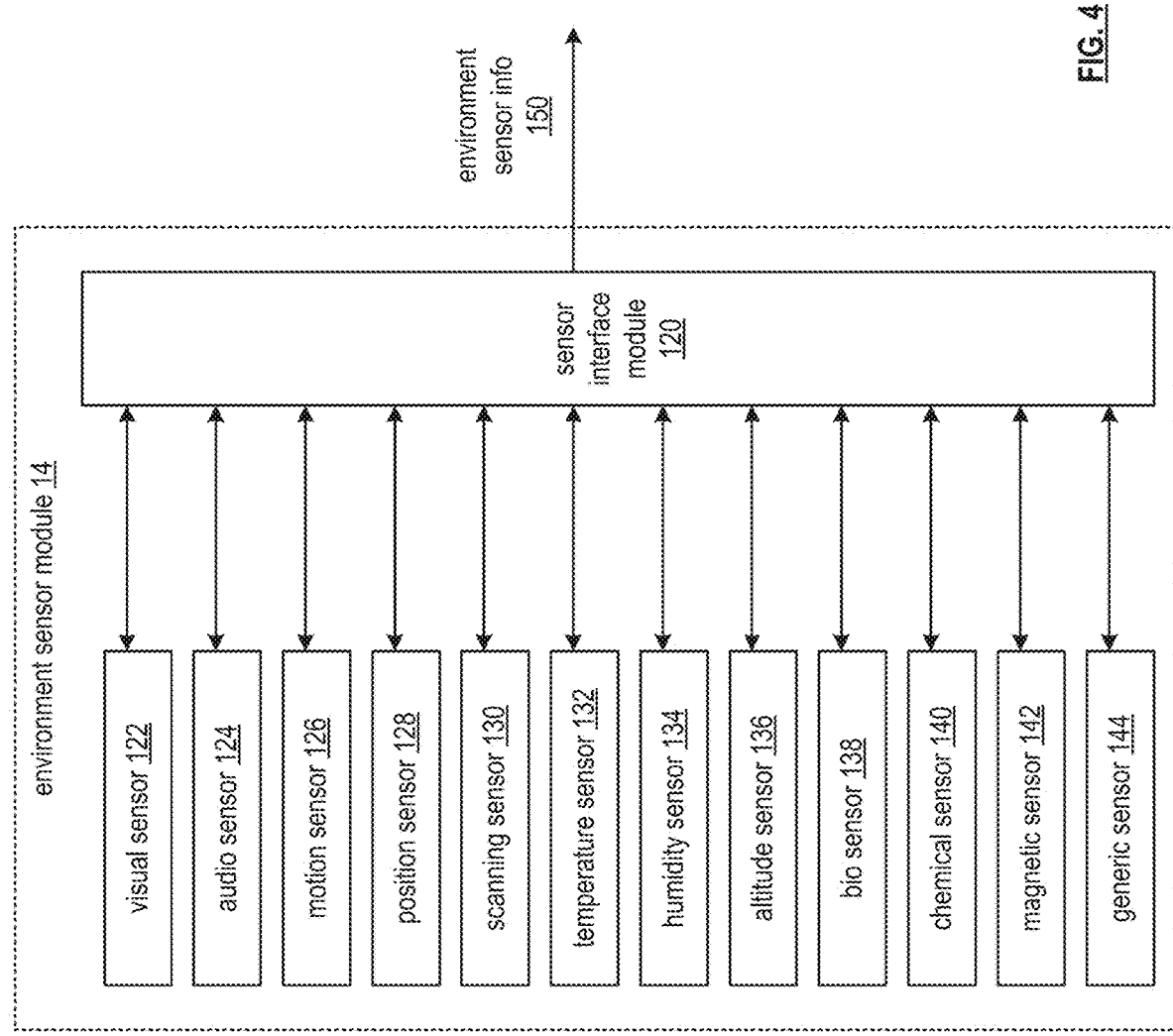
FIG. 4 is a schematic block diagram of an embodiment of an environment sensor module of a computing system in accordance with the present invention.

FIG. 4 is a schematic block diagram of an embodiment of the environment sensor module 14 of the computing system 10 that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, immuno, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
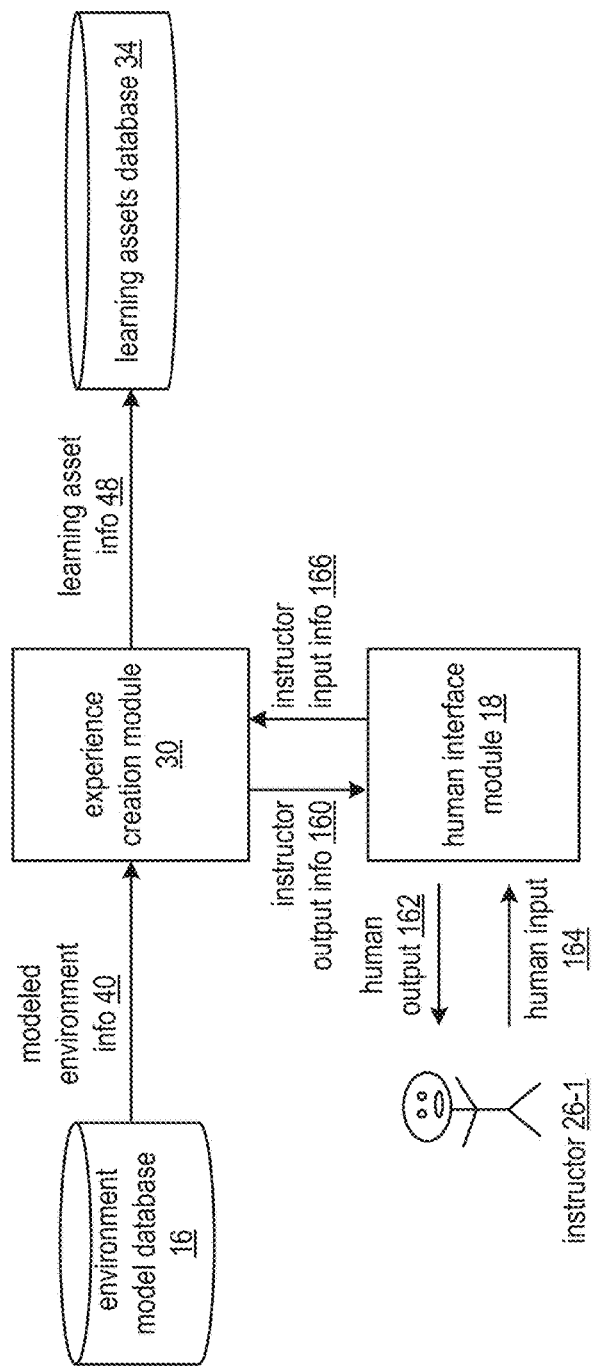
FIG. 5A is a schematic block diagram of another embodiment of a computing system in accordance with the present invention.

FIG. 5A is a schematic block diagram of another embodiment of a computing system that includes the environment model database 16, the human interface module 18, the instructor 26-1, the experience creation module 30, and the learning assets database 34 of FIG. 1. In an example of operation, the experience creation module 30 obtains modeled environment information 40 from the environment model database 16 and renders a representation of an environment and objects of the modeled environment information 40 to output as instructor output information 160. The human interface module 18 transforms the instructor output information 160 into human output 162 for presentation to the instructor 26-1. For example, the human output 162 includes a 3-D visualization and stereo audio output.

In response to the human output 162, the human interface module 18 receives human input 164 from the instructor 26-1. For example, the human input 164 includes pointer movement information and human speech associated with a lesson. The human interface module 18 transforms the human input 164 into instructor input information 166. The instructor input information 166 includes one or more of representations of instructor interactions with objects within the environment and explicit evaluation information (e.g., questions to test for comprehension level, and correct answers to the questions).

Having received the instructor input information 166, the experience creation module 30 renders a representation of the instructor input information 166 within the environment utilizing the objects of the modeled environment information 40 to produce learning asset information 48 for storage in the learnings assets database 34. Subsequent access of the learning assets information 48 facilitates a learning experience.

Figure 5B:
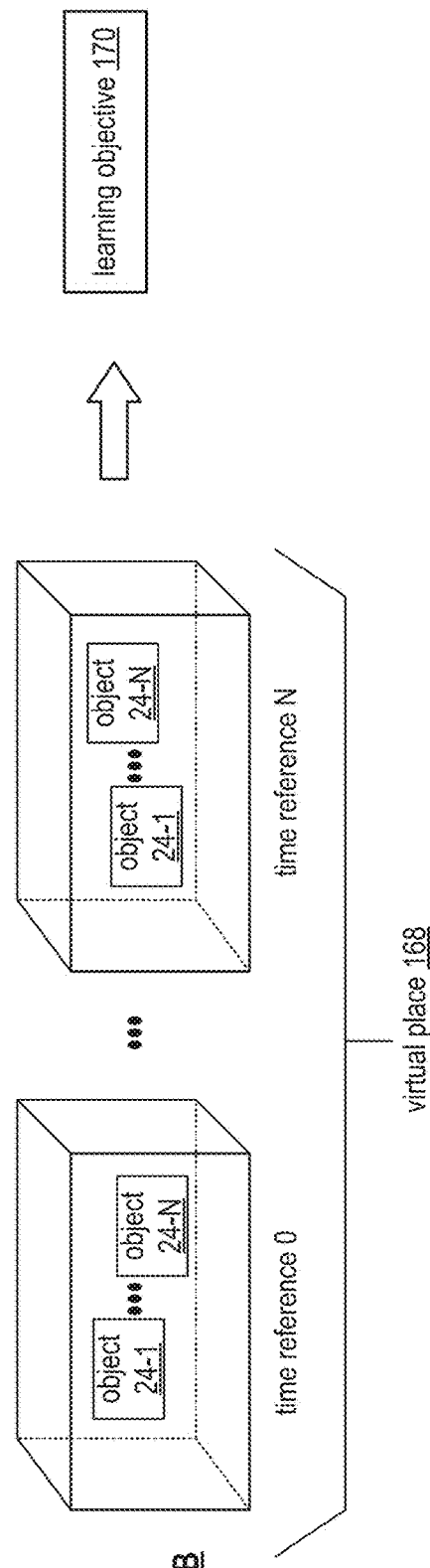
FIG. 5B is a schematic block diagram of an embodiment of a representation of a learning experience in accordance with the present invention.

FIG. 5B is a schematic block diagram of an embodiment of a representation of a learning experience that includes a virtual place 168 and a resulting learning objective 170. A learning objective represents a portion of an overall learning experience, where the learning objective is associated with at least one major concept of knowledge to be imparted to a learner. The major concept may include several sub-concepts. The makeup of the learning objective is discussed in greater detail with reference to FIG. 6.

The virtual place 168 includes a representation of an environment (e.g., a place) over a series of time intervals (e.g., time 0-N). The environment includes a plurality of objects 24-1 through 24-N. At each time reference, the positions of the objects can change in accordance with the learning experience. For example, the instructor 26-1 of FIG. 5A interacts with the objects to convey a concept. The sum of the positions of the environment and objects within the virtual place 168 is wrapped into the learning objective 170 for storage and subsequent utilization when executing the learning experience.

Figure 6:
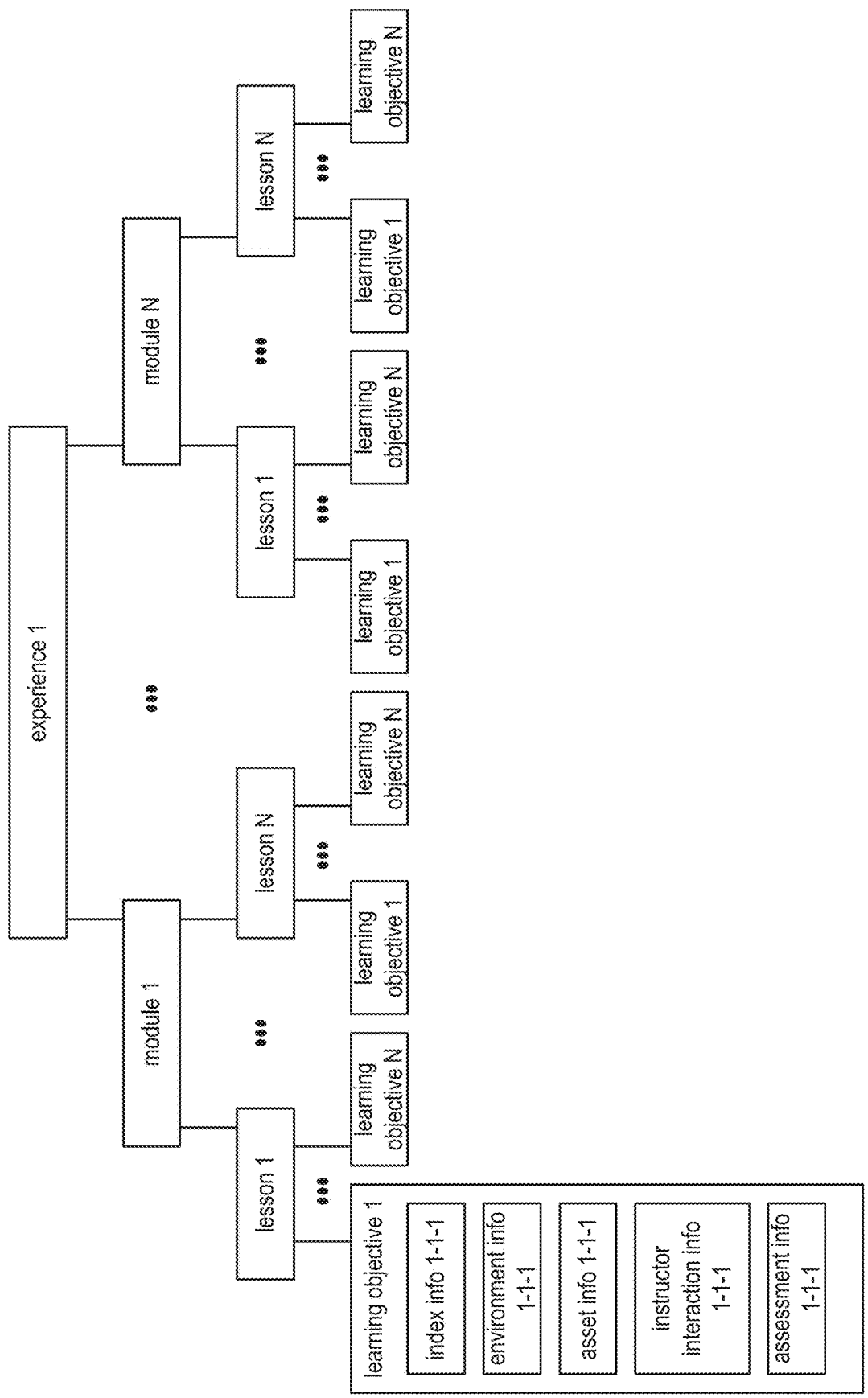
FIG. 6 is a schematic block diagram of another embodiment of a representation of a learning experience in accordance with the present invention.

FIG. 6 is a schematic block diagram of another embodiment of a representation of a learning experience that includes a plurality of modules 1-N. Each module includes a set of lessons 1-N. Each lesson includes a plurality of learning objectives 1-N. The learning experience typically is played from left to right where learning objectives are sequentially executed in lesson 1 of module 1 followed by learning objectives of lesson 2 of module 1 etc.

As learners access the learning experience during execution, the ordering may be accessed in different ways to suit the needs of the unique learner based on one or more of preferences, experience, previously demonstrated comprehension levels, etc. For example, a particular learner may skip over lesson 1 of module 1 and go right to lesson 2 of module 1 when having previously demonstrated competency of the concepts associated with lesson 1.

Each learning objective includes indexing information, environment information, asset information, instructor interaction information, and assessment information. The index information includes one or more of categorization information, topics list, instructor identification, author identification, identification of copyrighted materials, keywords, concept titles, prerequisites for access, and links to related learning objectives.

The environment information includes one or more of structure information, environment model information, background information, identifiers of places, and categories of environments. The asset information includes one or more of object identifiers, object information (e.g., modeling information), asset ownership information, asset type descriptors (e.g., 2-D, 3-D). Examples include models of physical objects, stored media such as videos, scans, images, digital representations of text, digital audio, and graphics.

The instructor interaction information includes representations of instructor annotations, actions, motions, gestures, expressions, eye movement information, facial expression information, speech, and speech inflections. The content associated with the instructor interaction information includes overview information, speaker notes, actions associated with assessment information, (e.g., pointing to questions, revealing answers to the questions, motioning related to posing questions) and conditional learning objective execution ordering information (e.g., if the learner does this then take this path, otherwise take another path).

The assessment information includes a summary of desired knowledge to impart, specific questions for a learner, correct answers to the specific questions, multiple-choice question sets, and scoring information associated with writing answers. The assessment information further includes historical interactions by other learners with the learning objective (e.g., where did previous learners look most often within the environment of the learning objective, etc.), historical responses to previous comprehension evaluations, and actions to facilitate when a learner responds with a correct or incorrect answer (e.g., motion stimulus to activate upon an incorrect answer to increase a human stress level).

Figure 7A:
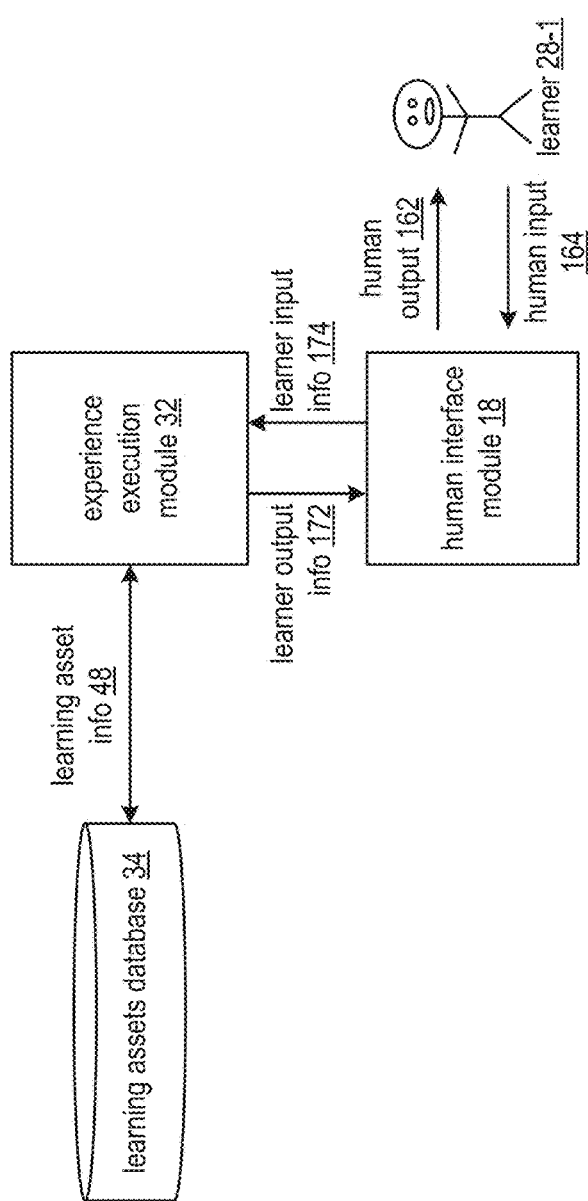
FIG. 7A is a schematic block diagram of another embodiment of a computing system in accordance with the present invention.

FIG. 7A is a schematic block diagram of another embodiment of a computing system that includes the learning assets database 34, the experience execution module 32, the human interface module 18, and the learner 28-1 of FIG. 1. In an example of operation, the experience execution module 32 recovers learning asset information 48 from the learning assets database 34 (e.g., in accordance with a selection by the learner 28-1). The experience execution module 32 renders a group of learning objectives associated with a common lesson within an environment utilizing objects associated with the lesson to produce learner output information 172. The learner output information 172 includes a representation of a virtual place and objects that includes instructor interactions and learner interactions from a perspective of the learner.

The human interface module 18 transforms the learner output information 172 into human output 162 for conveyance of the learner output information 172 to the learner 28-1. For example, the human interface module 18 facilitates displaying a 3-D image of the virtual environment to the learner 28-1.

The human interface module 18 transforms human input 164 from the learner 28-1 to produce learner input information 174. The learner input information 174 includes representations of learner interactions with objects within the virtual place (e.g., answering comprehension level evaluation questions).

The experience execution module 32 updates the representation of the virtual place by modifying the learner output information 172 based on the learner input information 174 so that the learner 28-1 enjoys representations of interactions caused by the learner within the virtual environment. The experience execution module 32 evaluates the learner input information 174 with regards to evaluation information of the learning objectives to evaluate a comprehension level by the learner 28-1 with regards to the set of learning objectives of the lesson.

Figure 7B:
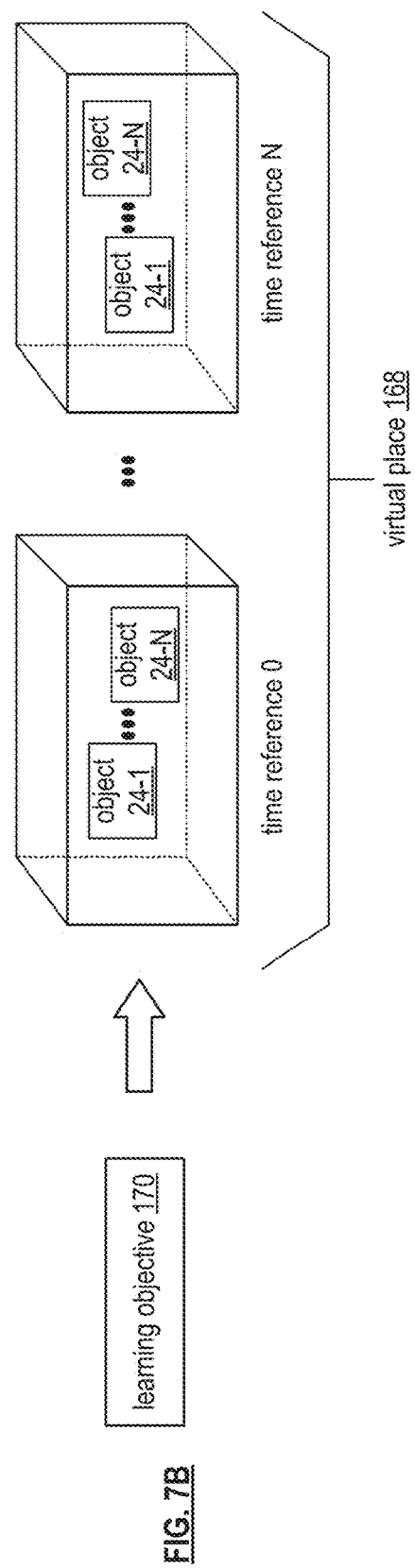
FIG. 7B is a schematic block diagram of another embodiment of a representation of a learning experience in accordance with the present invention.

FIG. 7B is a schematic block diagram of another embodiment of a representation of a learning experience that includes the learning objective 170 and the virtual place 168. In an example of operation, the learning objective 170 is recovered from the learning assets database 34 of FIG. 7A and rendered to create the virtual place 168 representations of objects 24-1 through 24-N in the environment from time references zero through N. For example, a first object is the instructor 26-1 of FIG. 5A, a second object is the learner 28-1 of FIG. 7A, and the remaining objects are associated with the learning objectives of the lesson, where the objects are manipulated in accordance with annotations of instructions provided by the instructor 26-1.

The learner 28-1 experiences a unique viewpoint of the environment and gains knowledge from accessing (e.g., playing) the learning experience. The learner 28-1 further manipulates objects within the environment to support learning and assessment of comprehension of objectives of the learning experience.

Figure 8A:
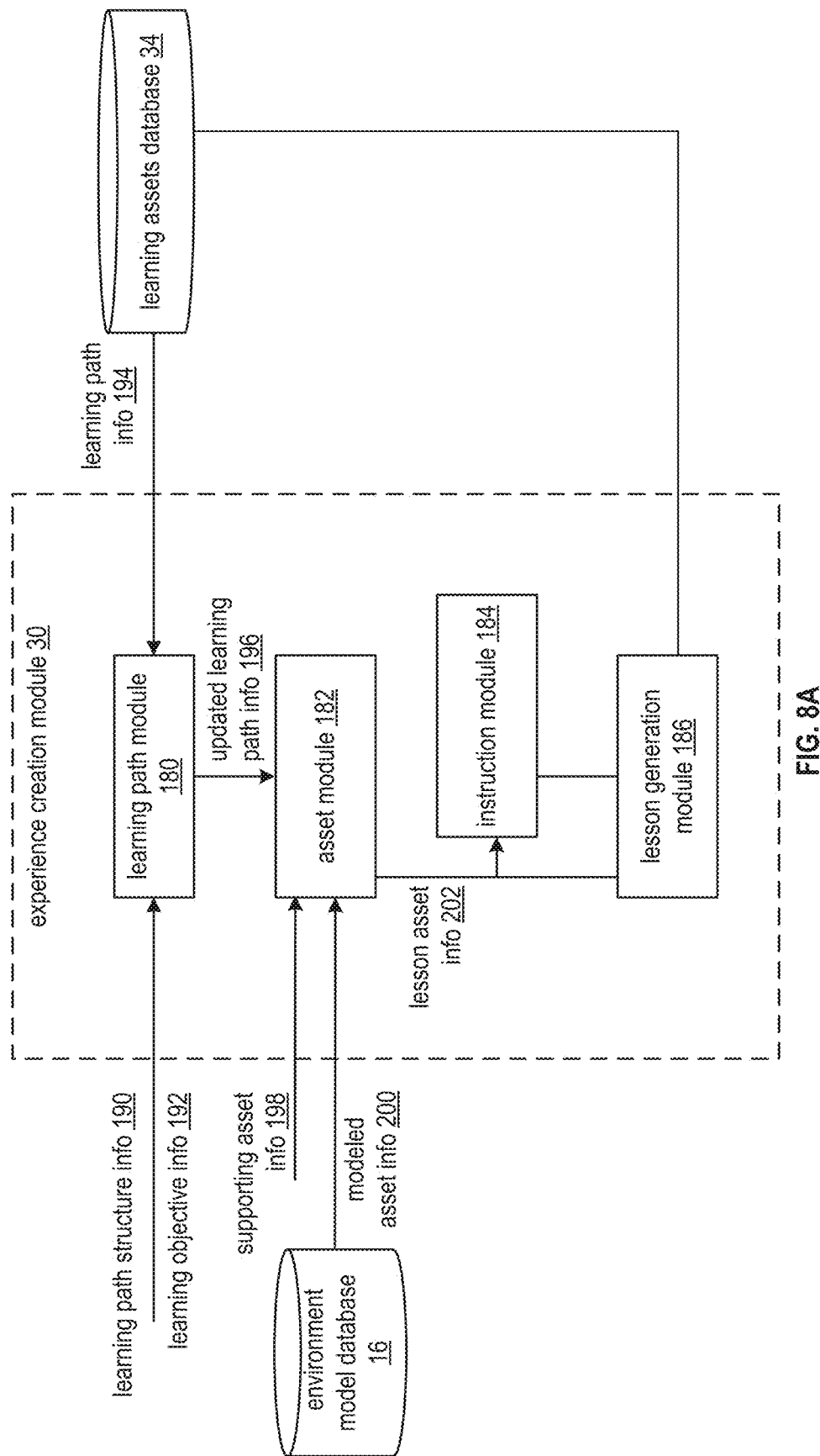
FIGS. 8A-8C are schematic block diagrams of another embodiment of a computing system illustrating an example of creating a learning experience in accordance with the present invention.
Figure 8B:
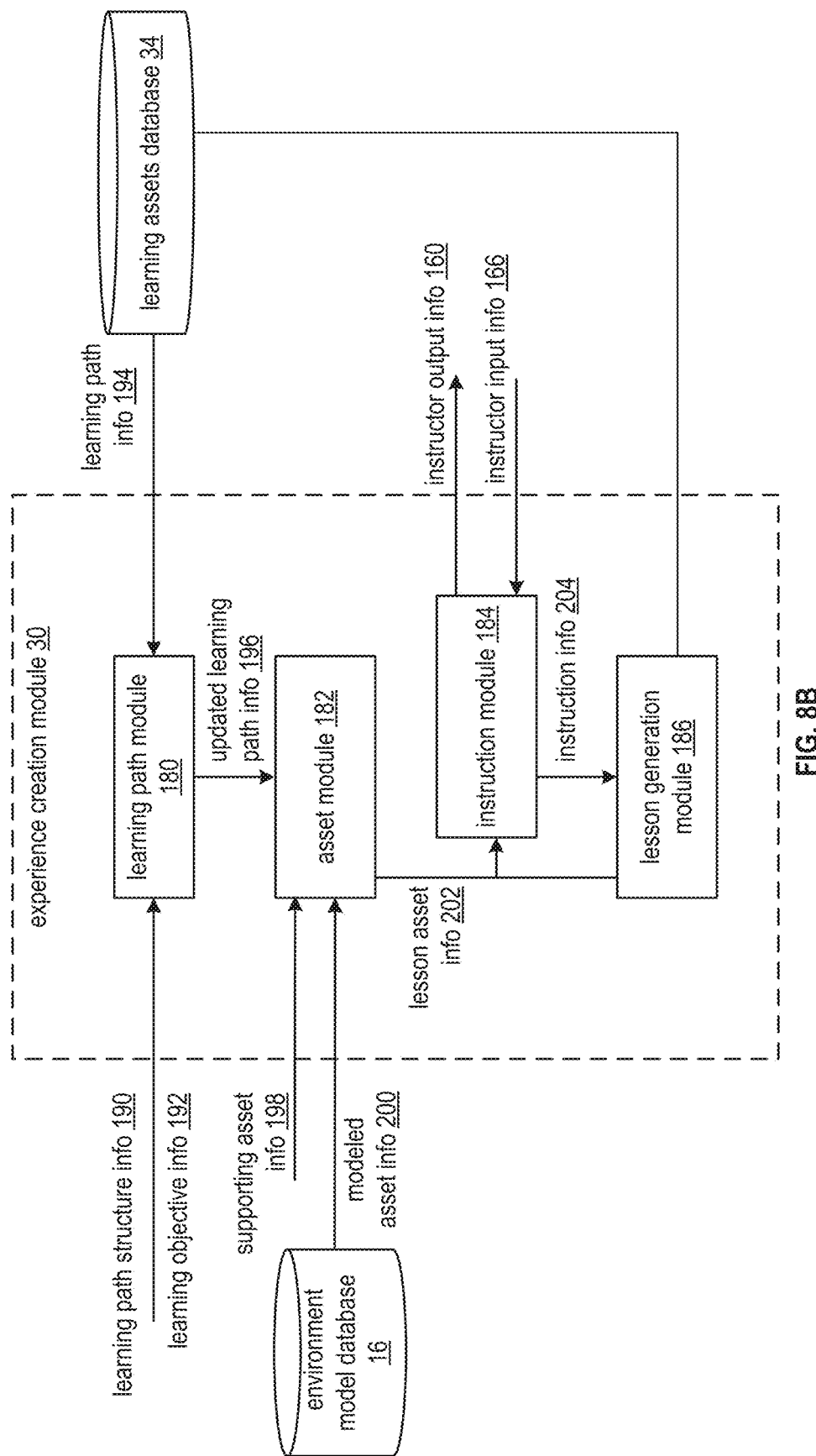
Figure 8C:
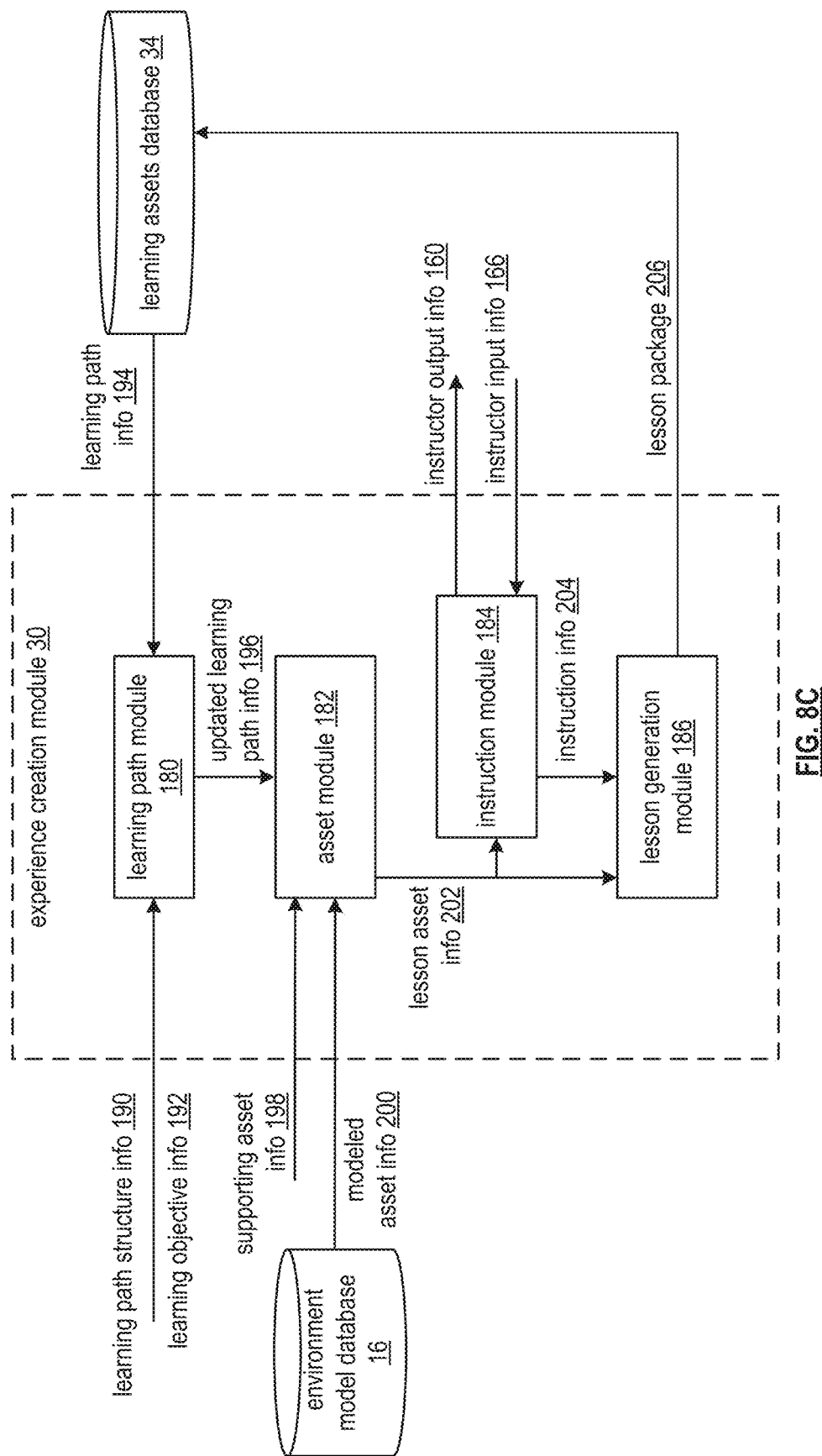

FIGS. 8A-8C are schematic block diagrams of another embodiment of a computing system illustrating an example of creating a learning experience. The computing system includes the environment model database 16, the experience creation module 30, and the learning assets database 34 of FIG. 1. The experience creation module 30 includes a learning path module 180, an asset module 182, an instruction module 184, and a lesson generation module 186.

In an example of operation, FIG. 8 A illustrates the learning path module 180 determining a learning path (e.g., structure and ordering of learning objectives to complete towards a goal such as a certificate or degree) to include multiple modules and/or lessons. For example, the learning path module 180 obtains learning path information 194 from the learning assets database 34 and receives learning path structure information 190 and learning objective information 192 (e.g., from an instructor) to generate updated learning path information 196.

The learning path structure information 190 includes attributes of the learning path and the learning objective information 192 includes a summary of desired knowledge to impart. The updated learning path information 196 is generated to include modifications to the learning path information 194 in accordance with the learning path structure information 190 in the learning objective information 192.

The asset module 182 determines a collection of common assets for each lesson of the learning path. For example, the asset module 182 receives supporting asset information 198 (e.g., representation information of objects in the virtual space) and modeled asset information 200 from the environment model database 16 to produce lesson asset information 202. The modeled asset information 200 includes representations of an environment to support the updated learning path information 196 (e.g., modeled places and modeled objects) and the lesson asset information 202 includes a representation of the environment, learning path, the objectives, and the desired knowledge to impart.

FIG. 8B further illustrates the example of operation where the instruction module 184 outputs a representation of the lesson asset information 202 as instructor output information

160. The instructor output information 160 includes a representation of the environment and the asset so far to be experienced by an instructor who is about to input interactions with the environment to impart the desired knowledge.

The instruction module 184 receives instructor input information 166 from the instructor in response to the instructor output information 160. The instructor input information 166 includes interactions from the instructor to facilitate imparting of the knowledge (e.g., instructor annotations, pointer movements, highlighting, text notes, and speech) and testing of comprehension of the knowledge (e.g., valuation information such as questions and correct answers). The instruction module 184 obtains assessment information (e.g., comprehension test points, questions, correct answers to the questions) for each learning objective based on the lesson asset information 202 and produces instruction information 204 (e.g., representation of instructor interactions with objects within the virtual place, evaluation information).

FIG. 8C further illustrates the example of operation where the lesson generation module 186 renders (e.g., as a multidimensional representation) the objects associated with each lesson (e.g., assets of the environment) within the environment in accordance with the instructor interactions for the instruction portion and the assessment portion of the learning experience. Each object is assigned a relative position in XYZ world space within the environment to produce the lesson rendering.

The lesson generation module 186 outputs the rendering as a lesson package 206 for storage in the learning assets database 34. The lesson package 206 includes everything required to replay the lesson for a subsequent learner (e.g., representation of the environment, the objects, the interactions of the instructor during both the instruction and evaluation portions, questions to test comprehension, correct answers to the questions, a scoring approach for evaluating comprehension, all of the learning objective information associated with each learning objective of the lesson).

Figure 8D:
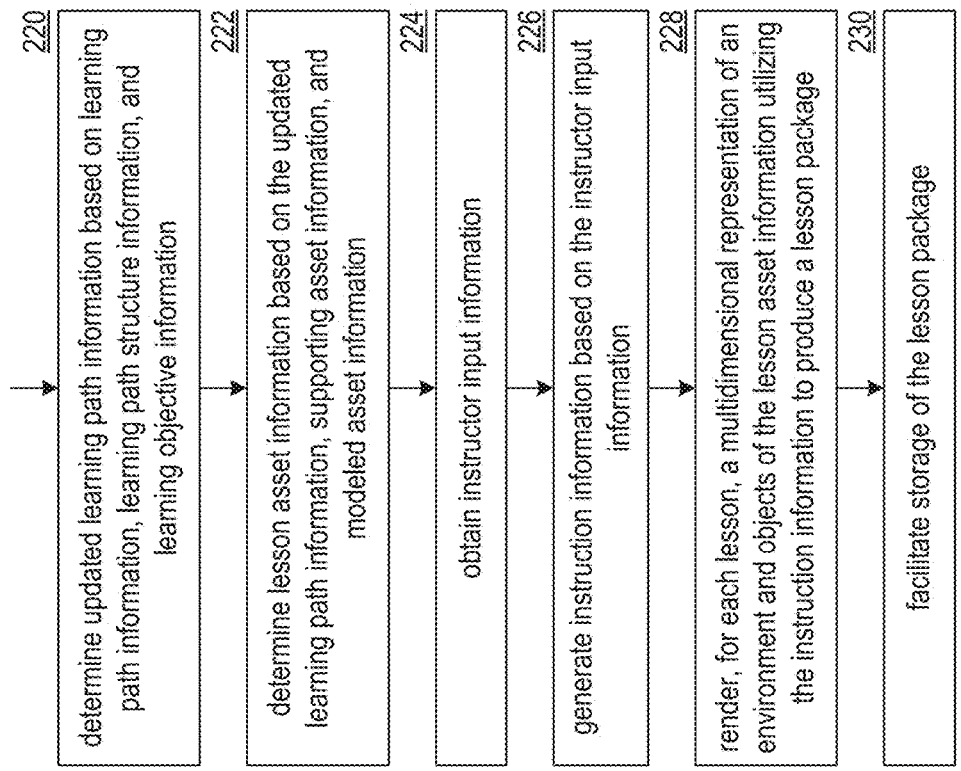
FIG. 8D is a logic diagram of an embodiment of a method for creating a learning experience within a computing system in accordance with the present invention.

FIG. 8D is a logic diagram of an embodiment of a method for creating a learning experience within a computing system (e.g., the computing system 10 of FIG. 1). In particular, a method is presented in conjunction with one or more functions and features described in conjunction with FIGS. 1-7B, and also FIGS. 8A-8C. The method includes step 220 where a processing module of one or more processing modules of one or more computing devices within the computing system determines updated learning path information based on learning path information, learning path structure information, and learning objective information. For example, the processing module combines a previous learning path with obtained learning path structure information in accordance with learning objective information to produce the updated learning path information (i.e., specifics for a series of learning objectives of a lesson).

The method continues at step 222 where the processing module determines lesson asset information based on the updated learning path information, supporting asset information, and modeled asset information. For example, processing module combines assets of the supporting asset information (e.g., received from an instructor) with assets and a place of the modeled asset information in accordance with the updated learning path information to produce the lesson asset information. The processing module selects assets as appropriate for each learning objective (e.g., to facilitate the imparting of knowledge based on a predetermination and/or historical results).

The method continues at step 224 where the processing module obtains instructor input information. For example, the processing module outputs a representation of the lesson asset information as instructor output information and captures instructor input information for each lesson in response to the instructor output information. Further obtain asset information for each learning objective (e.g., extract from the instructor input information).

The method continues at step 226 where the processing module generates instruction information based on the instructor input information. For example, the processing module combines instructor gestures and further environment manipulations based on the assessment information to produce the instruction information.

The method continues at step 228 where the processing module renders, for each lesson, a multidimensional representation of environment and objects of the lesson asset information utilizing the instruction information to produce a lesson package. For example, the processing module generates the multidimensional representation of the environment that includes the objects and the instructor interactions of the instruction information to produce the lesson package. For instance, the processing module includes a 3-D rendering of a place, background objects, recorded objects, and the instructor in a relative position XYZ world space over time.

The method continues at step 230 where the processing module facilitates storage of the lesson package. For example, the processing module indexes the one or more lesson packages of the one or more lessons of the learning path to produce indexing information (e.g., title, author, instructor identifier, topic area, etc.). The processing module stores the indexed lesson package as learning asset information in a learning assets database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 8E, 8F, 8G, 8H, 8J, and 8K are schematic block diagrams of another embodiment of a computing system illustrating another example of a method to create a learning experience. The embodiment includes creating a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the environment model database 16 of FIG. 1, the learning assets database 34 of FIG. 1, and the experience creation module 30 of FIG. 1.

Figure 8E:
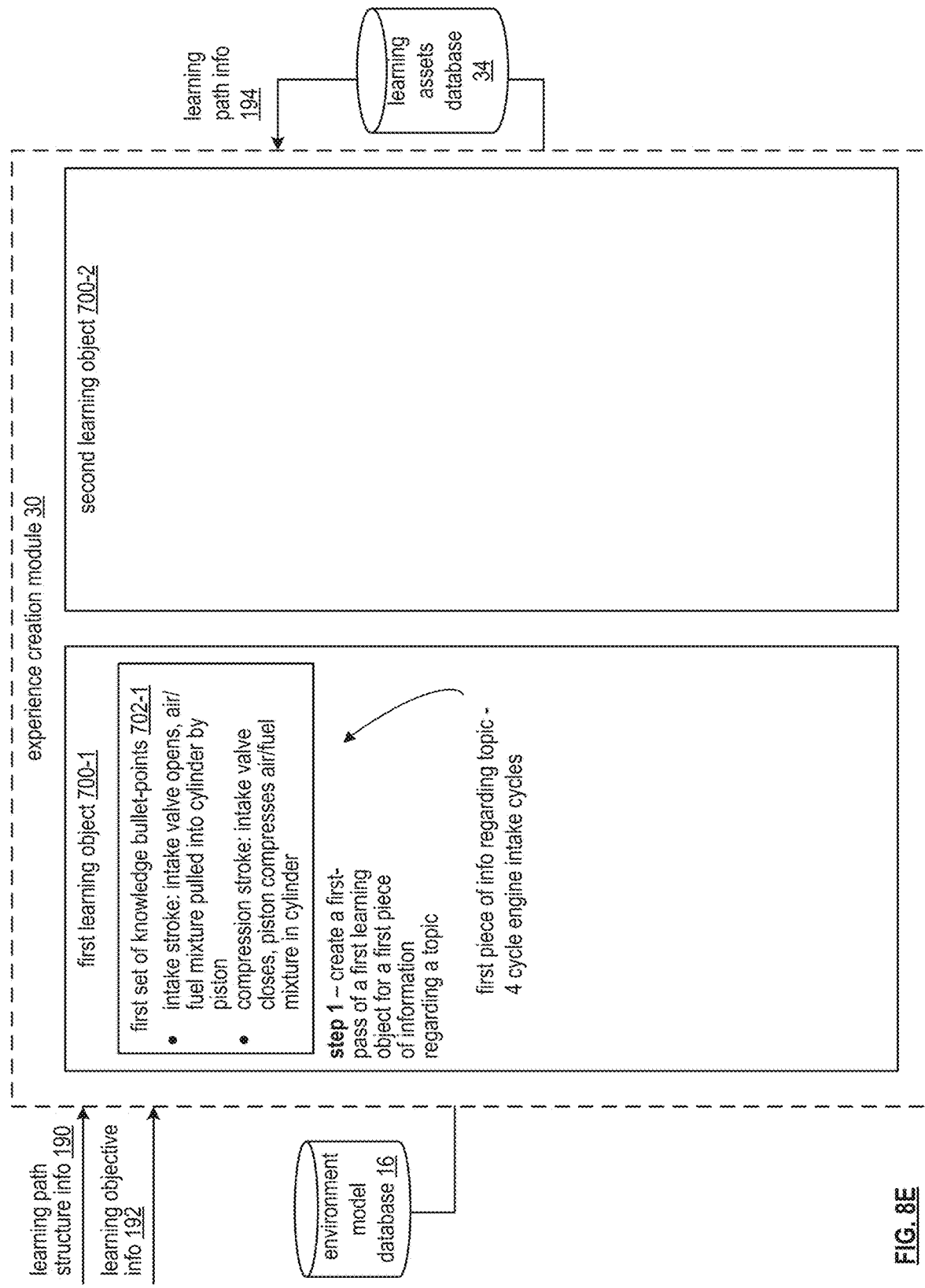

FIG. 8E illustrates the example of operation where the experience creation module 30 creates a first-pass of a first learning object 700-1 for a first piece of information regarding the topic to include a first set of knowledge bullet-points 702-1 regarding the first piece of information. The creating includes utilizing guidance from an instructor and/or reusing previous knowledge bullet-points for a related topic. For example, the experience creation module 30 extracts the bullet-points from one or more of learning path structure information 190 and learning objective information 192 when utilizing the guidance from the instructor. As another example, the experience creation module 30 extracts the bullet-points from learning path information 194 retrieved from the learning assets database 34 when utilizing previous knowledge bullet points for the related topic.

Each piece of information is to impart additional knowledge related to the topic. The additional knowledge of the piece of information includes a characterization of learnable material by most learners in just a few minutes. As a specific example, the first piece of information includes "4 cycle engine intake cycles" when the topic includes "how a 4 cycle engine works."

Each of the knowledge bullet-points are to impart knowledge associated with the associated piece of information in a logical (e.g., sequential) and knowledge building fashion. As a specific example, the experience creation module 30 creates the first set of knowledge bullet-points 702-1 based on instructor input to include a first bullet point "intake stroke: intake valve opens, air/fuel mixture pulled into cylinder by piston" and a second bullet point "compression stroke: intake valve closes, piston compresses air/fuel mixture in cylinder" when the first piece of information includes the "4 cycle engine intake cycles."

Figure 8F:
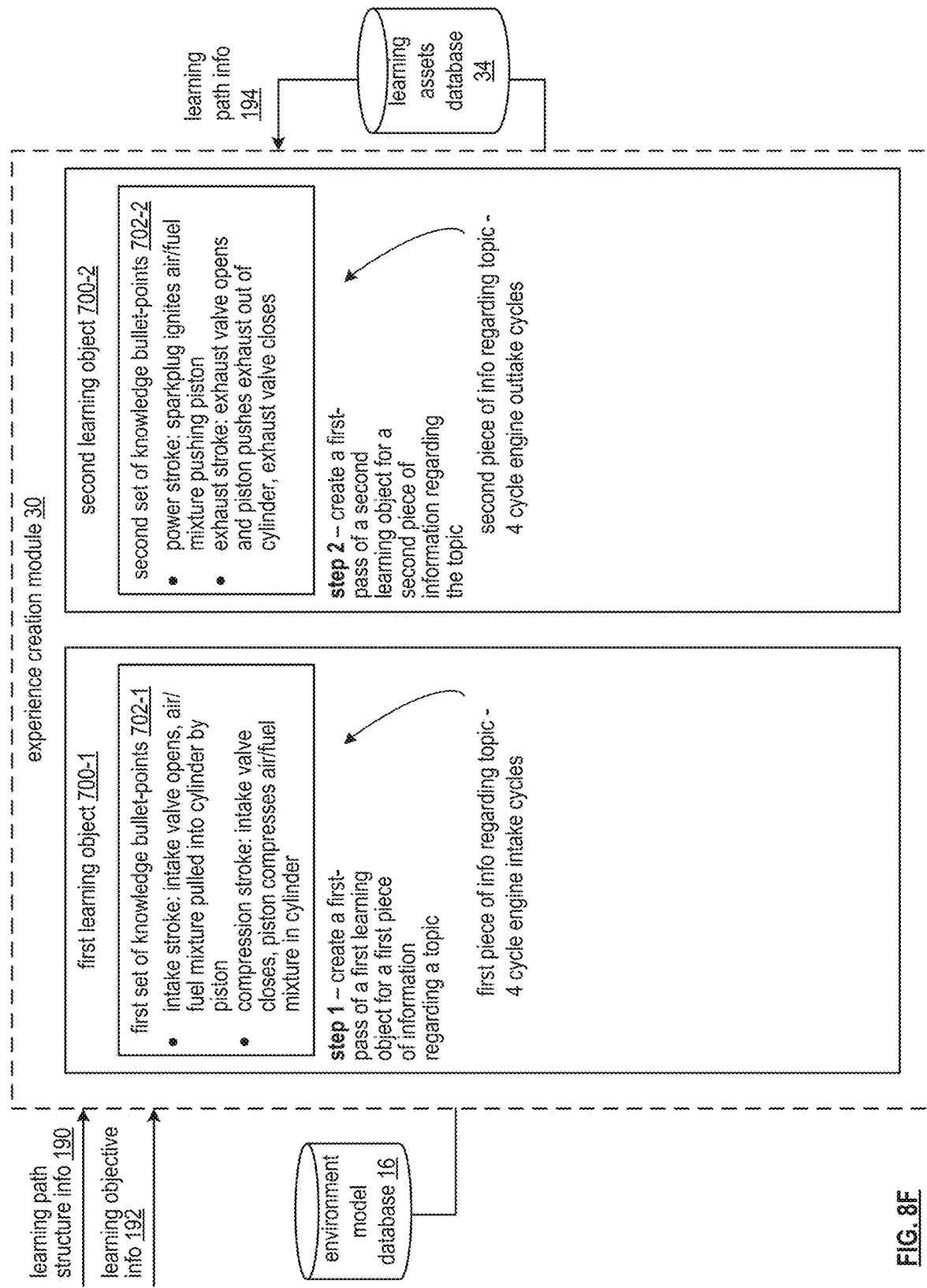

FIG. 8F further illustrates the example of operation where the experience creation module 30 creates a first-pass of a second learning object 700-2 for a second piece of information regarding the topic to include a second set of knowledge bullet-points 702-2 regarding the second piece of information. As a specific example, the experience creation module 30 creates the second set of knowledge bullet-points 702-2 based on the instructor input to include a first bullet point "power stroke: spark plug ignites air/fuel mixture pushing piston" and a second bullet point "exhaust stroke: exhaust valve opens and piston pushes exhaust out of cylinder, exhaust valve closes" when the second piece of information includes "4 cycle engine outtake cycles."

Figure 8G:
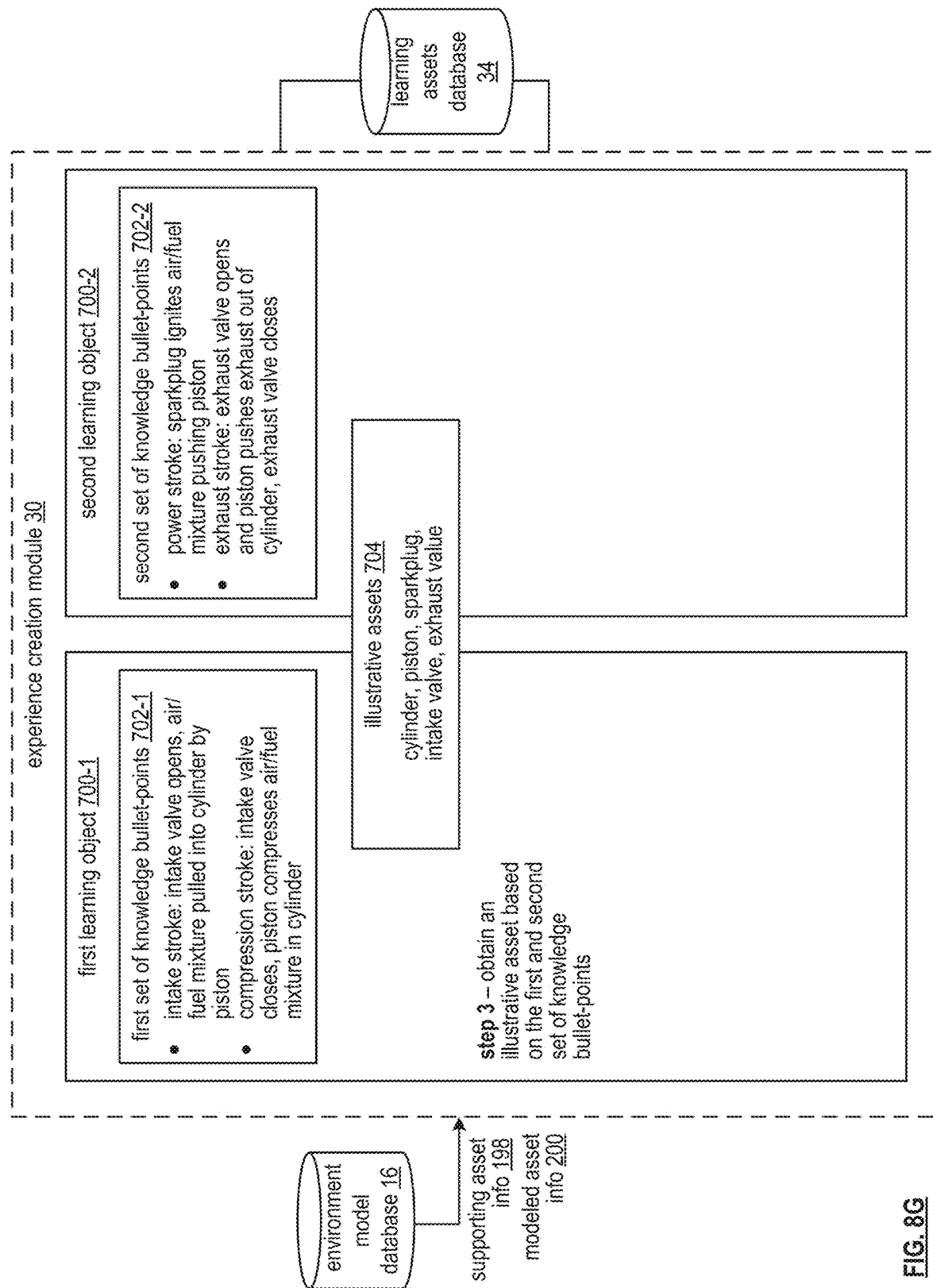

FIG. 8G further illustrates the example of operation where the experience creation module 30 obtains illustrative assets 704 based on the first and second set of knowledge bullet-points 702-1 and 702-2. The illustrative assets 704 depicts one or more aspects regarding the topic pertaining to the first and second pieces of information. Examples of illustrative assets includes background environments, objects within the environment (e.g., things, tools), where the objects and the environment are represented by multidimensional models (e.g., 3-D model) utilizing a variety of representation formats including video, scans, images, text, audio, graphics etc.

The obtaining of the illustrative assets 704 includes a variety of approaches. A first approach includes interpreting instructor input information to identify the illustrative asset. For example, the experience creation module 30 interprets instructor input information to identify a cylinder asset.

A second approach includes identifying a first object of the first and second set of knowledge bullet-points as an illustrative asset. For example, the experience creation module 30 identifies the piston object from both the first and second set of knowledge bullet-points.

A third approach includes determining the illustrative assets 704 based on the first object of the first and second set of knowledge bullet-points. For example, the experience creation module 30 accesses the environment model database 16 to extract information about an asset from one or more of supporting asset information 198 and modeled asset information 200 for a sparkplug when interpreting the first and second set of knowledge bullet-points.

Figure 8H:
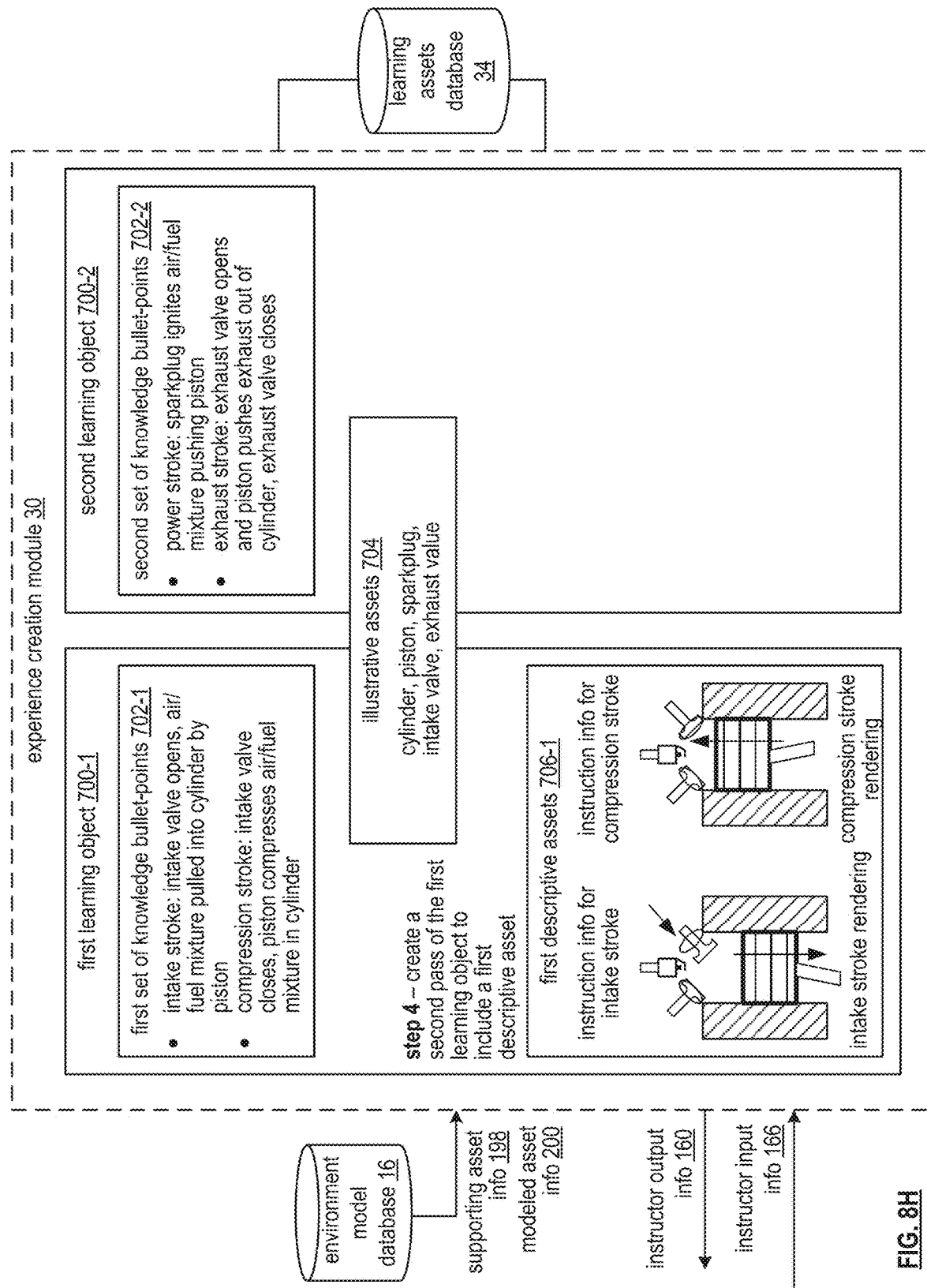

FIG. 8H further illustrates the example of operation where the experience creation module 30 creates a second-pass of the first learning object 700-1 to further include first descriptive assets 706-1 regarding the first piece of information based on the first set of knowledge bullet-points 702-1 and the illustrative assets 704. Descriptive assets include instruction information that utilizes the illustrative asset 704 to impart knowledge and subsequently test for knowledge retention. The embodiments of the descriptive assets includes multiple disciplines and multiple dimensions to provide improved learning by utilizing multiple senses of a learner. Examples of the instruction information includes annotations, actions, motions, gestures, expressions, recorded speech, speech inflection information, review information, speaker notes, and assessment information.

The creating the second-pass of the first learning object 700-1 includes generating a representation of the illustrative assets 704 based on a first knowledge bullet-point of the first set of knowledge bullet-points 702-1. For example, the experience creation module 30 renders 3-D frames of a 3-D model of the cylinder, the piston, the spark plug, the intake valve, and the exhaust valve in motion when performing the intake stroke where the intake valve opens and the air/fuel mixture is pulled into the cylinder by the piston.

The creating of the second-pass of the first learning object 700-1 further includes generating the first descriptive assets 706-1 utilizing the representation of the illustrative assets 704. For example, the experience creation module 30 renders 3-D frames of the 3-D models of the various engine parts without necessarily illustrating the first set of knowledge bullet-points 702-1.

In an embodiment where the experience creation module 30 generates the representation of the illustrative assets 704, the experience creation module 30 outputs the representation of the illustrative asset 704 as instructor output information 160 to an instructor. For example, the 3-D model of the cylinder and associated parts.

The experience creation module 30 receives instructor input information 166 in response to the instructor output information 160. For example, the instructor input information 166 includes instructor annotations to help explain the intake stroke (e.g., instructor speech, instructor pointer motions). The experience creation module 30 interprets the instructor input information 166 to produce the first descriptive assets 706-1. For example, the renderings of the engine parts include the intake stroke as annotated by the instructor.

Figure 8J:
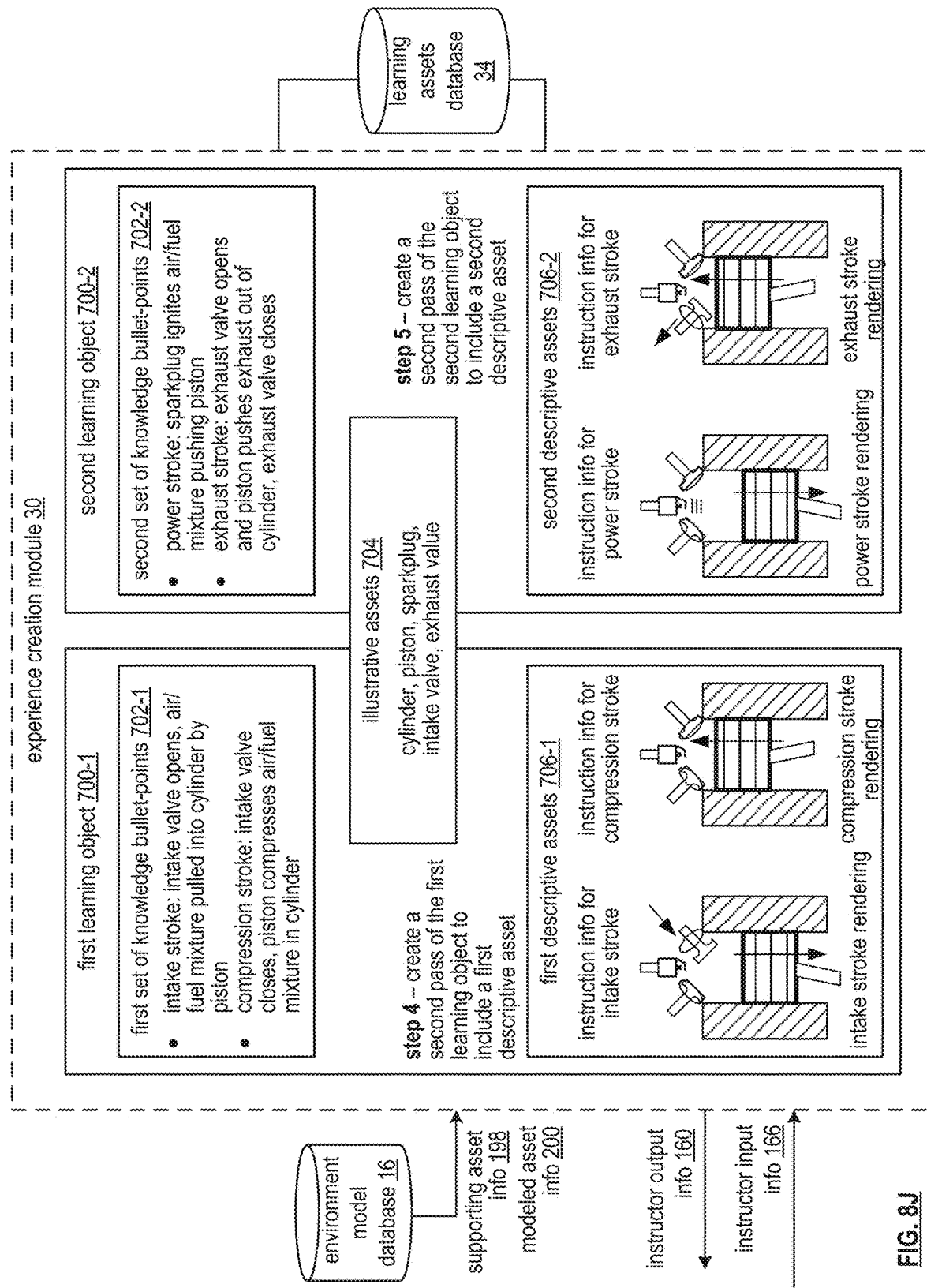

FIG. 8J further illustrates the example of operation where the experience creation module 30 creates a second-pass of the second learning object 700-2 to further include second descriptive assets 706-2 regarding the second piece of information based on the second set of knowledge bullet-points 702-2 and the illustrative assets 704. For example, the experience creation module 30 creates 3-D renderings of the power stroke and the exhaust stroke as annotated by the instructor based on further instructor input information 166.

Figure 8K:
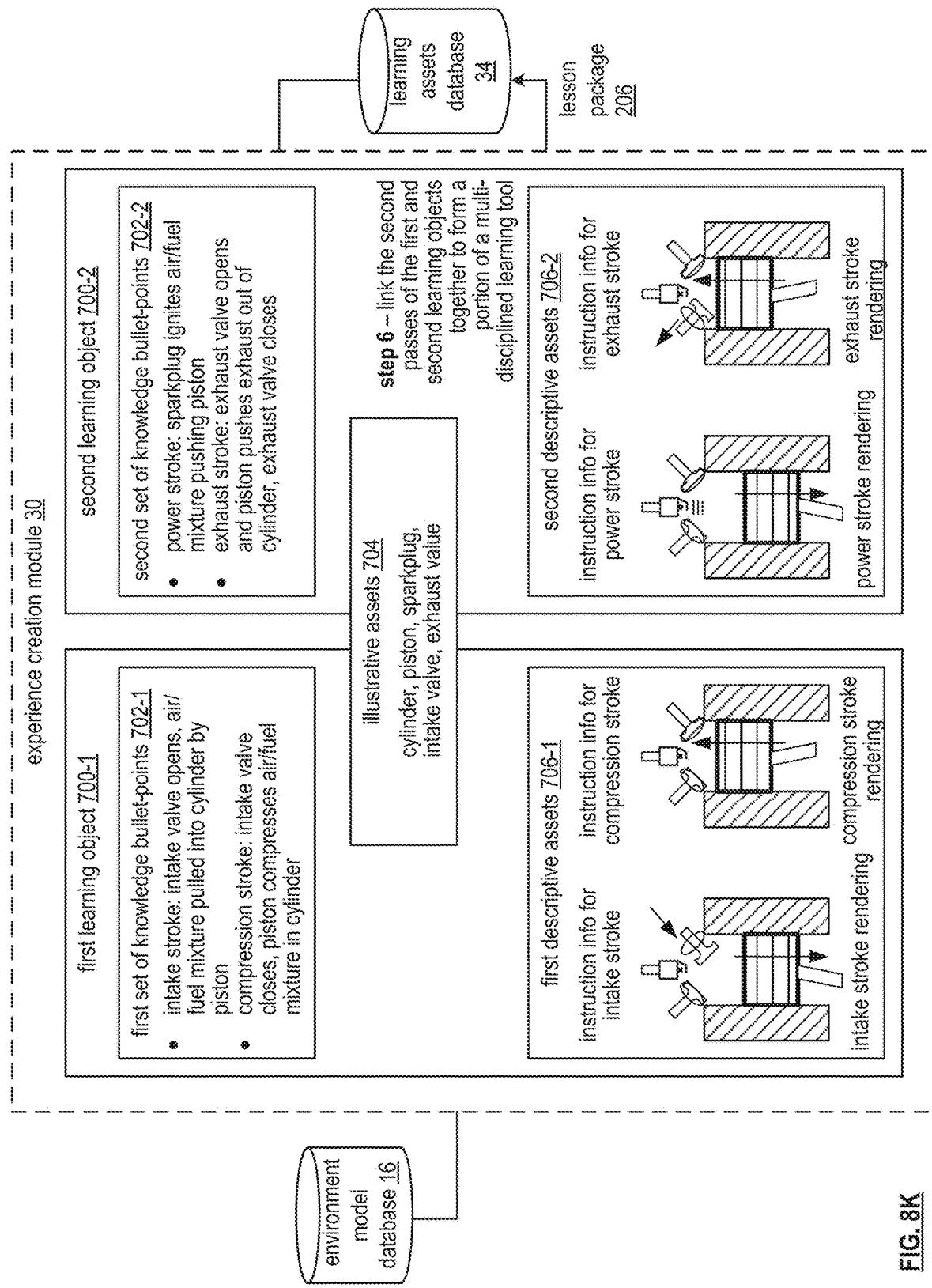

FIG. 8K further illustrates the example of operation where the experience creation module 30 links the second-passes of the first and second learning objects 700-1 and 700-2 together to form at least a portion of the multi-disciplined learning tool. For example, the experience creation module 30 aggregates the first learning object 700-1 and the second learning object 700-2 to produce a lesson package 206 for storage in the learning assets database 34.

In an embodiment, the linking of the second-passes of the first and second learning objects 700-1 and 700-2 together to form the at least the portion of the multi-disciplined learning tool includes generating index information for the second-passes of first and second learning objects to indicate sharing of the illustrative asset 704. For example, the experience creation module 30 generates the index information to identify the first learning object 700-1 and the second learning object 700-2 as related to the same topic.

The linking further includes facilitating storage of the index information and the first and second learning objects 700-1 and 700-2 in the learning assets database 34 to enable subsequent utilization of the multi-disciplined learning tool. For example, the experience creation module 30 aggregates the first learning object 700-1, the second learning object 700-2, and the index information to produce the lesson package 206 for storage in the learning assets database 34.

The method described above with reference to FIGS. 8E-8K in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause boy one or more computing devices to perform any or all of the method steps described above.

FIGS. 9A-9B are schematic block diagrams of an embodiment of an instruction module 184 of a computing system illustrating an example of creating a learning experience assessment. The instruction module 184 includes an environment generation module 240, an evaluation information module 242, and an assessment information module 244.

In an example of operation, the evaluation information module 242 interprets desire knowledge to impart of lesson asset information 202 to produce implicit evaluation information 248. The implicit evaluation information 248 includes testable points from the desire knowledge to impart.

The environment generation module 240 outputs a representation of the lesson environment based on the implicit evaluation information 248 and the lesson asset information 202 to an instructor as instructor output information 160 to facilitate capture of instructor input information 166. For example, the environment generation module 240 identifies an environment and objects associated with an aggregate of the testable points of the implicit evaluation information 248 and an environment of the lesson asset information to render an aggregate to produce the representation as instructor output information 160.

The evaluation information module 242 analyzes the instructor input information 166 to produce explicit evaluation information 250. The explicit evaluation information 250 includes further testable points, questions, correct answers to the questions, and interpreted representations of instructor interactions (e.g., instructor asking what is this, how does this interact with that, etc.). The instructor input information 166 further includes pointer motion information, text, speech, body motion, and a sequence of events and actions.

FIG. 9B further illustrates the example of operation where the assessment information module 244 generates a set of test plans based on the explicit and implicit evaluation information. For example, the assessment information module 244 consolidates test points of implicit and explicit information and integrates with questions from explicit evaluation information.

For each test point, the assessment information module 244 determines corresponding knowledge evaluation information for the lesson environment (e.g., starting viewpoint, objects, represented questions, represented demonstration such as show me) to produce assessment information 252. The assessment information 252 includes one or more of environment manipulations, answers, answer interpretation guidance, scoring information, and how to integrate questions and answers into a comprehension evaluation portion of the learning experience.

FIG. 9C is a logic diagram of an embodiment of a method for creating a learning experience assessment within a computing system (e.g., the computing system 10 of FIG. 1). In particular, a method is presented in conjunction with one or more functions and features described in conjunction with FIGS. 1-7B, and also FIGS. 9A-9B. The method includes step 260 where a processing module of one or more processing modules of one or more computing devices within the computing system interprets desire knowledge to impart to produce implicit evaluation information. For example, the processing module identifies testable points from the desired knowledge to impart.

The method continues at step 262 where the processing module outputs a representation of a lesson environment based on the implicit evaluation information as instructor output information. For example, the processing module generates a multidimensional rendering of the lesson environment to include objects associated with the testable points of the implicit evaluation information.

The method continues at step 264 where the processing module analyzes instructor input information in response to the instructor output information to produce explicit evaluation information. For example, the processing module identifies explicit questions and interprets representations of instructor interactions associated with further testable points.

The method continues at step 268 where the processing module generates a set of test points based on the explicit and implicit evaluation information. For example, the processing module consolidates test points of the implicit and explicit evaluation information and integrates with questions from the explicit question and answer information.

For each test point, the method continues at step 270 where the processing module determines corresponding knowledge evaluation information for the lesson environment to produce assessment information. For example, for each test point, the processing module determines a set of multidimensional representations of the environment and the objects as associated with the test point in accordance with a question nature and an answer nature of the test point. The determining further includes identifying scoring information based on multiple-choice or expected open answers.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 9D, 9E, 9F, and 9G are schematic block diagrams of another embodiment of a computing system illustrating another example of creating a learning experience assessment. The embodiment includes creating an assessment for a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the learning assets database 34 of FIG. 1 and the experience creation module 30 of FIG. 1.

Figure 9D:
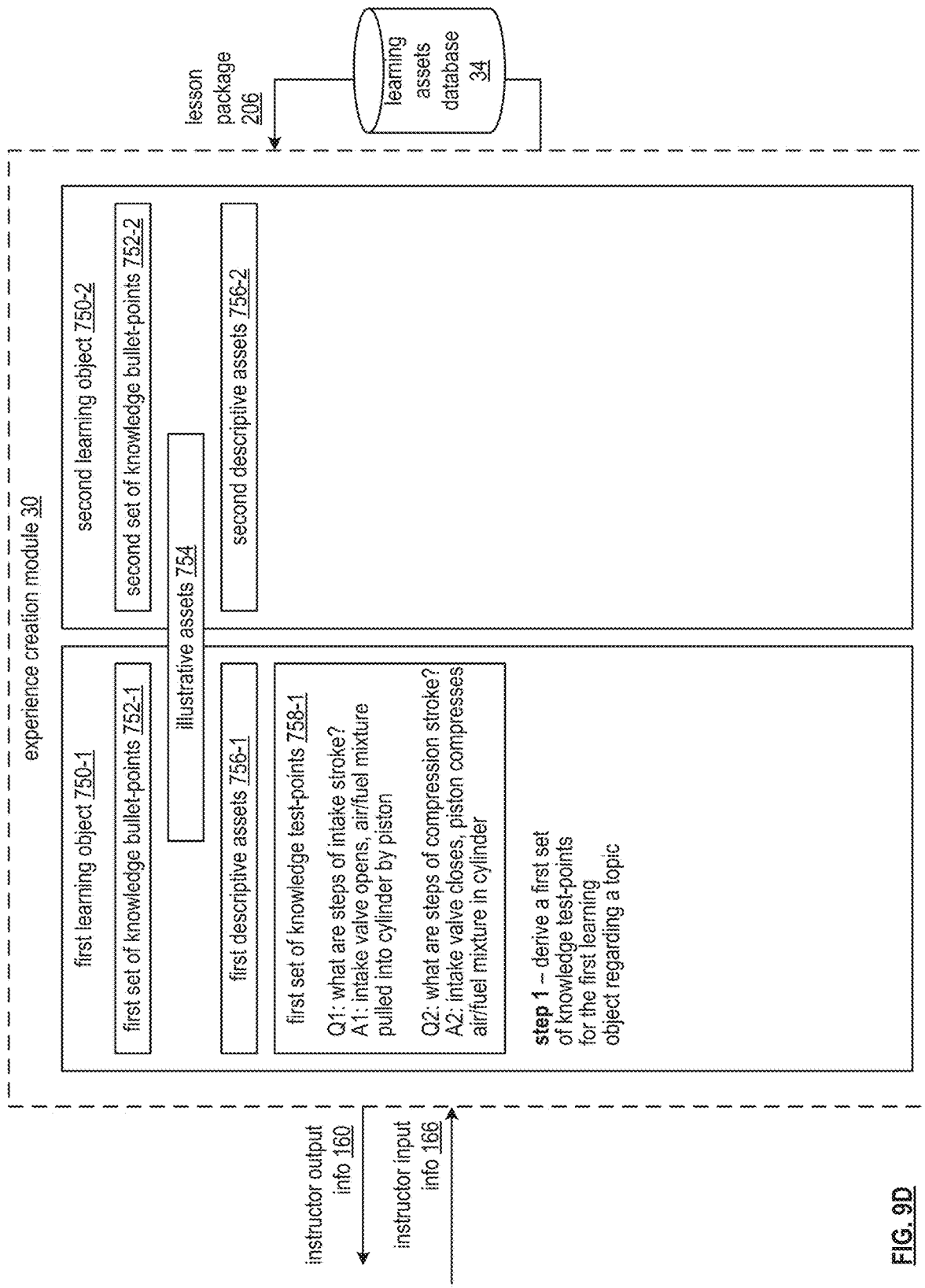

FIG. 9D illustrates the example of operation of the creating the assessment for the multi-disciplined learning tool regarding the topic where the experience creation module 30, of the computing entity 20 of FIG. 1, derives a first set of knowledge test-points 758-1 for a first learning object 750-1 regarding the topic based on a first set of knowledge bullet-points 752-1, an illustrative asset 754 and a first descriptive asset 756-1 of the first learning object 750-1. The first set of knowledge test-points 758-1 includes questions and answers to the questions, where the questions are associated with the topic.

The experience creation module 30 generates the first set of knowledge bullet-points 752-1, the illustrative asset 754, and the first descriptive asset 756-1 of the first learning object 750-1 as discussed with reference to FIGS. 8E-8K. In an embodiment, the experience creation module 30 extracts the first set of knowledge bullet-points 752-1, the illustrative asset 754, and the first descriptive asset 756-1 from lesson package 206 recovered from the learning asset database 34.

The deriving of the first set of knowledge test-points 758-1 includes utilizing guidance from an instructor and interpreting knowledge bullet-points for the topic. For example, the experience creation module 30 interprets instructor input information 166 to identify a knowledge test-point of the first set of knowledge test-points 758-1. For instance, the experience creation module 30 outputs a representation of a third knowledge bullet-point of the first set of knowledge bullet-points 752-1 as instructor output information 160 in accordance with the illustrative assets 754 and the first descriptive assets 756-1 of the first learning object 750-1 to an instructor. In response, the experience creation module 30 receives the instructor input information 166 from the instructor for the interpreting.

As another example of the deriving of the first set of knowledge test-points 758-1, the experience creation module 30 interprets a first knowledge bullet-point of the first set of knowledge bullet-points 752-1 in accordance with the illustrative asset 754 and the first descriptive assets 756-1 of the first learning object 750-1 to produce a first knowledge test-point of the first set of knowledge test-points 758-1. For instance, the experience creation module 30 generates a first question to include "what are steps of intake stroke?" and a first answer to the first question to include "intake valve opens, air/fuel mixture pulled into cylinder by piston" when the first knowledge bullet-point includes "intake stroke: intake valve opens, air/fuel mixture pulled into cylinder by piston."

As yet another example of the deriving of the first set of knowledge test-points 758-1, the experience creation module 30 interprets a second knowledge bullet-point of the first set of knowledge bullet-points 752-1 in accordance with the illustrative asset 754 and the first descriptive assets 756-1 of the first learning object 750-1 to produce a second knowledge test-point of the first set of knowledge test-points 758-1. For instance, the experience creation module 30 generates a second question to include "what are steps of intake stroke?" and a first answer to the first question to include "intake valve closes, piston compresses air/fuel mixture in cylinder" when the second knowledge bullet-point includes "compression stroke: intake valve closes, piston compresses air/fuel mixture in cylinder."

Figure 9E:
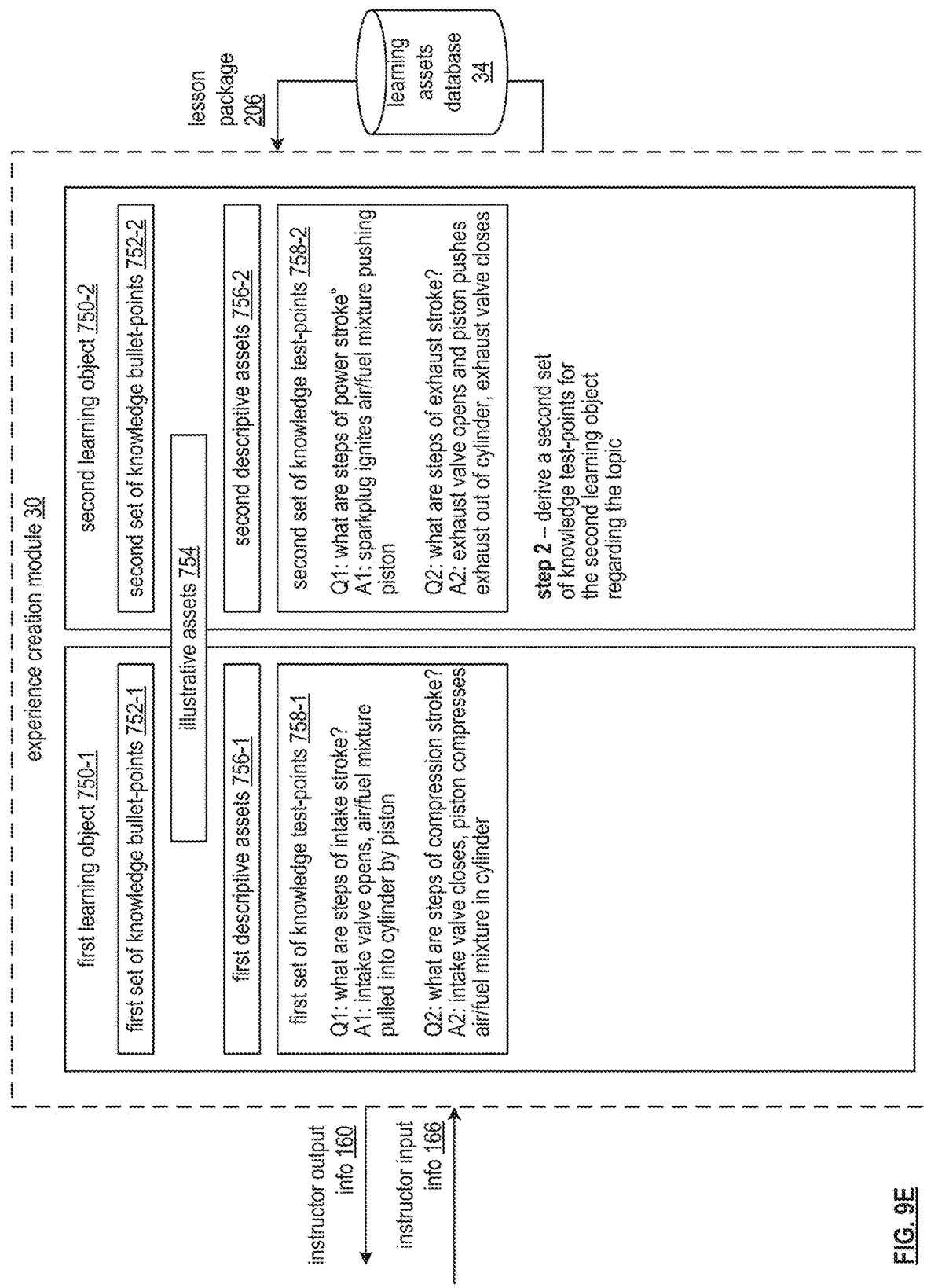

FIG. 9E further illustrates the example of operation of the creating the assessment for the multi-disciplined learning tool regarding the topic where the experience creation module 30, of the computing entity 20 of FIG. 1, derives a second set of knowledge test-points 758-2 for a second learning object 750-2 regarding the topic based on a second set of knowledge bullet-points 752-2, the illustrative asset 754, and a second descriptive asset 756-2 of the second learning object 750-2. The second set of knowledge test-points 758-2 includes questions and answers to the questions, where the questions are associated with the topic.

The experience creation module 30 generates the second set of knowledge bullet-points 752-2, the illustrative asset 754, and the second descriptive asset 756-2 of the second learning object 750-2 as discussed with reference to FIGS. 8E-8K. In an embodiment, the experience creation module 30 extracts the second set of knowledge bullet-points 752-2, the illustrative asset 754, and the second descriptive asset 756-2 from the lesson package 206 recovered from the learning asset database 34.

The deriving of the second set of knowledge test-points 758-2 includes utilizing guidance from an instructor and interpreting knowledge bullet-points for the topic. For example, the experience creation module 30 interprets instructor input information 166 to identify a knowledge test-point of the second set of knowledge test-points 758-2. For instance, the experience creation module 30 outputs a representation of a third knowledge bullet-point of the second set of knowledge bullet-points 752-2 as instructor output information 160 in accordance with the illustrative assets 754 and the second descriptive assets 756-2 of the second learning object 750-2 to an instructor. In response, the experience creation module 30 receives the instructor input information 166 from the instructor for the interpreting.

As another example of the deriving of the second set of knowledge test-points 758-2, the experience creation module 30 interprets a first knowledge bullet-point of the second set of knowledge bullet-points 752-2 in accordance with the illustrative asset 754 and the second descriptive assets 756-2 of the second learning object 750-2 to produce a first knowledge test-point of the second set of knowledge test-points 758-2. For instance, the experience creation module 30 generates a first question to include "what are steps of power stroke?" and a first answer to the first question to include "spark plug ignites air/fuel mixture pushing piston" when the first knowledge bullet-point includes "power stroke: spark plug ignites air/fuel mixture pushing piston."

As yet another example of the deriving of the second set of knowledge test-points 758-2, the experience creation module 30 interprets a second knowledge bullet-point of the second set of knowledge bullet-points 752-2 in accordance with the illustrative asset 754 and the second descriptive assets 756-2 of the second learning object 750-2 to produce a second knowledge test-point of the second set of knowledge test-points 758-2. For instance, the experience creation module 30 generates a second question to include "what are steps of exhaust stroke?" and a first answer to the first question to include "exhaust valve opens and piston pushes exhaust out of cylinder, exhaust valve closes" when the second knowledge bullet-point includes "exhaust stroke: exhaust valve opens and piston pushes exhaust out of cylinder, exhaust valve closes."

Figure 9F:
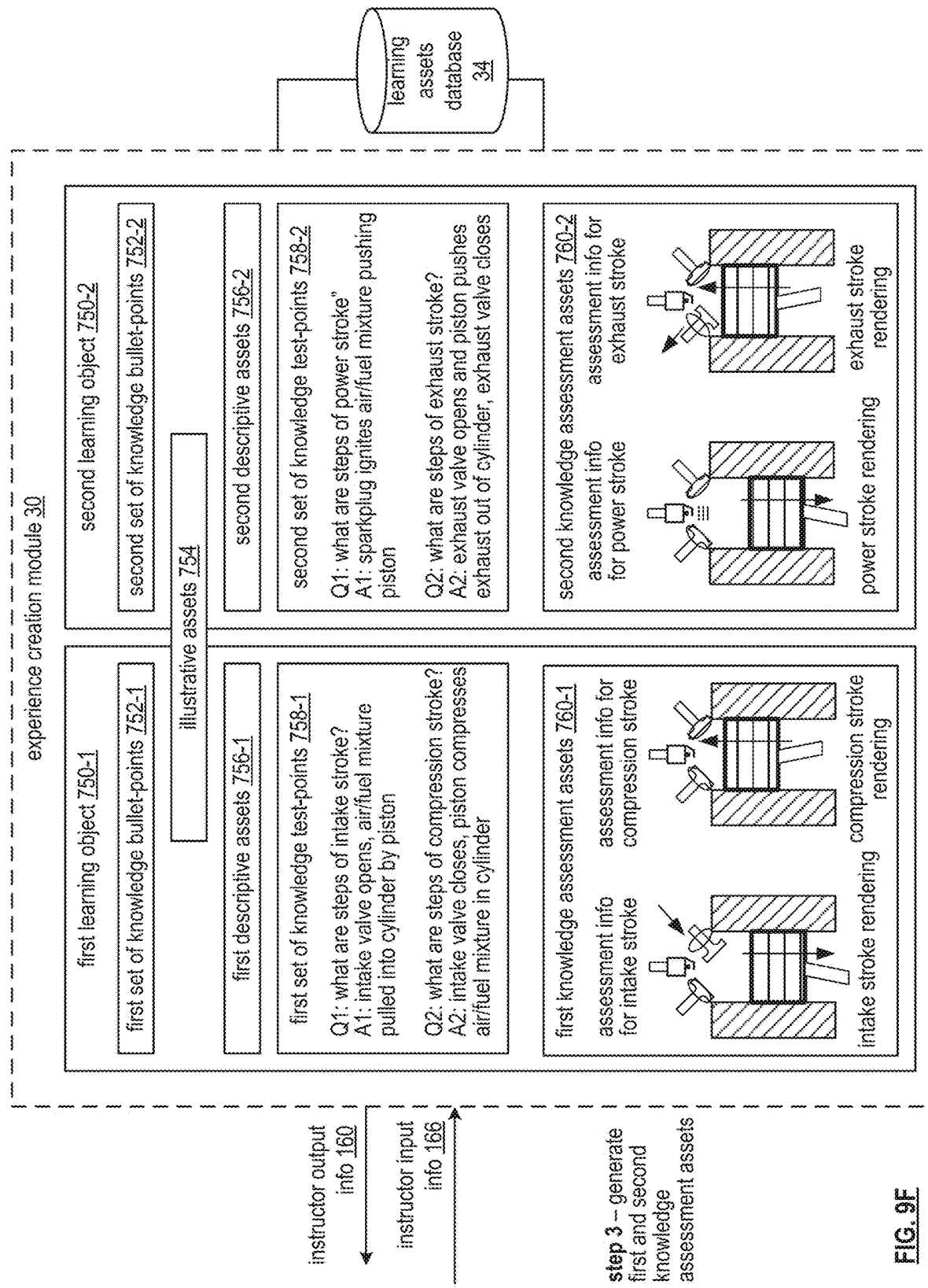

FIG. 9F further illustrates the example of operation of the creating the assessment for the multi-disciplined learning tool regarding the topic where the experience creation module 30 generates a knowledge assessment asset based on the first and second knowledge test-points 758-1 and 758-2. The knowledge assessment asset, when subsequently executed, provides a test for knowledge retention, where knowledge is imparted from the descriptive assets. The embodiments of the knowledge assessment asset includes multiple disciplines and multiple dimensions to provide improved testing of learning retention by utilizing multiple senses of a learner.

The knowledge assessment asset includes one or more of assessment information (e.g., questions and answers) for the knowledge test-points and representations (e.g., multi-dimensional renderings) of the illustrative assets 754 in accordance with the knowledge test-points. Examples of the assessment information includes assessing annotations, actions, motions, gestures, expressions, recorded speech, speech inflection information, review information, and speaker notes, instructor questions, and instructor answers. In an embodiment, the knowledge assessment asset is represented by first knowledge assessment assets 760-1 associated with the first learning object 750-1 and second knowledge assessment assets 760-2 associated with the second learning object 750-2.

The generating of the knowledge assessment asset based on the first and second knowledge test-points 758-1 and 758-2 includes a variety of approaches. A first approach include generating a first representation (e.g., rendering) of the illustrative assets 754 based on a first knowledge test-point of the first set of knowledge test-points 758-1. For example, the experience creation module 30 renders 3-D frames of a 3-D model of the cylinder, the piston, the spark plug, the intake valve, and the exhaust valve in motion performing the intake stroke. A question requests identification of the steps of the intake stroke.

A second approach of generating the knowledge assessment includes generating a first portion of the knowledge assessment asset utilizing the first representation of the illustrative asset. For example, the experience creation module 30 generates a first portion of the first knowledge assessment assets 760-1 to include the engine rendering for the intake stroke as the first representation.

A third approach of generating the knowledge assessment includes generating a second representation of the illustrative assets 754 based on a first knowledge test-point of the second set of knowledge test-points 758-2. For example, the expense module 30 renders 3-D frames of the 3-D model of the cylinder, the piston, the spark plug, the intake valve, and exhaust valve in motion performing the power stroke. A question requests identification of the steps of the power stroke.

A fourth approach of generating the knowledge assessment includes generating a second portion of the knowledge assessment asset utilizing the second representation of the illustrative asset. For example, the experience creation module 30 generates a first portion of the second knowledge assessment assets 760-2 to include the engine rendering for the power stroke as the second representation.

A fifth approach of generating the knowledge assessment includes the experience creation module 30 outputting the first and second representations of the illustrative asset as instructor output information 160 and receiving instructor input information 166 in response to the instructor output information 160. Having received the instructor input information 166, the experience creation module 30 interprets the instructor input information 166 to produce the first and second portions of the knowledge assessment asset. For example, the instructor input information 166 includes instructor annotations to pose a question with regards to the intake stroke (e.g., instructor speech, instructor pointer motions). The experience creation module 30 interprets the instructor input information 166 to produce the first knowledge assessment asset 760-1 and the second knowledge assessment assets 760-2. For example, the renderings of the engine parts include the intake stroke with a query as to the steps of the intake stroke by the instructor.

Figure 9G:
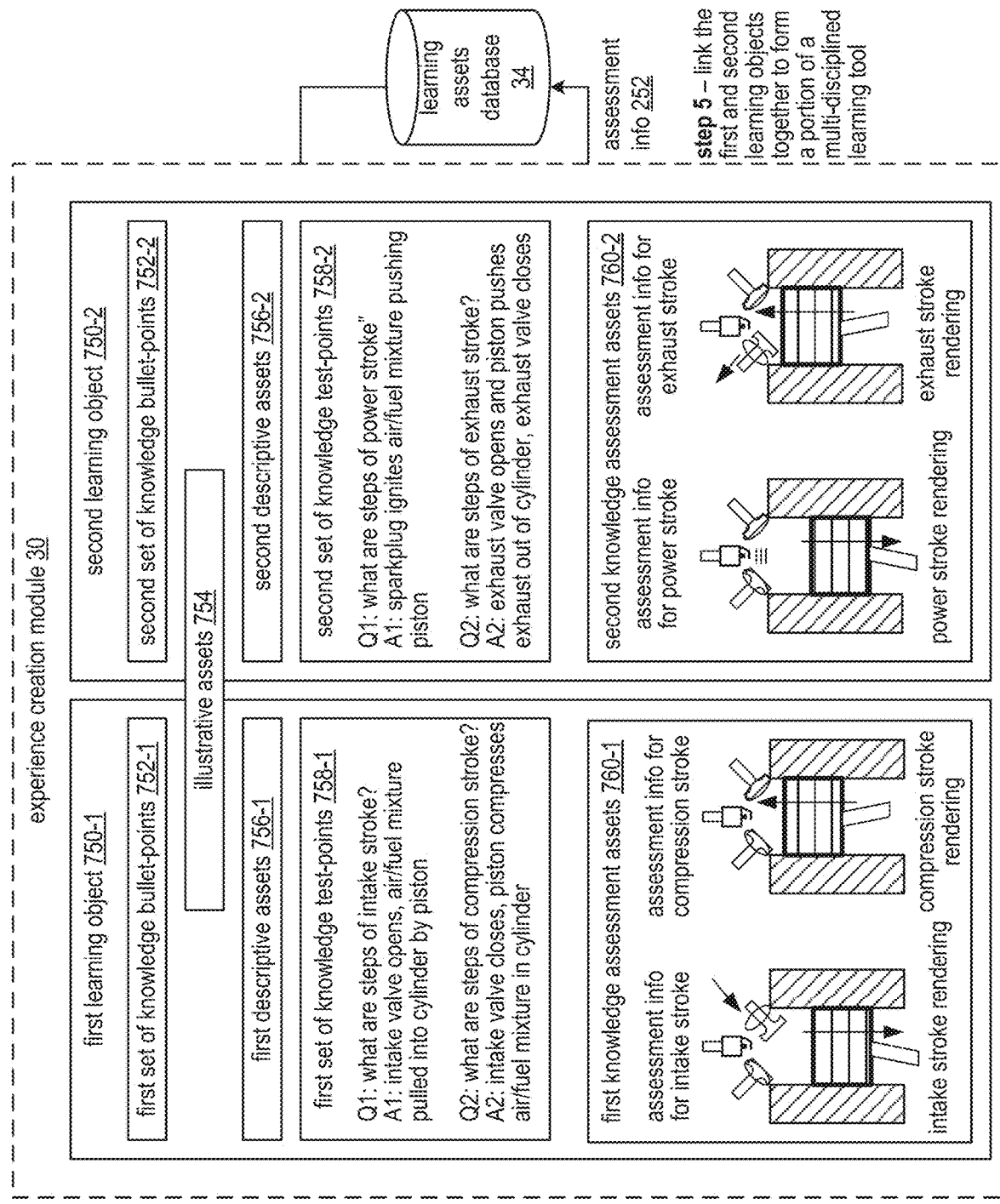

FIG. 9G further illustrates the example of operation of the creating the assessment for the multi-disciplined learning tool regarding the topic where the experience creation module 30 updates the first learning object 750-1 to include the first set of knowledge test-points 758-1 and a first portion of the knowledge assessment asset (e.g., the first knowledge assessment assets 760-1). The experience creation module 30 updates the second learning object 750-2 to include the second set of knowledge test-points 758-2 and a second portion of the knowledge assessment asset (e.g., the second knowledge assessment assets 760-2).

Having updated the first and second learning objects 750-1 and 750-2, the experience creation module 30 links the first and second learning objects 750-1 and 750-2 together to form at least a portion of the multi-disciplined learning tool. For example, the experience creation module 30 aggregates the first learning object 750-1 and the second learning object 750-2 to produce assessment information 252 for storage in the learning assets database 34.

In an embodiment, the linking of the first and second learning objects 750-1 and 750-2 together to form the at least the portion of the multi-disciplined learning tool includes generating index information for the first and second learning objects to indicate sharing of the illustrative asset 754. For example, the experience creation module 30 generates the index information to identify the first learning object 750-1 and the second learning object 750-2 as related to the same topic.

The linking further includes facilitating storage of the index information and the first and second learning objects 750-1 and 750-2 in the learning assets database 34 to enable subsequent utilization of the multi-disciplined learning tool. For example, the experience creation module 30 aggregates the first learning object 750-1, the second learning object 750-2, and the index information to produce the assessment information 252 for storage in the learning assets database 34.

The method described above with reference to FIGS. 9D-9G in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause boy one or more computing devices to perform any or all of the method steps described above.

FIGS. 10A-10B are schematic block diagrams of an embodiment of an experience execution module 32 of a computing system illustrating an example of executing a learning experience. The experience execution module 32 includes the environment generation module 240 and an instance experience module 290.

In an example of operation, the environment generation module 240 generates a baseline environment and object information 292 based on a selected lesson package 206 of learning asset information from the learning assets database 34. For example, the environment generation module 240 determines default XYZ world space positioning information for each object within the environment from the lesson package 206 of the learning asset information 48. The environment and object information 292 includes one or more of a list of objects, an identifier of the environment, positioning information of the environment, positioning information for each object, a type identifier for the environment, and type identifiers for each object.

The instance experience module 290 outputs an instance experience of the baseline environment and objects for a learner as learner output information 172. For example, the instance experience module 290 establishes an initial rendering of the instance experience (e.g., a starting viewpoint) for the environment utilizing instruction information 204 (e.g., initial instructor interactions) and the objects and outputs the learner output information 172 to the learner. Having established the initial rendering, the instance experience module 290 proceeds to play the learning experience by rendering further time frames of the learning experience and outputting the further renderings as further learner output information 172.

FIG. 10B further illustrates the example of operation where the instance experience module 290 interprets learner input information 174 from the learner to produce learning session control information. For example, the instance experience module 290 interprets the learner input information 174 with respect to the learner output information 172 to identify one or more commands (e.g., change view, zoom, and perspective, snap to a perspective viewpoint, change dimensions, i.e., two-dimensional to three-dimensional, static time, streaming time, jump to a time reference, stop, pause, rewind, fast-forward, set playback rate, set playback direction, object manipulation information, i.e., pointer position, click select, selecting learning objectives, selection of lessons, and accessing index information).

The instance experience module 290 updates the instance experience based on the learning session control information. For example, the instance experience module 290 performs one of the following based on the learner input information 174: change viewpoint, change time perception, change to another learning objective, update the baseline environment, and update object information based on learning session control information, i.e., authorize modifications of the object/environment, improve a starting position, improve ordering, etc.

The instance experience module 290 outputs the updated instance experience as further learner output information to the learner. For example, the instance experience module 290 renders the updated instance experience in accordance with the learning session control information and outputs as the further learner output information.

FIG. 10C is a logic diagram of an embodiment of a method for executing a learning experience within a computing system (e.g., the computing system 10 of FIG. 1). In particular, a method is presented in conjunction with one or more functions and features described in conjunction with FIGS. 1-7B, and also FIGS. 10A-10B. The method includes step 310 where a processing module of one or more processing modules of one or more computing devices within the computing system generates a baseline environment and objects based on a selected lesson package of learning asset information. For example, the processing module determines default XYZ positioning information of each object within the environment.

The method continues at step 312 where the processing module outputs an instance experience of the baseline environment and objects to a learner as learner output information. For example, the processing module establishes, utilizing default configuration information for the learner, a rendering of the instance experience utilizing a starting viewpoint and outputs the rendering as the learner output information to the learner.

The method continues at step 314 where the processing module interprets learner input information from the learner to produce learning session control information. For example, the processing module interprets the learner input information with respect to the learner output information to identify one or more commands.

The method continues at step 316 where the processing module updates the instance experience and baseline environment and objects based on the learning session control information. For example, the processing module performs a change of viewpoint and change of timeframe reference of the playing of the learning session.

The method continues at step 318 where the processing module outputs the updated instance experience is further learner output information to the learner. For example, the processing module renders the updated instance experience in accordance with the learner session control information and outputs the updated instance experience as the further learner output information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 10D, 10E, 10F, 10G, and 10H are schematic block diagrams of another embodiment of a computing system illustrating another example of executing a learning experience. The computing system includes the experience execution module 32 of FIG. 1 and the human interface module 18 of FIG. 1. The experience execution module 32 includes the environment generation module 240 of FIG. 10A and the instance experience module 290 of FIG. 10A.

Figure 10D:
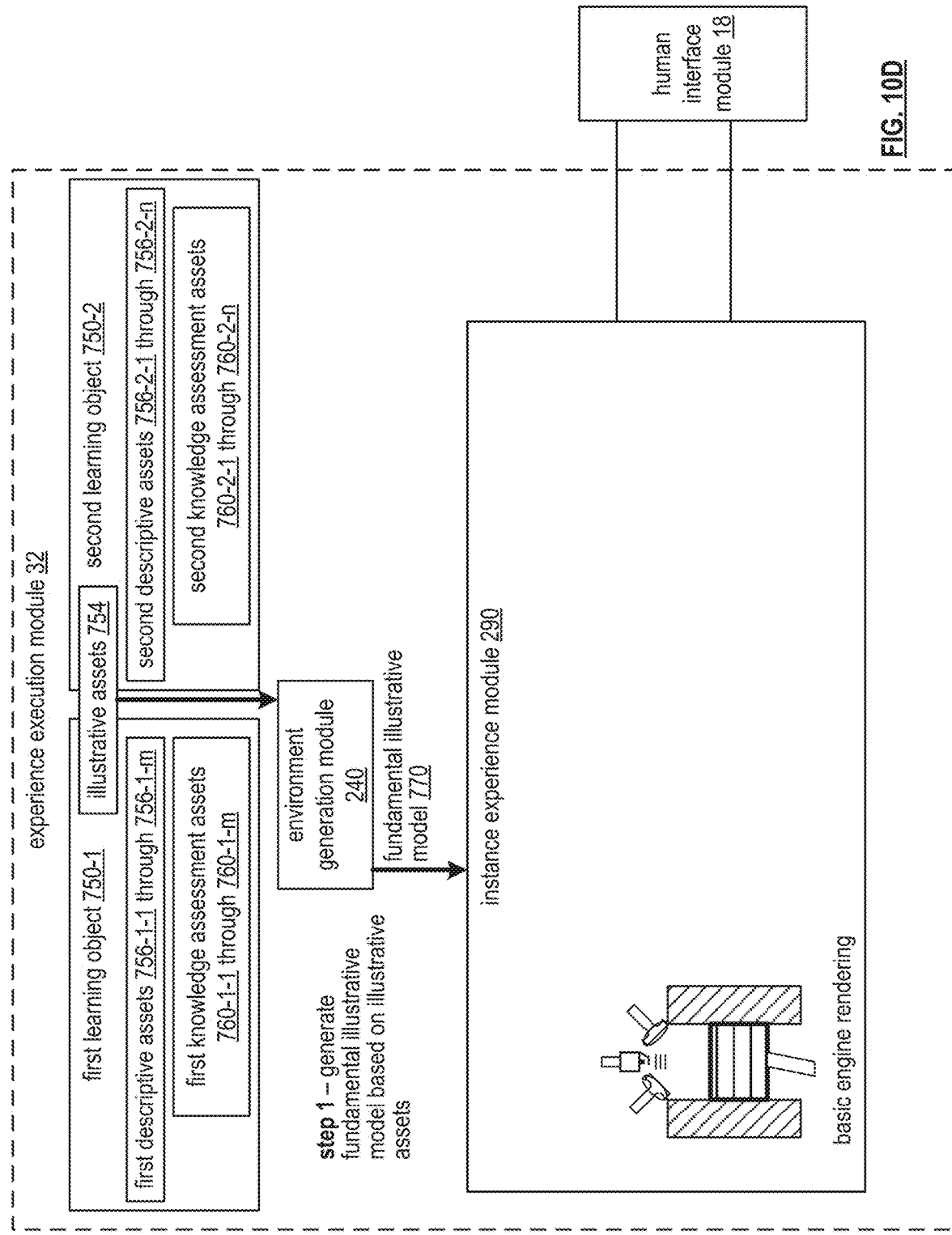

FIG. 10D illustrates an example of operation of executing of the learning experience utilizing a multi-disciplined learning tool regarding a topic where the experience execution module 32 obtains the first learning object 750-1 of FIG. 9D and the second learning object 750-2 of FIG. 9D (e.g., retrieve from the learning assets database 34 of FIG. 1) that share illustrative assets 754 of FIG. 9D. For example, the experience execution module 32 obtains the first and second learning objects when initiating the executing of the learning experience. The first learning object 750-1 includes first descriptive assets 756-1-1 through 756-1-$m$ and first knowledge assessment assets 760-1-1 through 760-1-$n$. The second learning object 750-2 includes second descriptive assets 756-2-1 through 756-2-$n$ and second knowledge assessment assets 760-2-1 through 760-2-$n$.

Having accessed the illustrative assets 754, the environment generation module 240 generates a fundamental illustrative model 770 based on the illustrative assets 754 of a lesson that includes a plurality of learning objects (e.g., at least the first and second learning objects 750-1 and 750-2). The plurality of learning objects are created based on at least one illustrative asset of the illustrative assets 754. An illustrative asset depicts an aspect regarding the topic pertaining to information associated with the first and second learning objects 750-1 and 750-2.

The generating of the fundamental illustrative model 770 includes a series of steps. A first step includes identifying first and second illustrative assets of the illustrative assets 754. For example, interpreting objects. Another example includes extracting objects.

A second step includes generating a first multi-dimensional representation of the first illustrative asset. For example, a three-dimensional model is rendered. A third step includes generating a second multi-dimensional representation of the second illustrative asset (e.g., another three-dimensional model).

A fourth step includes integrating the first multi-dimensional representation of the first illustrative asset and the second multi-dimensional representation of the second illustrative asset to produce the fundamental illustrative model. For example, the environment generation module 240 scales the representations together. As another example, the representations are aggregated. As yet another example, the environment generation module 240 selects common dimensionality for the representations. In an instance, the environment generation module 240 produces a three-dimensional basic engine rendering of multiple objects that make up the engine (e.g., cylinder walls, piston, valves, spark plug).

Figure 10E:
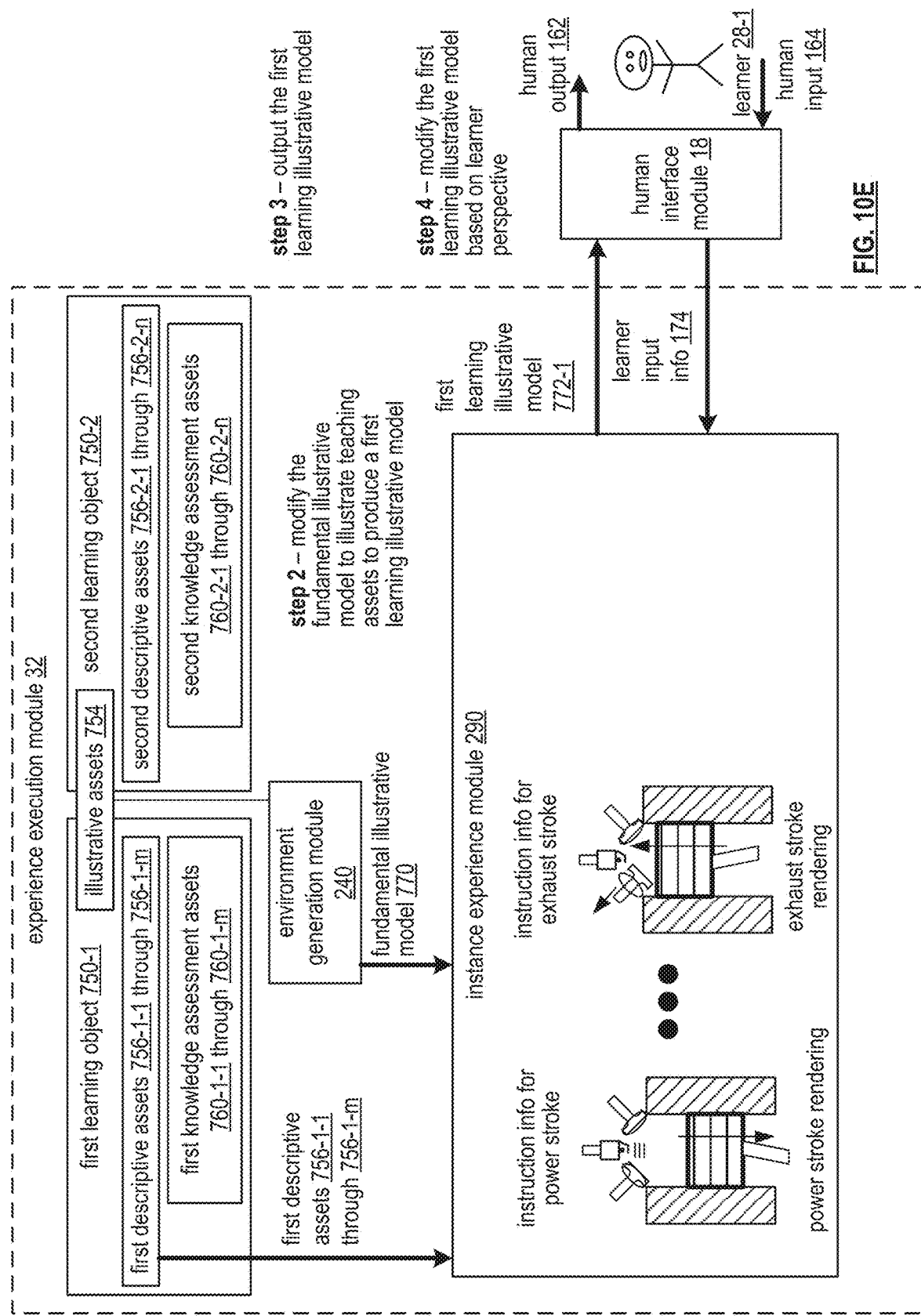

FIG. 10E further illustrates the example of operation of the executing of the learning experience where the instance experience module 290 modifies the fundamental illustrative model 770 to illustrate a first set of teaching assets of the first learning object of the plurality of learning objects to produce a first learning illustrative model 772-1. Teaching assets includes descriptive assets and knowledge assessment assets.

The modifying of the fundamental illustrative model 770 to illustrate the first set of teaching assets of the first learning object 750-1 to produce the first learning illustrative model 772-1 includes one or more of the following steps. A first step includes identifying a first descriptive asset 756-1-1 of the first learning object 750-1 as part of the first set of teaching assets. For instance, identifying a next first descriptive asset in a sequential identification approach where the next first descriptive asset pertains to instruction information for the power stroke of the engine. Another instance includes interpreting learner input information 174 to select a particular first descriptive asset (e.g., direct access within the range of 1-m).

An alternative first step includes identifying a first knowledge assessment asset 760-1-1 of the first learning object 750-1 as part of the first set of teaching assets. For instance, identifying a next first knowledge assessment asset in a sequential identification approach when performing an assessment and receiving responses as learner input information 174 (e.g., answers to the assessment) where the next first knowledge assessment asset pertains to assessment information for the end take stroke as further discussed with reference to FIG. 10F. Another instance includes interpreting the learner input information 174 to select a particular first knowledge assessment asset (e.g., direct access within the range of 1-m).

A second step includes generating a multi-dimensional representation of the teaching assets. For example, the instance experience module 290 renders a three-dimensional model of the teaching assets. A third step includes integrating the multi-dimensional representation of the teaching assets and the fundamental illustrative model 770 to produce the first learning illustrative model 772-1. The integrating includes one or more of scaling, aggregating, and selecting a common dimensionality.

Having produced the first learning illustrative model 772-1, the instance experience module 290 outputs the first learning illustrative model 772-1 to a computing entity associated with the learner 28-1 of FIG. 1. For example, the instance experience module 290 outputs the first learning illustrative model 772-1 to the human interface module 18 of the computing entity and the human interface module 18 formats the first learning illustrative model 772-1 to produce human output 162 for the learner 28-1.

In response to the human output 162, the human interface module 18 receives human input 164 (e.g., to manipulate a viewpoint and perspective for the learner 28-1, to control a pace of the learning experience). When receiving input to manipulate the perspective, the integrating of the multi-dimensional representation of the teaching assets and the fundamental illustrative model to produce the first learning illustrative model 772-1 includes further steps. A first further step includes determining a learner perspective. For example, the instance experience module 290 interprets the learner input information 174 to identify when the learner 28-1 is turning their head or moving a pointer to change the perspective.

A second further step includes modifying the first learning illustrative model based on the learner perspective. For example, the instance experience module 290 re-renders the first learning illustrative model 772-1 in accordance with the learner perspective to update the first learning illustrative model 772-14 further outputting, via the human interface module 18, as human output 162 to the learner 28-1. For instance, the learner 28-1 continues the learning experience by viewing the three-dimensional representation of the engine from a top view versus a side view.

FIG. 10F further illustrates the example of operation of the executing of the learning experience where the instance experience module 290 modifies the fundamental illustrative model 770 to illustrate a second set of teaching assets of the first learning object 750-1 to produce a second learning illustrative model 772-2. For example, further descriptive assets. As another example, further first knowledge assessment assets 760-1-1 through 760-1-$m$ such as renderings of assessment information with regards to the intake stroke and the compression stroke of the engine.

Having produced the second learning illustrative model 772-2, the instance experience module 290 outputs the second learning illustrative model 772-2 to the computing entity associated with the learner 28-1. For example, the instance experience module 290 outputs the second learning illustrative model 772-2 to the human interface module 18 and the human interface module 18 produces human output 162 for the learner 28-1 based on the second learning illustrative model 772-2.

Having output the second learning illustrative model 772-2, the instance experience module 290 indicates to produce a third learning illustrative model when detecting one or more enablement conditions. A first enablement condition includes completion of outputting the second learning illustrative model 772-2 to the computing entity associated with the learner 28-1. For example, the instance experience module 290 detects that a desired number of descriptive and/or knowledge assessment assets of the first learning object 750-1 has been utilized to produce the output (e.g., ran through all of the assets of the first learning object).

A second enablement condition includes an advancement indicator from the computing entity associated with the learner 28-1. For example, the instance experience module 290 interprets learner input information 174 which indicates that the learner 28-1 desires to move from the first of the second learning object.

A third enablement condition include a favorable assessment of learner comprehension associated with the first learning object 750-1. For example, the instance experience module 290 performs a comprehension assessment based on learner input information 174 received in response to outputting of the learner illustrative model associated with the first knowledge assessment assets.

Figure 10G:
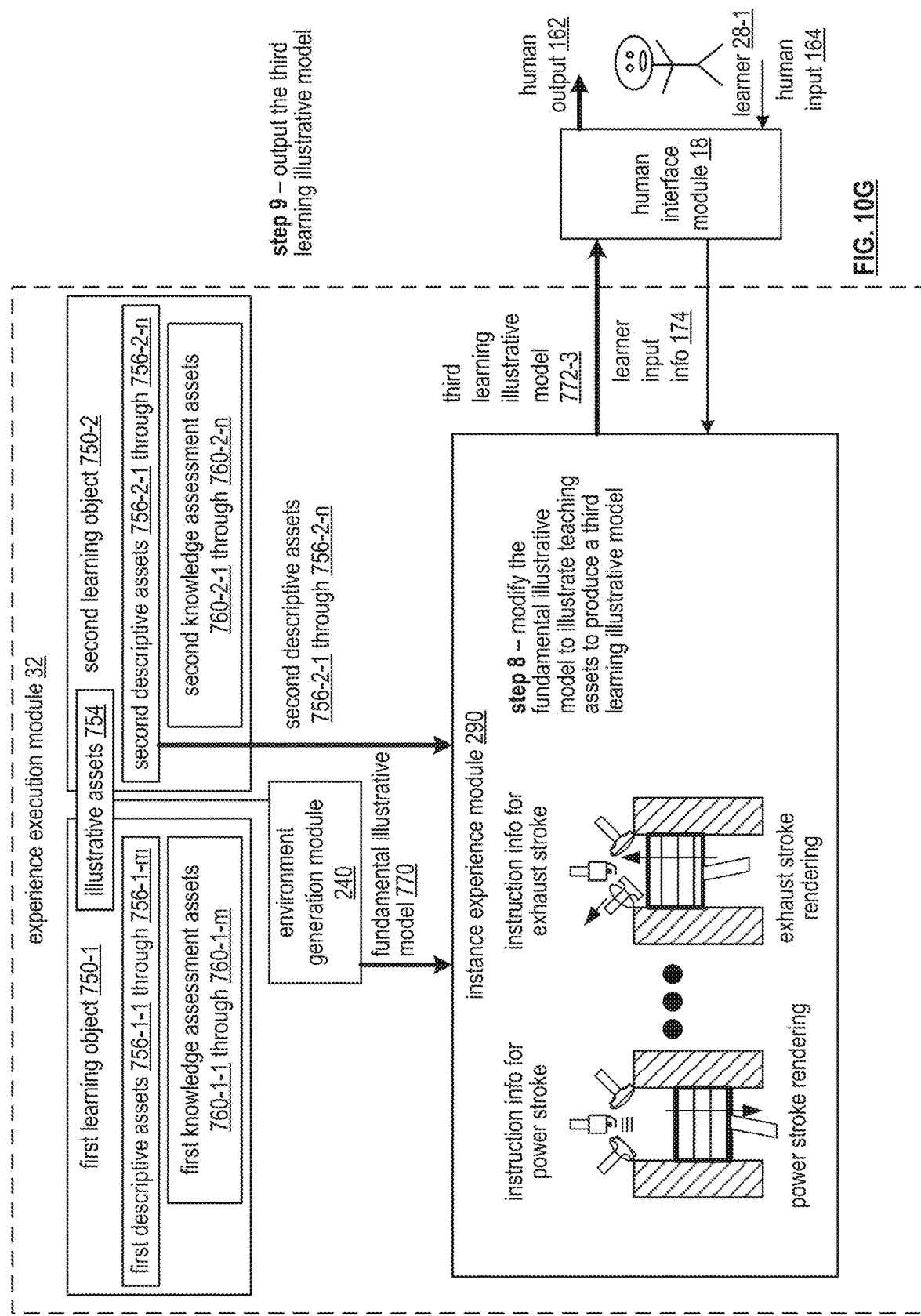

FIG. 10G further illustrates the example of operation of the executing of the learning experience where, having completed utilization of the first learning object 750-1, the instance experience module 290 modifies the fundamental illustrative model 770 to illustrate a third set of teaching assets of the second learning object 750-2 of the plurality of learning objects to produce a third learning illustrative model 772-3. The third set of teaching assets includes the second descriptive asset 756-2-1 through 756-2-*n* and the second knowledge assessment asset 760-2-1 through 760-2-*n*. For example, the instance experience module 290 modifies the fundamental illustrative model 770 to illustrate the second descriptive assets 756-2-1 through 756-2-*n* to produce the third learning illustrative model 772-3 when portraying one or more three-dimensional renderings of instruction information for the power stroke and the exhaust stroke of the engine.

Having produced the third learning illustrative model 772-3, the instance experience module 290 outputs the third learning illustrative model 772-3 to the computing entity associated with the learner 28-1. For example, the instance expense module 290 outputs the third learning illustrative model 772-3 to the human interface module 18. The human interface module 18 formats the third learning illustrative model 772-3 into the human output 162.

While outputting the third learning illustrative model 772-3, the instance experience module 290 interprets learner input information 174 based on human input 164 to modify the third learning illustrative model 772-3 to accommodate an updated perspective desired by the learner 28-1 (e.g., a view of the engine from a different side). For example, having produced the updated third learning illustrative model 772-3, the instance expense module 290 outputs the third learning illustrative model 772-3, based on the updating, to the human interface module 18.

Figure 10H:
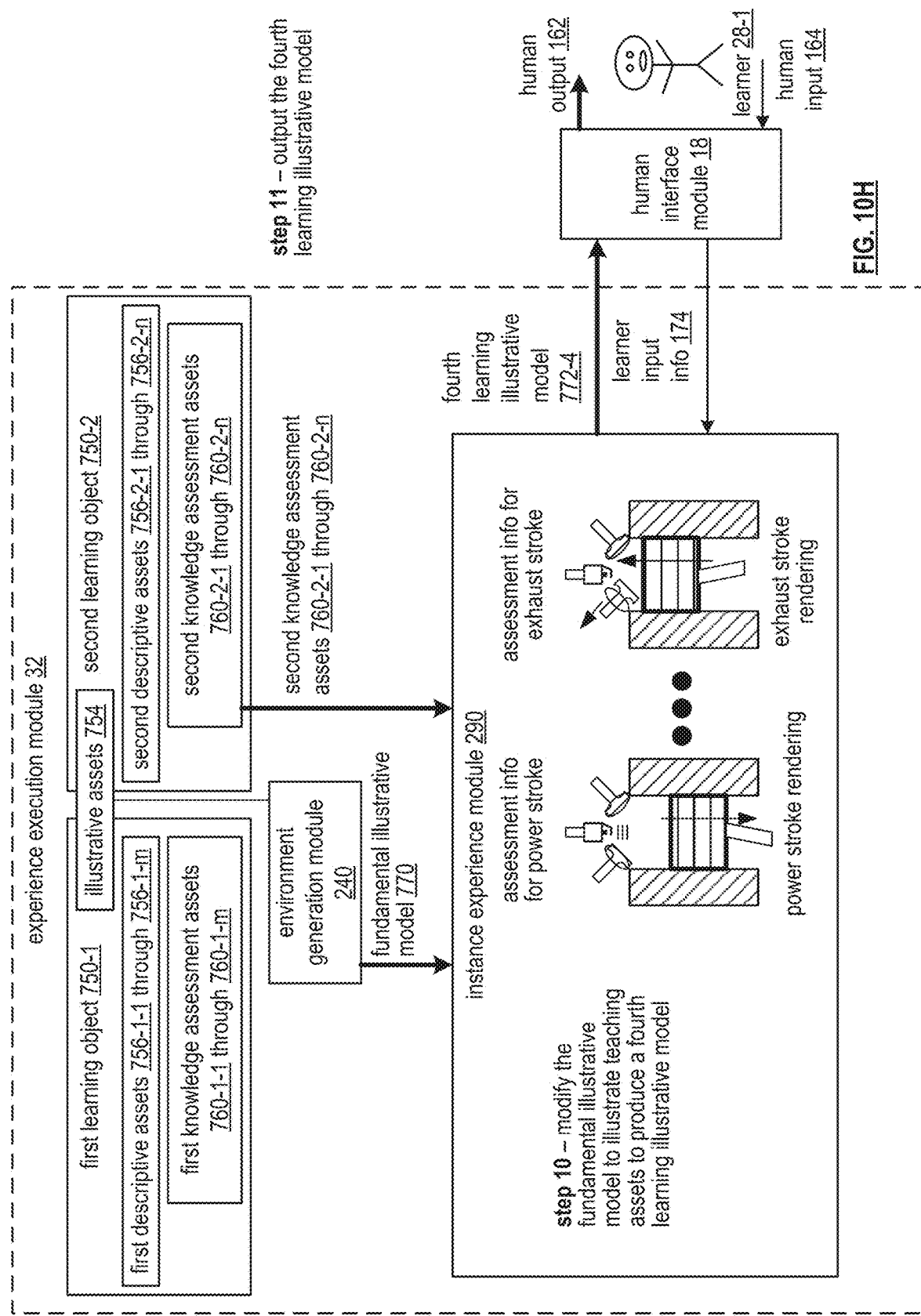

FIG. 10H further illustrates the example of operation of the executing of the learning experience where the instance experience module 290 modifies the fundamental illustrative model 770 to illustrate a fourth set of teaching assets of the second learning object 750-2 to produce a fourth learning illustrative model 772-4. For example, the instance experience module 290 detects that the outputting of the learning illustrative model based on the second descriptive assets has been completed and modifies the fundamental illustrative model 770 to illustrate the second knowledge assessment assets 760-2-1 through 760-2-*n* to produce the fourth learning illustrative model 772-4 with regards to assessment information associated with the power stroke and the exhaust stroke of the engine.

Having produced the fourth learning illustrative model 772-4, the instance experience module 290 outputs the fourth learning illustrative model 772-42 the computing entity associated with the learner 28-1. For example, the instance expense module 290 outputs the fourth learning illustrative model 772-4 to the human interface module 18. The human interface module 18 formats the fourth learning illustrative model 772-4 into the human output 162.

While outputting the fourth learning illustrative model 772-4, the instance experience module 290 interprets learner input information 174 based on human input 164 to modify the fourth learning illustrative model 772-4 to accommodate an updated perspective desired by the learner 28-1 (e.g., a view of the engine from a different angle). For example, having produced the updated fourth learning illustrative model 772-4, the instance expense module 290 outputs the fourth learning illustrative model 772-4, based on the updating, to the human interface module 18.

Alternatively, or in addition to, while outputting the fourth learning illustrative model 772-4, the instance experience module 290 interprets the learner input information 174 as answers to assessment queries to produce an assessment of comprehension of the second descriptive assets. For example, the instance experience module 290 interprets the learner input information 174 to point to the exhaust valve when the associated query asks which valve is the exhaust valve of the engine.

FIGS. 11A-11B are schematic block diagrams of another embodiment of an experience execution module 32 of a computing system illustrating an example of assessing execution of a learning experience. The experience execution module 32 includes the environment generation module 240, the instance experience module 290, and a learning assessment module 330. FIG. 11A illustrates an example of operation where the instance experience module 290 outputs a representation of a lesson package 206 within a learning environment with objects to a learner as learner output information 172. For example, the instance experience module 290 generates the representation utilizing baseline environment an object information 292 along with instruction information 204 of the lesson package 206 of the learning asset information 48. The instance experience module 290 outputs the representation as the learner output information 172 to the learner to initiate the execution of a lesson.

The instance experience module 290 collects lesson interactions. For example, the instance experience module 290 further updates the representation of the lesson package based on learner input information 174 (i.e., change view based on updated session control information from the learner), functionality and/or time correlated learner input information to the learner output information to produce correlated lesson learner input information. The correlated lesson learner input information includes timestamp to session control information, time stamped object manipulation information, and time stamped direct input such as text, speech, etc.

FIG. 11B further illustrates the example of operation where the instance experience module 290 outputs a representation of assessment information 252 of the lesson package 206 to the learner as further learner output information. For example, the instance experience module 290 generates the representation utilizing the baseline environment and object information 292 and assessment information 252 (i.e., questions etc.) and outputs the representation as the further learner output information.

The instance experience module outputs learner interaction information based on the lesson interactions and collected assessment interactions. For example, the instance experience module 290 further updates the representation of the assessment information based on learner input information 174 (i.e., change view) and functionality and/or time correlated further learner input information to the further learner output information to produce correlated assessment learner input information (i.e., time stamped manipulation and answer information). The instance experience module 290 further combines the correlated lesson learner input information and the correlated assessment learner input information to produce the learner interaction information.

The learning assessment module 330 generates learning assessment results information 334 based on the lesson interactions of the learner interaction information 332, the assessment information 252 and the assessment interactions of the learner interaction information 332. The learning assessment results information 334 includes one or more of learner identifier, learning objective identifier, a lesson identifier, and raw learner interaction information (i.e., time-stamp record of all learner interactions like points, speech, input text, settings, viewpoints, etc.).

The learning assessment results information 334 further includes summarized learner interaction information. For example, averages and tallies of the row interaction information, i.e., how much time per question, how much time spent looking at a view of a learning objective, how fast did the learner proceed, what were the answers given by the learner to the questions, which questions were answered incorrectly, which questions were answered correctly, etc.

The generating of the learning assessment results information 334 includes summarizing correlated lesson learner input information of the collected lessons interactions, summarizing the correlated assessment learner input information, and storing the learner assessment results information in the learning assets database 34 to enable subsequent improved learning effectiveness. The improvements include modifying a pace of execution of a lesson, modifying an order of learning objectives within a lesson, modifying an order of lessons within a module, and modifying a default view of the environment for a subsequent lesson experience.

FIG. 11C is a logic diagram of an embodiment of a method for assessing execution of a learning experience within a computing system (e.g., the computing system 10 of FIG. 1). In particular, a method is presented in conjunction with one or more functions and features described in conjunction with FIGS. 1-7B, and also FIGS. 11A-11B. The method includes step 350 where a processing module of one or more processing modules of one or more computing devices within the computing system outputs a representation of a lesson package within a learning environment to a learner as learner output information. For example, the processing module generates the representation utilizing baseline environment and object information along with construction information and outputs the representation as the learner output information to the learner (i.e., initiate a lesson).

The method continues at step 352 where the processing module collects lesson interactions from the learner. For example, the processing module further updates the representation of a lesson package based on learner input information and correlates learner input information to the learner output information to produce correlated lesson learner input information.

The method continues at step 354 where the processing module outputs a representation of assessment information within the learning environment to the learner as further learner output information. For example, the processing module generates the representation utilizing the baseline environment, object information and the assessment information. The processing module outputs a representation as the further learner output information.

The method continues at step 356 where the processing module generates learner interaction information based on the lesson interactions and collected assessment interactions from the learner. For example, the processing module further updates the representation of the assessment information based on learner input information, and time correlates further learner input information to the further learner output information to produce correlated assessment learner input information. The processing module combines the correlated lesson learner input information and the correlated assessment learner input information to produce the learner interaction information.

The method continues at step 358 where the processing module generates learning assessment results information based on the lesson interactions, assessment information, and the assessment interactions, where the learning assessment output information is utilized to enhance a subsequent lesson package. For example, the processing module summarizes correlated lesson learner input information of the collected lesson interactions and summarizes the correlated assessment learner input information. The processing module stores the learning asset results information in a learning assets database to enable subsequent improved learning effectiveness (e.g., modify the pace of a lesson, modify ordering of learning objectives, and modify a default view of the environment for a subsequent lesson experience).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 11D and 11E are schematic block diagrams of another embodiment of a computing system illustrating another example of assessing learning experience retention (e.g., assessing learning comprehension). The computing system includes the experience execution module 32 of FIG. 1 and the human interface module 18 of FIG. 1. The experience execution module 32 includes the environment generation module 240 of FIG. 10A and the instance experience module 290 of FIG. 10A.

FIG. 11D illustrates an example of operation of assessing learning comprehension regarding a topic where, the instance experience module 290 modifies a fundamental illustrative model 770 to illustrate a first set of teaching assets of (e.g., of first teaching assets 780-1) of a first learning object 750-1 to produce a first learning illustrative model. The fundamental illustrative model 770 is based on illustrative assets 754 (e.g., representations of a cylinder wall, a piston, valves, etc.) of a lesson that includes the plurality of learning objects (e.g., including the first learning object 750-1 and a second learning object 750-2).

The instance experience module 290 outputs the first learning illustrative model to a second computing entity (e.g., the human interface module 18). For example, the instance experience module 290 generates the fundamental illustrative model 770 based on the illustrative asset 754, modifies the fundamental illustrative model 770 to depict multidimensional aspects of the engine example intake stroke and compression stroke to produce the first learning illustrative model, and outputs, via the human interface module 18, the first learning illustrative model as human output 162 to the learner 28-1.

FIG. 11D further illustrates steps of a method of the example of operation of assessing learning comprehension regarding a topic where, in a first step, the experience execution module 32 modifies the fundamental illustrative model 770 to illustrate a first set of assessment assets (e.g., of first assessment asset 782-1) of the first learning object 750-1 of the plurality of learning objects to produce a first assessment illustrative model 784. The producing of the first assessment illustrative model 784 includes one or more sub-steps. A first sub-step includes identifying a first teaching asset of the first learning object 750-1 as part of the first set of assessment assets. For instance, the instance experience module 290 identifies aspects of knowledge to demonstrate to the learner 28-1 with regards to the intake stroke and the compression stroke.

A second sub-step includes identifying a first assessment asset of the first learning object 750-1 as part of the first set of assessment assets. For example, the instance experience module 290 identifies comprehension testing items associated with the intake stroke and the compression stroke. A third sub-step includes generating a multi-dimensional representation of the first set of assessment assets. For example, the instance experience module 290 renders a three-dimensional model.

A fourth sub-step includes integrating the multi-dimensional representation of the first set of assessment assets and the fundamental illustrative model 770 to produce the first assessment illustrative model 784. For example, the instance experience module 290 scales the representations together. As another example, the representations are aggregated. As yet another example, the instance experience module 290 selects common dimensionality for the representations. For instance, the instance experience module 290 produces a three-dimensional basic engine rendering of multiple objects that make up the engine (e.g., cylinder walls, piston, valves, spark plug) poised to capture a response from the learner 28-1 to test comprehension level.

Having produced the first assessment illustrative model 784, the experience execution module 32 obtains a first assessment response for the first assessment illustrative model 784. The obtaining of the first assessment response includes a second step of the method of the example of operation of assessing learning comprehension regarding the topic, where the experience execution module 32 outputs the first assessment illustrative model 784 to the second computing entity. For instance, the instance experience module 290 outputs the first assessment illustrative model 784 to the human interface module 18, where the human interface module 18 sends human output 162 to the learner 28-1 based on the first assessment illustrative model 784.

Having output the first assessment illustrative model 784, in a third step of the method of the example of operation the experience execution module 32 receives the first assessment response from the second computing entity in response to the first assessment illustrative model 784. For example, the instance experience module 290 interprets learner input information 174 from the human interface module 18 to produce the first assessment response (e.g., performing tasks such as pointing to various aspects of the intake and compression strokes and/or answering questions).

Having received the first assessment response, the experience execution module 32 updates the first assessment illustrative model 784 based on the first assessment response. For example, the instance experience module 290 interprets cursor movements from the learner input information 174 and re-renders the first assessment illustrative model 784 based on the cursor movements.

Having obtained the first assessment response, the experience execution module 32 indicates that the first assessment response is favorable when detecting one or more conditions. A first condition includes detecting completion of outputting the first assessment illustrative model to the second computing entity. For example, move forward with the lesson when the questions have been asked.

A second condition includes detecting an advancement indicator from the second computing entity. For example, move forward when the learner 28-1 indicates so. A third condition includes detecting a favorable learner comprehension level based on the first assessment response. For example, the instance experience module 290 evaluates the first assessment response by comparing the first assessment response to correct answers associated with the first assessment assets 782-1. The instance experience module 290 indicates the favorable learner comprehension level when the first assessment response compares favorably to the correct answers (e.g., a minimum threshold number of learner answers are correct).

Having received the first assessment response, the experience execution module 32 further generates a first evaluation based on the first assessment response and the first set of assessment assets. For example, the instance experience module 290 generates the first evaluation based on the comparing of the first assessment response to the correct answers associated with the first assessment assets 782-1. The first evaluation includes one or more of a list of correctly answered questions, a percentage of correctly answered questions, a list of incorrectly answered questions, and evaluation score, a pass fail indicator, and a lesson completion indicator.

Having generated the first evaluation, the experience execution module 32 outputs the first evaluation to another computing entity (e.g., a computing entity associated with the learner 28-1 to provide feedback). Having generated the first evaluation, the experience execution module 32 further updates a database record associated with a learner utilizing the first evaluation. For example, the instance experience module 290 identifies the database record associated with the learner 28-1 of the learning assets database 34 of FIG. 1 and modifies the identified database record to indicate performance of the learner 28-1 with regards to the learning comprehension of aspects of the first learning illustrative model (e.g., the intake and compression strokes of the engine).

FIG. 11E illustrates further steps of the method of the example of operation of assessing learning comprehension regarding a topic where, when the first assessment response is favorable, the experience execution module 32 outputs a second learning illustrative model to the second computing entity. The fundamental illustrative model 770 is modified to illustrate a second set of teaching assets (e.g., of second teaching assets 780-2) of the second learning object 750-2. For example, the instance experience module 290 modifies the fundamental illustrative model 770 to illustrate aspects of the power and exhaust strokes to produce the second learning illustrative model for output via the human interface module 18 to the learner 28-1 as human output 162.

Having output the second learning illustrative model when the first assessment response is favorable, in a fourth step of the method of the example of operation, the instance experience module 290 modifies the fundamental illustrative model 770 to illustrate a second set of assessment assets (e.g., assessment aspects of the power and exhaust strokes of second assessment assets 782-2) of the second learning object 750-2 to produce a second assessment illustrative model 790.

Having produced the second assessment illustrative model 790, in a fifth step of the method of the example of operation, the instance experience module 290 outputs the second assessment illustrative model 790, via the human interface module 18 to the learner 28-1 as human output 162. For example, the learner 28-1 visualizes renderings of questions associated with the power and exhaust strokes.

Having output the second assessment illustrative model 790, in a sixth step of the method of the example of operation, the instance experience module 290 obtains a second assessment response for the second assessment illustrative model. For example, the instance experience module 290 interprets learner input information 174 from the human interface module 18 based on human input 164 from the learner 28-1 to produce the second assessment response (e.g., answers to questions to test comprehension of the power and exhaust strokes).

The method described above in conjunction with the experience execution module 32 can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12A-12B are schematic block diagrams of another embodiment of an experience execution module 32 of a computing system illustrating another example of executing a learning experience. The experience execution module 32 includes the environment generation module 240, the instance experience module 290, and the learning assessment module 330.

FIG. 12A illustrates an example of operation where the instance experience module 290 generates an initial representation of a lesson package 206 utilizing a baseline environment and object information 292 to output learner output information 172 to a learner. The environment generation module 240 generates the baseline environment and object information 292 based on the lesson package 206 recovered from the learning assets database 34.

The learning assessment module 330 selects an experience perception approach. The approaches include a manual approach where session control information from the learner takes control, a current adaptive session approach where adaptations to improve effectiveness of current real-time based on interactions of the learner, and a historical session adaptive approach where adaptations are based on historical learning assessment results information 370 (e.g., historical records of learning assessment results information including effectiveness information).

For example, the learning assessment module 330 selects manual when a session control information input from the learner indicates manual. As another example, the learning assessment module 330 selects current session adaptive when an effectiveness indicator associated with a set of experience perception parameters are below a minimum effectiveness threshold level. As yet another example, the learning assessment module 330 selects the historical session adaptive approach when an effectiveness indicator associated with a particular experience perception parameters set of historical learning assessment results information 370 is greater than the minimum effectiveness threshold level.

When the experience perception approach is manual, the instance experience module 290 modifies a current representation of the lesson package utilizing session control information from the learner interaction information from the learner. For example, the learning assessment module 330 updates a viewpoint of the representation based on repositioning information from the learner.

FIG. 12B further illustrates the example of operation where, when the experience perception approach is current session adaptive, the instance experience module modifies the current representation of the lesson package based on an effectiveness assessment of the current session. For example, the learning assessment module 330 determines an effectiveness level of the current session based on one or more of instruction information, assessment information 252, and learner interaction information 332 to provide session control adaptation information 372.

The instance experience module 290 updates the current representation of the lesson package utilizing the session control adaptation information 372 (e.g., update the viewpoint of the representation based on a previously utilized viewpoint that is associated with a favorable effectiveness level). Favorable effectiveness includes obtaining more correct answers, completing a lesson in less time, and skipping more learning objectives when possible.

When the experience perception approach is historical session adaptive, the instance experience module 290 modifies the current representation of the lesson package based on the historical learning assessment results information 370. For example, the learning assessment module 330 identifies a particular experience perception parameters set of the historical learning assessment results information 370 to produce the session control adaptation information 372. The instance experience module 290 updates the current representation of the lesson package utilizing the session control adaptation information 372. For example, the instance experience module 290 updates a viewpoint of the representation based on a historically utilized viewpoint that is associated with a favorable effectiveness level.

FIG. 12C is a logic diagram of another embodiment of a method for executing a learning experience within a computing system (e.g., the computing system 10 of FIG. 1). In particular, a method is presented in conjunction with one or more functions and features described in conjunction with FIGS. 1-7B, and also FIGS. 12A-12B. The method includes step 390 where a processing module of one or more processing modules of one or more computing devices within the computing system generates an initial representation of a lesson package to output learner output information to a learner. For example, the processing module utilizes baseline environment and object information to render the initial representation for output as the learner output information.

The method continues at step 392 where the processing module selects an experience perception approach. For example, the processing module selects manual when a session control information input from the learner indicates manual. As another example, the processing module selects current session adaptive when an effectiveness indicator associated with a set of experience perception parameters are below a minimum effectiveness threshold level. As yet another example, the processing module selects historical session adaptive when an effectiveness indicator associated with a particular experience perception parameters set of historical learning assessment results information is greater than the minimum effectiveness threshold level.

When the experience perception approach is manual, the method continues at step 394 where the processing module modifies a current representation of the lesson package utilizing session control information of learner interaction information from the learner. For example, the processing module updates a viewpoint of the representation based on repositioning information from the learner.

When the experience perception approach is current session adaptive, the method continues at step 396 where the processing module modifies the current representation of the lesson package utilizing an effectiveness assessment of a current session. For example, the processing module determines an effectiveness level of the current session based on one or more of instruction information, assessment information, and learner interaction information to produce session control adaptation information. The processing module utilizes the session control adaptation information to update the current representation of the lesson package.

When the experience perception approach is historical session adaptive, the method continues at step 398 where the processing module modifies the current representation of the lesson package utilizing historical learning assessment results information. For example, the processing module identifies a particular experience perception parameters set of the historical learning assessment results information to produce the session control adaptation information. The processing module updates the current representation of the lesson package utilizing the session control adaptation information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12D-12G are schematic block diagrams of another embodiment of a computing system illustrating an example of improving learning comprehension of a lesson within the computing system. The computing system includes the experience execution module 32 of FIG. 1 and the human interface module 18 of FIG. 1. The experience execution module 32 includes the environment generation module 240 of FIG. 10A and the instance experience module 290 of FIG. 10A.

Figure 12D:
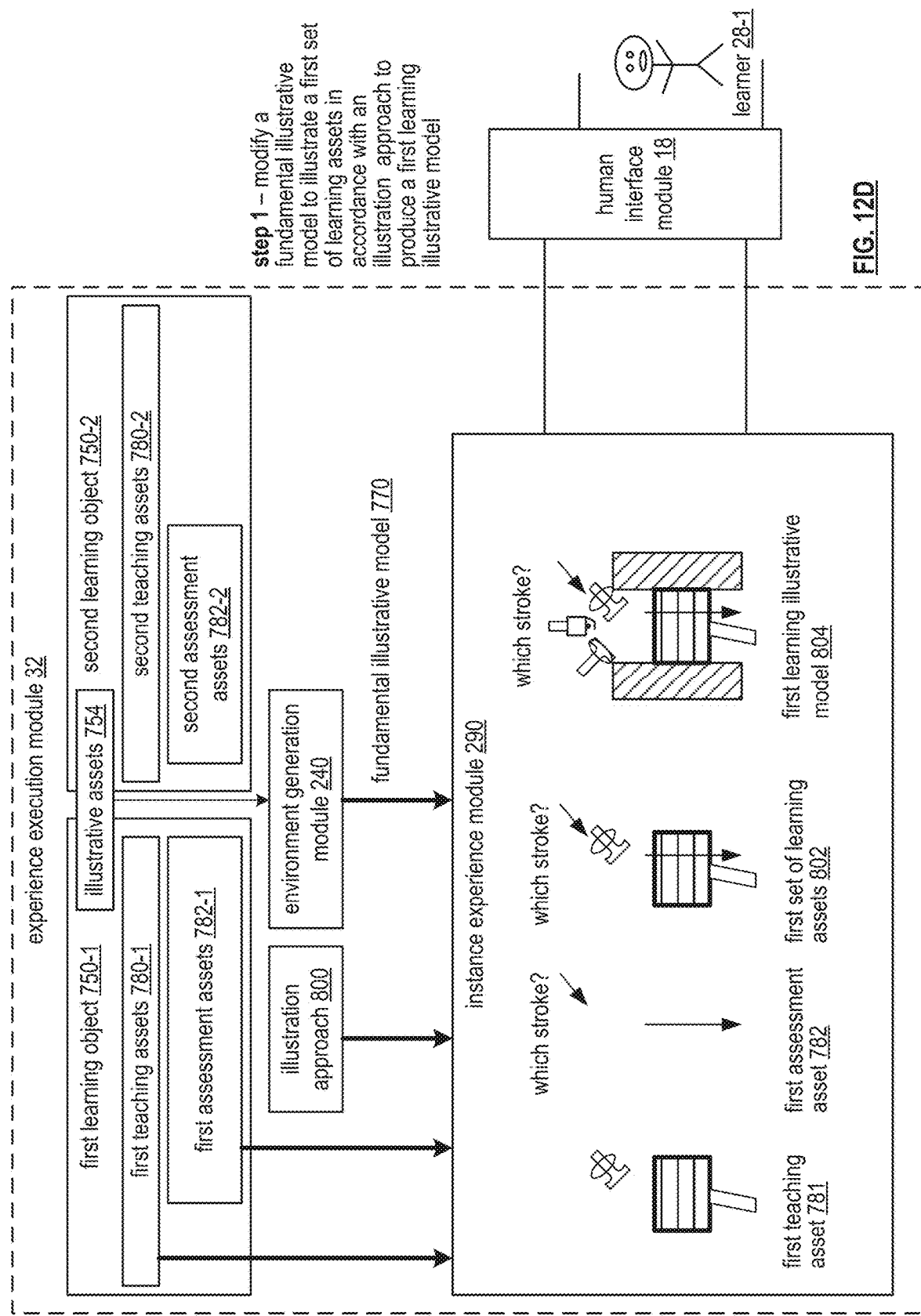

FIG. 12D illustrates steps of an example of operation of the improving the learning comprehension of the lesson where, in a first step the instance experience module 290 modifies a fundamental illustrative model 770 to illustrate a first set of learning assets 802 of a first learning object 750-1 in accordance with an illustration approach 800 to produce a first learning illustrative model 804. The lesson includes a plurality of learning objects (e.g., first learning object 750-1 and a second learning object 750-2) which includes the first learning object 750-1. The environment generation module 240 generates the fundamental illustrative model 770 based on illustrative assets 754 of the lesson (e.g., representations of a cylinder wall, a piston, valves, etc.) as previously discussed.

The modifying of the fundamental illustrative model 770 to illustrate the first set of learning assets 802 of the first learning object 750-1 in accordance with the illustration approach 800 to produce the first learning illustrative model 804 includes a variety of one or more sub-steps. A first sub-step includes identifying a first teaching asset 781 of the first learning object 750-1 as part of the first set of learning assets 802. For example, the instance experience module 290 selects a representation of an intake valve and a piston associated with first teaching asset 780-1.

A second sub-step includes identifying a first assessment asset 782 of the first learning object 750-1 as part of the first set of learning assets 802. For example, the instance experience module 290 accesses first assessment assets 782-1 selects a representation of arrows describing action vectors of an intake stroke along with a question "which stroke"?

A third sub-step of producing the first learning illustrative model 804 includes generating a multi-dimensional representation of the first set of learning assets 802. For example, the instance experience module 290 generates a three-dimensional rendering of a combination of the representations of the intake valve, the piston, the arrows, and the text of the question to produce the first set of learning assets 802.

A fourth sub-step of producing the first learning illustrative model 804 includes integrating the multi-dimensional representation of the first set of learning assets and the fundamental illustrative model 770 in accordance with the illustration approach to produce the first learning illustrative model 804. For example, the instance experience module 290 combines the first set of learning assets 802 and the fundamental illustrative model 770 (e.g., remaining assets of the example including the cylinder walls, the exhaust valve, and the spark plug) and generates a three-dimensional rendering utilizing the illustration approach 800 to produce the first learning illustrative model 804. For instance, the instance experience module 290 generates a side view cutout representation of a three-dimensional rendering of the piston and associated parts to illustrate the intake stroke and pose the question.

The illustration approach 800 provides guidance with respect to generating the multidimensional representations of assets associated with the lesson. The guidance includes a viewpoint of one or more learners (e.g., perspective such as top view, side view, angle view, etc.), a scale of a view, the scope of the view, a speed of delivery of the lesson (e.g., too fast may be too challenging for the learner and negatively impact comprehension), a number of views (e.g., clicking through a cutout view followed by a top view followed by a bottom view etc.), and applying highlighting to the view (e.g., shading, colors, flashing, etc. to highlight an element).

The illustration approach 800 can impact the representation of the lesson to the learner and hence a comprehension outcome. The illustration approach 800 starts with a default value and is updated over time based on learner comprehension outcomes. For example, a particular viewpoint that is correlated with higher levels of comprehension by initial learners is utilized for subsequent lesson delivery sessions for subsequent learners. As another example, a particular speed of delivery that is correlated with lower levels of comprehension by the initial learners is adjusted to a slower pace for the subsequent lesson delivery sessions for the subsequent learners.

Figure 12E:
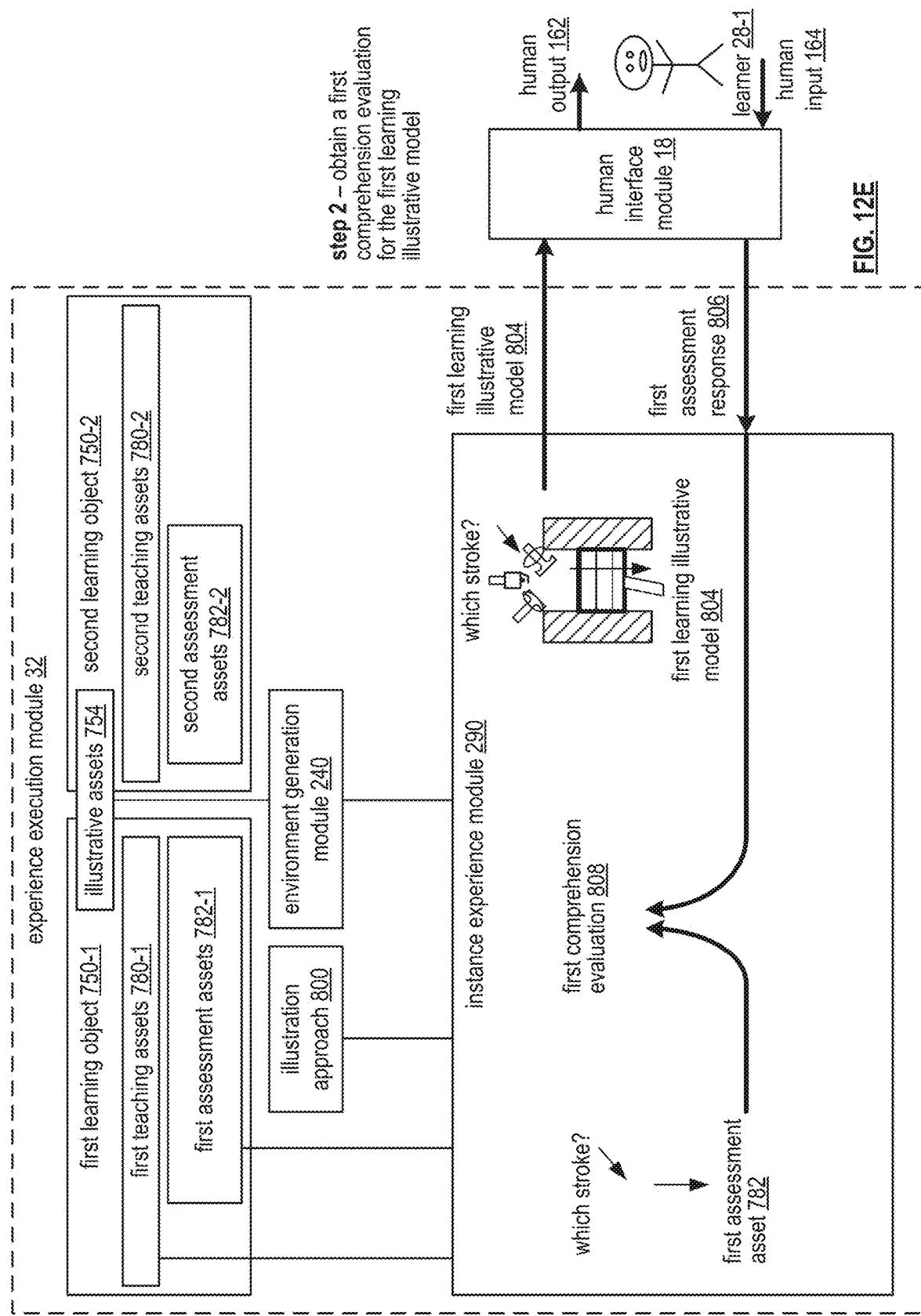

FIG. 12E further illustrates steps of the example of operation of the improving the learning comprehension of the lesson where, having produced the first learning illustrative model 804, in a second step the instance experience module 290 obtains a first comprehension evaluation 808 for the first learning illustrative model 804. The first learning illustrative model 804 includes the first assessment asset 782 (e.g., which stroke?) of the first learning object 750-1.

The obtaining of the first comprehension evaluation 808 for the first learning illustrative model 804 includes a series of sub-steps. A first sub-step includes outputting the first learning illustrative model 804 to a second computing entity (e.g., the human interface module 18). For example, the instance experience module 290 outputs, via the human interface module 18, the first learning illustrative model 804 as human output 162 to the learner 28-1. For instance, the learner 28-1 is able to visualize a side view of the piston travel in the cylinder and the air fuel mixture entering the cylinder through the open intake valve along with the question, which stroke?

A second sub-step includes the instance experience module 290 obtaining a first assessment response 806 for the first learning illustrative model 804. The obtaining includes recovering a historical record for a first assessment response 806 associated with a previous lessons session (e.g., and another learner). The obtaining further includes receiving the first assessment response 806 from the human interface module 18, where the human interface module 18 interprets human input 164 from the learner 28-1 (e.g., answer to the question of which stroke) in response to visualizing the side view of the piston travel in cylinder etc.

A third sub-step includes generating the first comprehension evaluation 808 based on the first assessment response 806 and the first assessment asset 782. For example, the instance experience module 290 produces the first comprehension evaluation 808 to indicate that the learner 28-1 answered the question incorrectly when visualizing the first learning illustrative model 804 based on the (current) illustration approach 800.

FIG. 12F further illustrates steps of the example of operation of the improving the learning comprehension of the lesson where, having produced the first comprehension evaluation, in a third step the instance experience module 290 modifies the illustration approach 800 based on the first comprehension evaluation 808 for the first learning illustrative model to produce an updated illustration approach 810.

The first comprehension evaluation 808 indicates that a portion of the lesson is too easy when comprehension is greater than an expected high comprehension threshold level. For example, when the learner 28-1 answers too many questions correctly as compared to an expected level of correctness. Alternatively, the first comprehension evaluation 808 indicates that the portion of the lesson is too difficult when the comprehension is less than an expected low comprehension threshold level. For example, when the learner 28-1 answers too few questions correctly as compared to the expected level of correctness.

When the first comprehension evaluation indicates that the portion of the lesson is too easy, the modifying of the illustration approach 800 includes updating the illustration approach 800 producing the updated illustration approach 810 to include one or more of a more challenging viewpoint perspective, a larger scale of a view, a larger scope of the view, a faster speed of delivery, a higher number of views, and more highlighting of the view. For instance, the instance experience module 290 updates the illustration approach 800 to provide a 15% increase in the speed of delivery to produce the updated illustration approach 810 when the first comprehension evaluation 808 indicates that the learner 28-1 achieved a comprehension level above the expected high comprehension threshold level for the first learning illustrative model 804.

When the first comprehension evaluation indicates that the portion of the lesson is too difficult, the modifying of the illustration approach 800 includes updating the illustration approach 800 producing the updated illustration approach 810 to include one or more of a less challenging viewpoint perspective, a smaller scale of the view, a smaller scope of the view, a slower speed of the delivery, a lower number of the views, and less highlighting of the view. For instance, the instance experience module 290 updates the illustration approach 800 to provide a 30° clockwise rotation of the view and a 10% zoom in to produce the updated illustration approach 810 when the first comprehension evaluation 808 indicates that the learner 28-1 did not fully understand the first learning illustrative model 804.

FIG. 12G further illustrates steps of the example of operation of the improving the learning comprehension of the lesson where, having produced the updated illustration approach, in a fourth step the instance experience module 290 modifies the fundamental illustrative model 770 to illustrate a second set of learning assets 816 of the second learning object 750-2 in accordance with the updated illustration approach 810 to produce a second learning illustrative model 818. The modifying the fundamental illustrative model 770 to illustrate the second set of learning assets 816 in accordance with the updated illustration approach 810 to produce the second learning illustrative model 818 includes one or more of a variety of sub-steps.

A first sub-step includes identifying a second teaching asset 812 of the second learning object 750-2 as part of the second set of learning assets 816. For example, the instance experience module 290 accesses second teaching assets 780-2 to select the piston and the exhaust valve as the second teaching asset 812 to teach and/or assess with regards to the exhaust stroke.

A second sub-step includes identifying a second assessment asset 814 of the second learning object 750-2 as part of the second set of learning assets 816. For example, the instance experience module 290 accesses second assessment asset 782-2 to select an action vector directional arrow for the piston closing in on the exhaust valve, another action vector directional arrow indicating the direction of exhaust flowing out through the exhaust valve, and an assessment question of "which stroke?"

A third sub-step of producing the second learning illustrative model 818 includes generating a multi-dimensional representation of the second set of learning assets 816. For example, the instance experience module 290 generates a three-dimensional rendering of a combination of the representations of the exhaust valve, the piston, the arrows, and the text of the question to produce the second set of learning assets 816.

A fourth sub-step of producing the second learning illustrative model 818 includes integrating the multi-dimensional representation of the second set of learning assets 816 and the fundamental illustrative model 770 in accordance with the updated illustration approach 810 to produce the second learning illustrative model 818. For example, the instance experience module 290 combines the second set of learning assets 816 and the fundamental illustrative model 770 (e.g., remaining assets of the example including the cylinder walls, the exhaust valve, and the spark plug) and generates a three-dimensional rendering utilizing the updated illustration approach 810 (e.g., with the 10% zoom and 30 degree clockwise rotation) to produce the second learning illustrative model 818. For instance, the instance experience module 290 generates a new side view cutout representation of the three-dimensional rendering of the piston and associated parts to illustrate the exhaust stroke with better intended comprehension and pose the question.

Alternatively, or in addition to, the instance experience module 290 performs a variety of further steps of the method. For example, the instance experience module 290 outputs the second learning illustrative model 18 to a second computing entity. For instance, via the human interface module 18 to the learner 28-1. The instance experience module 290 obtains a second comprehension evaluation for the second learning illustrative model and modifies the updated illustration approach 810 based on the second comprehension evaluation for the second learning illustrative model to produce a further updated illustration approach. For instance, the instance experience module 290 determines that further comprehension improvements are required when the learner 28-1 scores lower than expected on the further comprehension.

Having modified the illustration approach 800 to produce the further updated illustration approach, the instance experience module modifies the second learning illustrative model in accordance with the further updated illustration approach to produce an updated second learning illustrative model. For instance, the instance experience module 290 provides a viewpoint that is further rotated and where the speed of delivery is slowed down to support improved comprehension. The instance experience module 290 outputs the updated second learning illustrative model to the second computing entity. For instance, via the human interface module 18 to the learner 28-1.

The method described above in conjunction with the experience execution module 32 can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 13A-B are schematic block diagrams of another embodiment of an experience execution module 32 of a computing system illustrating an example of sharing an assessment of a learning experience. The experience execution module 32 includes the environment generation module 240, the instance experience module 290, the learning assessment module 330, and a scoring module 410.

FIG. 13A illustrates an example of operation where the learning assessment module 330 generates learning assessment results information 334 based on learner interaction information 332 for present and previous learning experiences storing the learning assessment results information 334 in the learning assets database 34. The instance experience module 290 generates the learner interaction information 332 based on assessment interactions of learner input information 174.

The instance experience module 290 outputs a representation of assessment information 252 of a lesson package 206 to a learner as learner output information 172. The instance experience module 290 further generates the representation of the assessment information 252 based on baseline environment and object information 292 generated by the environment generation module 240 based on the lesson package 206.

The scoring module 410 interprets the learning assessment results information 334 to produce scoring information 412 for storage in the learning assets database 34. For example, the scoring module 410 accesses the learning assessment results information 334 for the learner and scores portions of learning experiences, i.e., comparing correct answers of a learning objective to answers provided by the learner to produce a raw scoring element and summarizing a set of raw scoring elements to produce a score.

The scoring module 410 updates learning assessment results information stored in the learning assets database 34 by modifying scoring information 412 associated with the learner based on the scoring information from the current session. For example, the scoring module 410 recovers scoring information associated with the learner from the learning assets database (e.g., previous sessions) and identifies a portion of the recovered scoring information 412 to be updated based on the scoring information associated with the present learning experience. For instance, the scoring module 410 adds a score to a running transcript for the learner indicating completion of another learning objective towards an advanced degree.

The scoring information 412 includes one or more of a learner identifier, a learning objective identifier, and a lesson identifier for each scored learning objective. The scoring information further includes a number of right and wrong answers for each learning objective and an overall learning objective evaluation score. The scoring information further includes a list of learning objectives successfully passed and failed. The scoring information further includes identifiers of accreditation sought (e.g., a degree in progress, a certificate in progress, a license in progress, etc.) and requirements for the accreditation sought.

FIG. 13B further illustrates the example of operation where the scoring module 410 facilitates sharing of the scoring information 412 of the learning assets database 34 with other computing entities utilizing a blockchain approach to securely acquire and update a transcript information blockchain 414. The transcript information blockchain 414 includes a blockchain that wraps scoring information and self authenticates validity of the scoring information between computing entities. The structure of the transcript information blockchain is discussed in greater detail with reference to FIG. 13D.

In an example of operation the scoring module 410 obtains a previous blockchain associated with the scoring information to be shared and updates content associated with the previous blockchain. The scoring module 410 further generates a subsequent blockchain around the updated content utilizing the previous blockchain and shares the subsequent blockchain with the other computing entity in accordance with a blockchain procedure utilized between authorize computing entities. The procedure is discussed in greater detail with regards to FIGS. 13C-13D.

The scoring module 410 interprets the transcript information blockchain 414 to determine earned credentials. For example, the scoring module 410 obtains the transcript information blockchain 414, i.e., retrieve from memory, received from another computing entity, and authenticates the transcript information blockchain utilizing the blockchain approach. When authenticated, the scoring module 410 extracts scoring information from a content portion of the blockchain and interprets the scoring information with regards to accreditation requirements.

FIG. 13C is a schematic block diagram of another embodiment of the computing system 10 illustrating an example of sharing an assessment of a learning experience. The computing system includes a plurality of computing entities 20-1 through 20-N. in an example of operation, the computing entity 20-1 outputs the transcript information blockchain 414 to the computing entity 20-2. The computing entity 20-2 authenticates the transcript information blockchain 414. When authenticated, the computing entity 20-2 extracts scoring information from the authenticated transcript information blockchain 414. The computing entity 20-2 interprets and/or updates the extracted scoring information.

The process continually repeats where the computing entity 20-2 generates an updated transcript information blockchain 414 to output to another computing entity etc. As a result, any number of computing entities may provide learning experiences that in aggregate, as component learning objectives are successfully accomplished, enables a learner to complete an accreditation.

FIG. 13D is a schematic block diagram of an embodiment of a transcript information blockchain of a computing system illustrating an example of sharing an assessment of a learning experience. The example transcript information blockchain 414 includes a plurality of blocks 2-4. Each block includes a header section and a transaction section. The header section includes one or more of a nonce, a hash of a preceding block of the blockchain, where the preceding block was under control of a preceding device (e.g., a computing entity, a computing device, etc.) in a chain of control of the blockchain, and a hash of a current block (e.g., a current transaction section). The current block is under control of a current device in the chain of control of the blockchain.

The transaction section includes one or more of a public key of the current device, a signature of the preceding device, authentic transcript request information regarding a transcript request and change of control from the preceding device to the current device, and content information (e.g., scoring information) from the previous block as received by the previous device plus content added by the previous device when transferring the current block to the current device.

The example further includes devices 2-3 to facilitate illustration of generation of the blockchain. Each device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 authentic transcript request to device 2 information, and the previous content plus content from device 2. The device 3 authentic transcript request to device 2 information includes one or more of a transcript request, a query request, background content, and routing instructions from device 3 to device 2 for access to the content. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining computing entity, of a computing device, generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted). For instance, the device considers the transcript records intact, valid, and usable to facilitate determination of status of an accreditation.

FIG. 13E is a logic diagram of an embodiment of a method for sharing an assessment of a learning experience within a computing system (e.g., the computing system 10 of FIG. 1). In particular, a method is presented in conjunction with one or more functions and features described in conjunction with FIGS. 1-7B, and also FIGS. 13A-13D. The method includes step 430 where a processing module of one or more processing modules of one or more computing devices within the computing system generates learning assessment results information based on learner action for learning experiences. For example, the processing module stores learning assessment results information in a learning assets database, where learner interaction information is generated based on assessment interactions of learner input information. The processing module outputs a representation of assessment information of a lesson package to a learner as learner output information. The processing module generates the representation of the assessment information based on a baseline environment and objects and assessment information.

The method continues at step 432 where the processing module interprets the learning assessment results information to produce scoring information. For example, the processing module accesses the learning assets results information for the learner and scores portions of the learning experiences, i.e., comparing correct answers of a learning objective two answers provided by the learner to produce a raw-scoring element.

The method continues at step 434 where the processing module updates learning asset information by modifying recovered scoring information with the scoring information. For example, the processing module recovers scoring information associated with the learner from the learning assets database and identifies a portion of the recovered scoring information to be updated based on the scoring information associated with the present learning experience. For instance, the processing module adds a set of learning objective scores to a running transcript for the learner indicating completion of another set of learning objectives towards an accreditation.

The method continues at step 436 where the processing module facilitates sharing of the scoring information utilizing a blockchain approach by acquiring and updating a transcript information blockchain. For example, the processing module obtains a previous blockchain associated with the scoring information to be shared and updates a content portion associated with the previous blockchain. The processing module generates a subsequent blockchain around the updated content utilizing the previous blockchain in chairs the subsequent blockchain with another computing entity in accordance with a blockchain procedure that ensures authenticity.

The method continues at step 438 where the processing module interprets the transcript information blockchain to determine and authenticated earn credential. For example, the processing module obtains the transcript information blockchain and authenticates the transcript information blockchain utilizing the blockchain approach. When authenticated, the processing module extracts going information from the content portion of the blockchain and interprets the scoring information with regards to the earned credential to determine a status associated with accreditation.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIG. 14A is a schematic block diagram of another embodiment of an experience creation module 30 of a computing system illustrating an example of creating a lesson. The experience creation module 30 includes the learning assessment module 330 and a lesson generation module 450. In an example of operation, the learning assessment module 330 obtains learning objectives to be associated with an enhanced lesson package. For example, the learning assessment module 330 extracts the learning objectives from a lesson package 206 from the learning assets database 34.

The learning assessment module 330 recovers historical learning assessment results information 370 associated with the learning objectives. For example, the learning assessment module 330 identifies the learning objectives, accesses the learning assets database 34 utilizing identities of the learning objectives to retrieve the associated historical learning assessment results information 370.

The learning assessment module 330 identifies a set of optimizations based on previous utilization only some of the learning objectives based on the recovered historical learning assessment results information 370. For example, the learning assessment module 330 tests for various potential optimizations such as ordering, baseline speed, instructor selection, learner categorization, etc. and aggregates hypothesis potential optimizations to form lesson effectiveness information 452.

When the set of optimizations has an expected effectiveness level less than a minimum desired effectiveness level, the lesson generation module 450 facilitates performing one or more learning experiments to identify favorable optimizations. For example, the lesson generation module 450 modifies ordering of learning objectives for a lesson to be subsequently delivered and assessed and gathers assessments for the subsequent delivered lesson to identify a favorable set of optimizations. The lesson effectiveness information 452 includes, for each set of learning objectives that form one or more lessons, performance metrics including time, a comprehension level, a learner rating, and instructor rating, and any other metric associated with performance The lesson generation module 450 generates an enhanced lesson package 454 utilizing the obtained learning objectives in accordance with the set of optimizations. For example, the lesson generation module 450 builds the enhanced lesson package 454 in accordance with parameters of the set of optimizations. For example, in a particular order with a particular speed and utilizing a particular instructor when a choice of instructors is available. The enhanced lesson package includes a set of learning objectives and/or lessons, a particular ordering of the learning objectives, where the ordering is optimize based on previous results (e.g., for comprehension, for time of execution of learning). The enhanced lesson package 454 may represent updating of previously stored lesson package 206 as well as generation of an entirely new lesson package.

FIG. 14B is a schematic block diagram of another embodiment of a representation of a learning experience where a set of four learning objectives are executed amongst a set of learners, where assessment information includes speed of execution and comprehension level obtained by the set of learners. The learning objectives are executed in accordance with experimentation to identify optimizations.

In the example, the second experience re-ordered learning objective 3 is ahead of learning objective 2 as compared to experience 1. A comparison of assessment information indicates that the speed of execution and comprehension level of the learning objective 2 is more favorable when sequenced after the learning objective 3.

When the optimization has been identified, a new lesson is generated where the learning objective 2 is ordered after the execution of the learning objective 3. With the reordering, a comprehension and speed of execution optimization is expected.

FIG. 14C is a logic diagram of an embodiment of a method for creating a lesson within a computing system (e.g., the computing system 10 of FIG. 1). In particular, a method is presented in conjunction with one or more functions and features described in conjunction with FIGS. 1-7B, and also FIGS. 14A-14B. The method includes step 470 where a processing module of one or more processing modules of one or more computing devices within the computing system obtains learning objectives to be associated with an enhanced lesson package. The obtaining includes at least one of receiving, extracting from a lesson package retrieved from a learning assets database, and generating based on new learnings.

The method continues at step 472 where the processing module recovers historical learning assessment results information associated with the learning objectives. For example, the processing module identifies the learning objectives and accesses the learning assets database utilizing the identities of the learning objectives to retrieve the associated historical learning assessment results information.

The method continues at step 474 where the processing module identifies a set of optimizations based on previous utilization of at least some of the learning objectives based on the recovered historical learning assessment results information. For example, the processing module tests for various potential optimizations and aggregates hypothesis potential optimizations to form the set of optimizations.

When the set of optimizations has an unfavorable expected effectiveness level, the method continues at step 476 where the processing module facilitates performing one or more learning experiments to identify favorable optimizations for the set of optimizations. For example, the processing module modifies ordering of learning objectives for a lesson to be subsequently delivered and assessed. The processing module further gathers assessments for the subsequent delivered lesson and identifies a favorable set of optimizations.

The method continues at step 478 where the processing module generates the enhanced lesson package utilizing the obtained learning objectives in accordance with the set of optimizations. For example, the processing module builds the enhanced lesson package in accordance with parameters of the set of optimizations. For example, the processing module selects a particular order with a particular speed and with a particular selection of an instructor associated with favorable results.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 15A-15B are schematic block diagrams of another embodiment of an experience creation module 30 of a computing system illustrating an example of creating a lesson. The experience creation module 30 includes the concept generation module 490, the asset module 182, the instruction module 184, a learning objective generation module 492, and the lesson generation module 450.

FIG. 15A illustrates an example of operation where the concept generation module 490 determines whether learning objective concept information 500 is in compliance with learning objective concept guidance. The learning objective concept information includes a concept description that includes an actor, and action, i.e. performed by the actor, and a victim, i.e., receiving the action. For example, the fuel enters the cylinder when the intake valve opens. The determining includes indicating compliance when the learning objective concept information includes a concept description involving the actor, the action, and the victim of the action.

When the learning objective concept information is not in compliance, the concept generation module 490 facilitates a resolution. The facilitating includes one or more of requesting updated learning objective concept information, modifying the learning objective concept information to bring into compliance, and recovering a similar complaint concept description from learning path information 194 retrieved from the learning assets database 34.

When the learning objective concept information is in compliance, the concept generation module 490 outputs concept information 502 that includes the concept description. For example, the concept generation module 490 generates and outputs the concept information 502 to include the complaint concept description.

FIG. 15B further illustrates the example of operation where the learning objective generation module 492 generates learning objective information 504 to include a learning objective utilizing the concept information, lesson asset information 202 based on supporting asset information 198, and instruction information 204 based on instructor input information 166 in response to instructor output information 160. For example, the learning objective generation module 492 maps the concept description to learning objective tasks utilizing assets of the lesson asset information 202 as manipulated in accordance with the instruction information 204 to impart knowledge associated with the concept description of the concept information 502.

The lesson generation module 450 generates a lesson package 206 to include the learning objective information 504 for storage in the learning assets database 34. For example, the lesson generation module 450 portrays a multidimensional representation of the learning objective within an environment utilizing objects of the environment to produce the lesson package 206.

FIG. 15C is a logic diagram of another embodiment of a method for creating a lesson within a computing system (e.g., the computing system 10 of FIG. 1). In particular, a method is presented in conjunction with one or more functions and features described in conjunction with FIGS. 1-7B, and also FIGS. 15A-15B. The method includes step 520 where a processing module of one or more processing modules of one or more computing devices within the computing system determines whether learning objective concept information is in compliance with learning objective concept guidance. For example, the processing module indicates compliance when the learning objective concept information includes a concept description involving an actor, and action, and a victim of the action.

When the learning objective concept information is not in compliance, the method continues at step 522 where the processing module facilitates a resolution. For example, the processing module performs one or more of requesting updated learning objective concept information, modifying the learning objective concept information to bring to compliance, and recovering a similar and compliant concept description from a learning path retrieved from a learning assets database.

When resolved, the method continues at step 524 where the processing module issues concept information that includes a concept description. For example, the processing module generates and sends the concept information to include the complaint concept description.

The method continues at step 526 where the processing module generates learning objective information to include a learning objective utilizing the concept information, lesson asset information based on supporting asset information, and instruction information based on instructor input information in response to instructor output information. For example, the processing module maps the concept description to learning objective tasks utilizing assets of the lesson asset information as manipulated in accordance with the instruction information to impart knowledge associated with the concept description.

The method continues at step 528 where the processing module generates a lesson package to include the learning objective for storage in a learning asset database. For example, the processing module renders a multidimensional representation of the learning objective within an environment utilizing objects of the environment in accordance with the learning objective concept information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 16A-16B are schematic block diagrams of another embodiment of an experience creation module 30 of a computing system illustrating an example of creating a lesson. FIG. 16A illustrates an example of operation where the concept generation module 490 generates concept information 502 based on lesson concept information 540. The lesson concept information 540 includes input from an instructor on a lesson that includes a set of learning objectives, where each learning objective is associated with a concept description that includes a set of actors, actions, and victims. For example, the fuel enters the cylinder when the intake valve opens, the piston compresses the air/fuel mix, and the spark plug ignites the air/fuel mix.

The instruction module 184 accesses lesson package 206 from the learning assets database 34 based on the concept information 502 to identify candidate instruction information 204 that can potentially portray step-by-step instructions to coincide with a sequence of the lesson. For example, the processing module identifies the set of actors, actions, and victims from the concept information 502 and searches the learning assets database 34 to locate examples of other learning objectives that include similar items.

The instruction module 184 selects elements of the candidate instruction information that favorably portrays desired step-by-step instructions of the lesson to produce instruction information 204. For example, the instruction module 184 compares permutations of the candidate instruction information to the desired step-by-step instructions and outputs instruction information the compares favorably.

FIG. 16B further illustrates the example of operation where the learning objective generation module 492 generates learning objective information 504 to include a learning objective utilizing lesson asset information 202 based on supporting asset information 198, the instruction information 204, and in accordance with the step-by-step instructions of the concept information 502. For example, the learning objective generation module 492 generates an environment associated with instruction information 204, adds assets of the lesson asset information 202 to the environment, selects instruction object annotations of the instruction information 204 in accordance with the step by step instructions of the concept information 502 to produce the learning objective information 504.

The lesson generation module 450 generates a lesson package to include the set of learning objectives for storage in the learning assets database as an auto-generated lesson package 542. For example, the lesson generation module 450 portrays a multidimensional representation of the set of learning objectives within the environment utilizing objects of the environment and in accordance with the steps of the instruction information 204 to generate the auto-generated lesson package 542 for storage in the learning assets database 34.

FIG. 16C is a logic diagram of another embodiment of a method for creating a lesson within a computing system (e.g., the computing system 10 of FIG. 1). In particular, a method is presented in conjunction with one or more functions and features described in conjunction with FIGS. 1-7B, and also FIGS. 16A-16B. The method includes step 560 where a processing module of one or more processing modules of one or more computing devices within the computing system generates concept information based on lesson concept information. For example, the processing module identifies sets of actors, actions, and victims to identify a sequence of objects within an environment portrays series of concepts associated with the lesson.

The method continues at step 562 where the processing module identifies candidate instruction information based on the concept information. For example, the processing module identifies the set of actors, actions, and victims from the concept information, and searches a learning assets database to locate examples of other learning objectives that include similar items.

The method continues at step 564 where the processing module selects elements of the candidate instruction information that favorably portrays step-by-step instructions of the concept information to produce instruction information. For example, the processing module compares permutations of the candidate instruction information to the desired step-by-step instructions and outputs instruction information the compares favorably.

The method continues at step 566 where the processing module generates a set of learning objectives based on the instruction information intensive information. For example, the processing module generates an environment associated with instruction information and adds assets of the lesson assets to the environment. The processing module further selects instruction object annotations of the instruction information in accordance with step-by-step instructions of the concept information to produce the set of learning objectives of the lesson.

The method continues at step 568 where the processing module generates a lesson package to include the set of learning objectives in accordance with the concept information. For example, the processing module betrays a multi-dimensional representation of the set of learning objectives within the environment utilizing objects of the environment.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 17A-17B are schematic block diagrams of another embodiment of an experience execution module 32 of a computing system illustrating another example of executing a learning experience. The experience execution module 32 includes the environment generation module 240 a set of instance experience modules 290-1 through 290-N, and a common experience module 580.

FIG. 17A illustrates an example of operation where, for each learner of N learners experiencing an instruction portion of a common lesson, a corresponding instance experience module 290 establishes a representation of the lesson utilizing baseline environment and object information 292 in accordance with instruction information 204 to output corresponding learner output information 172 to a corresponding learner. The environment generation module 240 generates the baseline environment and object information 292 based on a lesson package 206 recovered from the learning assets database 34. The establishing of the representation includes generating the representation of the environment with the objects, i.e., including the representation of substantially all of the learners, in accordance with the instruction information 204 (e.g., a starting configuration), and outputting the representation to the corresponding learner where the common lesson has initiated playing.

For each learner, the corresponding instance experience module 290 selects a reference time frame of playing of the common lesson. For example, the set of learners is divided into two groups were a first group of learners is associated with a first time reference and speeds ahead experiencing the instruction of the lesson within the environment that includes a representation of just the first group of learners. A second group of learners is associated with a second time reference and runs the common lesson at a slower pace but visualizes the interaction of the first group within the environment in addition to the second group of learners.

The selecting of the time reference is based on one or more of an estimated learner capability level, i.e., advanced versus mainstream, a manual request, and prerequisite completed learning objectives by a particular. For example, a more capable learner is affiliated with the first group of learners that is associated with the first time a reference that speeds ahead.

When an instruction portion of the common lesson is playing, each instance experience module 290 outputs the unique representation of the lesson in accordance with a corresponding reference time frame as learner output information, i.e., same environment/objects as others within the common group but with a potentially different viewpoint. The instance experience module 290 interprets corresponding learner input information 174 in response to the learner output information 172 produce corresponding learner interaction information 332-1 through 332-N. The interpreting includes extracting session control information to adjust to viewpoint of the corresponding learner output information (e.g., view directions, zoom level, etc.), and outputting the corresponding session control information to the common experience module 580 to facilitate group control and experience processing.

FIG. 17B further illustrates the example of operation where, when the instruction portion of the common lesson is playing, the common experience module 580 interprets learner interaction information 332 from each learner to produce session control adaptation information 372-1 through 372-N to control and portray all instances of the common lesson (e.g., all stop at once, all start again at the same time, one group stops while the other continues, etc.) to facilitate a common experience. The interpreting includes selecting one or more common time frames that learners are synchronized with (e.g., everyone watches one common time reference of playing the session, the group is divided into four different speeds of playing the session), and identifying the representations of motions of each learner to include in the session control adaptation information.

The common experience module 580 further identifies session control information of each learner and aggregates the representations of the motions of the learners, i.e., all can see each other unless invisibility desired and determines the common session control adaptation information in accordance with a control approach, (e.g., anyone can start stop the session, anyone can speed up/slow down the playing, playing at a speed faster than a slowest request, etc.). The common experience module 580 further selects learners that may speed have the rest and their motions are portrayed in parallel with the instructor to facilitate improved instruction to learners running at a slower pace.

The common experience module 580 facilitates execution of an assessment portion of the common lesson, where the facilitation is in accordance with an assessment of approach of the assessment information 252. The assessment approaches includes private assessments, open group assessments where other learners experience testing of other learners, etc. The facilitating includes selecting the assessment approach, i.e., manual input, in accordance with a configuration aspect of the common lesson, based on historical results, etc. The facilitating further includes outputting of the assessment utilizing the assessment information 252, interpreting learner interaction information 332 to produce an assessment, and pretraining the learner interaction information as updated session control adaptation information 372 to update the representation of the assessment portion as modified learner output information 172-1 through 172-N.

FIG. 17C is a logic diagram of another embodiment of a method for executing a learning experience within a computing system (e.g., the computing system 10 of FIG. 1). In particular, a method is presented in conjunction with one or more functions and features described in conjunction with FIGS. 1-7B, and also FIGS. 17A-17B. The method includes step 600 where a processing module of one or more processing modules of one or more computing devices within the computing system establishes a set of representations of an instruction portion of a lesson for a set of learners. For example, the processing module generates a representation, for each learner, of an environment with objects (e.g., including the representation of at least some of the learners) in accordance with instruction information for a starting configuration. The processing module outputs the representations to the learner while initiating playing of the lesson.

For each learner, the method continues at step 602 where the processing module selects a reference time frame for playing the instruction portion. For example, the processing modules selects the reference time frame based on one or more of an estimated learner capability level, a manual request, and prerequisite completed learning objectives by the learner.

While executing the instruction portion, the method continues at step 604 where the processing module interprets learner input information in response to updated representations of the instruction portion to produce learner interaction information. For example, the processing module extracts session control information to adjust a viewpoint of the corresponding learner output information and generates corresponding session control information to facilitate group control and experience processing.

The method continues at step 606 where the processing module interprets the learner interaction information from each learner to produce session control adaptation information to further update the representations of the instruction portion. For example, the processing module, for each reference time frame, identifies representations of motions for each learner to include in the session control adaptation information, and identifies session control information of each learner. The processing module further aggregates the representations of the motions of the learners to update the representations of the instruction portion.

The method continues at step 608 where the processing module facilitates execution of an assessment portion of the lesson. For example, the processing module selects an assessment approach, facilitates output of the assessment utilizing assessment information, and interprets learner interaction information to produce an assessment. The processing module further portrays the learner interaction information as updated session control adaptation information to update the representations of the assessment portion as modified learner output information.

FIGS. 17D-17F are schematic block diagrams of another embodiment of a computing system illustrating an example of improving learning comprehension of a lesson within the computing system. The computing system includes the experience execution module 32 of FIG. 1 and human interface modules 18-1 and 18-2. In an embodiment, the human interface modules 18-1 and 18-2 may be implemented with the human interface module 18 of FIG. 1. The experience execution module 32 includes the environment generation module 240 of FIG. 10A and the instance experience module 290 of FIG. 10A.

FIG. 17D illustrates steps of an example of operation of a method for improving the learning comprehension of the lesson where, in a first step the instance experience module 290 issues a first learning illustrative model 832 to a set of learner computing entities (e.g., human interface modules 18-1 and 18-2). A fundamental illustrative model 770 is modified to illustrate a first set of learning assets 802 of a first learning object 750-1 in accordance with an illustration approach 830 to produce the first learning illustrative model 832. The lesson includes a plurality of learning objects which includes the first learning object 750-1 and a second learning object 750-2. The environment generation module 240 generates the fundamental illustrative model 770 based on illustrative assets 754 of the lesson (e.g., representations of a cylinder wall, a piston, valves, etc.) as previously discussed. The illustrative asset 754 are common to the plurality of learning objects.

The issuing of the first learning illustrative model 832 to the set of learner computing entities includes a variety of one or more sub-steps. A first sub-step includes the generating of the fundamental illustrative model 770 utilizing the illustrative assets 754 of the lesson. A second sub-step includes identifying a first teaching asset 781 of the first learning object 750-1 as part of the first set of learning assets 802. For example, the instance experience module 290 selects a representation of an intake valve and a piston associated with first teaching asset 780-1.

A third sub-step includes identifying a first assessment asset 782 of the first learning object 750-1 as part of the first set of learning assets 802. For example, the instance experience module 290 accesses first assessment assets 782-1 selects a representation of arrows describing action vectors of an intake stroke along with a question "which stroke"?

A fourth sub-step of the issuing of the first learning illustrative model 832 to the set of learner computing entities includes generating a multi-dimensional representation of the first set of learning assets 802. For example, the instance experience module 290 generates a three-dimensional rendering of a combination of the representations of the intake valve, the piston, the arrows, and the text of the question to produce the first set of learning assets 802.

A fifth sub-step of the issuing of the first learning illustrative model 832 to the set of learner computing entities includes integrating the multi-dimensional representation of the first set of learning assets and the fundamental illustrative model 770 in accordance with the illustration approach 830 to produce the first learning illustrative model 832. For example, the instance experience module 290 combines the first set of learning assets 802 and the fundamental illustrative model 770 (e.g., remaining assets of the example including the cylinder walls, the exhaust valve, and the spark plug) and generates a three-dimensional rendering utilizing the illustration approach 830 to produce the first learning illustrative model 832. For instance, the instance experience module 290 generates a side view cutout representation of a three-dimensional rendering of the piston and associated parts to illustrate the intake stroke and pose the question.

The illustration approach 830 provides guidance with respect to generating the multidimensional representations of assets associated with the lesson. The guidance includes a viewpoint of one or more learners associated with the set of learner computing entities (e.g., perspective such as top view, side view, angle view, etc.), a scale of a view, the scope of the view, a speed of delivery of the lesson (e.g., too fast may be too challenging for the learner and negatively impact comprehension), a number of views (e.g., clicking through a cutout view followed by a top view followed by a bottom view etc.), and applying highlighting to the view (e.g., shading, colors, flashing, etc. to highlight an element).

The illustration approach 830 can impact the representation of the lesson to a set of learners and hence impact comprehension outcome. The illustration approach 830 starts with a default value and is updated over time based on learner comprehension outcomes of the set of learners. For example, a particular viewpoint that is correlated with higher levels of comprehension by initial learners is utilized for subsequent lesson delivery sessions for subsequent learners.

As another example, a particular speed of delivery that is correlated with lower levels of comprehension by the initial learners is adjusted to a slower pace for the subsequent lesson delivery sessions for the subsequent learners.

Having produced the first learning illustrative model 832, the instance experience module 290 sends the first learning illustrative model 832 to the set of learner computing entities. For example, the instance experience module 290 outputs, via the human interface module 18-1, the first learning illustrative model 832 as human output 162-1 to the learner 28-1. For instance, the learner 28-1 is able to visualize a side view of the piston travel in the cylinder and the air fuel mixture entering the cylinder through the open intake valve along with the question, which stroke? As another example, the instance experience module 290 outputs, via the human interface module 18-2, the first learning illustrative model 832 as human output 162-2 to the learner 28-2. For instance, the learner 28-2 visualizes the same side view of the piston travel in the cylinder etc. Alternatively, a learner provides input to alter a perspective of the view for the learner where the first learning illustrative model 832 is slightly modified to provide an alternative perspective for the learner.

FIG. 17E further illustrates steps of the example of operation of the method for improving the learning comprehension of the lesson where, having issued the first learning illustrative model 832 to the set of learner computing entities, in a second step the instance experience module 290 obtains a first comprehension evaluation 838 associated with a first learner computing entity for the first learning illustrative model 832. The set of learner computing entities includes the first learner computing entity.

The obtaining the first comprehension evaluation 838 associated with the first learner computing entity for the first learning illustrative model 832 includes a series of sub-steps. A first sub-step includes outputting the first learning illustrative model 832 to the first learner computing entity. The first learning illustrative model 832 includes the first assessment asset 782 of the first learning object 750-1.

A second sub-step includes obtaining a first assessment response 834 associated with the first learner computing entity for the first learning illustrative model 832. For instance, the instance experience module 290 recovers a historical record for the first assessment response 834 associated with a previous lessons session (e.g., and another learner). In another instance, the instance experience module 290 receives the first assessment response 834 from the human interface module 18-1, where the human interface module 18-1 interprets human input 164-1 from the learner 28-1 (e.g., answer to the question of which stroke) in response to visualizing the side view of the piston travel in the cylinder etc.

A third sub-step includes generating the first comprehension evaluation 838 based on the first assessment response 834 and the first assessment asset 782. For example, the instance experience module 290 produces the first comprehension evaluation 838 to indicate that the learner 28-1 answered the question incorrectly when visualizing the first learning illustrative model 832 based on the (current) illustration approach 830.

Having obtained the first comprehension evaluation 838, in a third step of the example of operation of the method for improving the learning comprehension of the lesson, the instance experience module 290 obtains a second comprehension evaluation 840 associated with a second learner computing entity for the first learning illustrative model 832. The set of learner computing entities includes the second learner computing entity.

The obtaining the second comprehension evaluation 840 associated with the second learner computing entity for the first learning illustrative model 832 includes a series of sub-steps. A first sub-step includes outputting the first learning illustrative model 832 to the second learner computing entity. The first learning illustrative model 832 includes the first assessment asset 782 of the first learning object 750-1.

A second sub-step includes obtaining a second assessment response 836 associated with the second learner computing entity for the first learning illustrative model 832. For instance, the instance experience module 290 recovers another historical record for the second assessment response 836 associated with another previous lessons session (e.g., and yet another learner). In another instance, the instance experience module 290 receives the second assessment response 836 from the human interface module 18-2, where the human interface module 18-2 interprets human input 164-2 from the learner 28-2 (e.g., answer to the question of which stroke) in response to visualizing the side view of the piston travel in the cylinder etc.

A third sub-step includes generating the second comprehension evaluation 840 based on the second assessment response 836 and the first assessment asset 782. For example, the instance experience module 290 produces the second comprehension evaluation 840 to indicate that the learner 28-2 answered the question correctly when visualizing the first learning illustrative model 832 based on the (current) illustration approach 830.

FIG. 17F further illustrates steps of the example of operation of the method for improving the learning comprehension of the lesson where, having obtained the first and second comprehension evaluations for the first and second learner computing entities, in a fourth step the instance experience module 290 modifies the fundamental illustrative model 770 to illustrate a second set of learning assets 816 of the second learning object 750-2 based on at least one of the first and second comprehension evaluations 838-840 to produce a second learning illustrative model 844. The plurality of learning objects includes the second learning object 750-2.

The modifying of the fundamental illustrative model 770 to illustrate the second set of learning assets 816 of the second learning object 750-2 based on at least one of the first and second comprehension evaluations 838-840 to produce the second learning illustrative model 844 includes a variety of one or more sub-steps. When at least one of the first comprehension evaluation 838 and the second comprehension evaluation 840 indicates that a learner comprehension level is greater than a maximum comprehension threshold for a portion of the lesson (e.g., the learner answers too many questions correctly), a first sub-step includes the instance experience module 290 updating the illustration approach 830 to produce an updated illustration approach 842 to include one or more of a variety of aspects to make the lesson more challenging.

The variety of aspects to make the lesson more challenging includes a more challenging viewpoint perspective, a viewpoint perspective aligned with a selected learner computing entity of the set of learner computing entities, a larger scale of a view, a larger scope of the view, a faster speed of delivery, a higher number of views, and more highlighting of the view. For instance, the instance experience module 290 updates the illustration approach 830 to include the larger scope of the view to produce the updated illustration approach 842 when both learners 28-1 and 28-2 answer too many questions correctly.

When at least one of the first comprehension evaluation 838 and the second comprehension evaluation 840 indicates that the learner comprehension level is less than a minimum comprehension threshold for the portion of the lesson (e.g., the learners are answering too few questions correctly), the first sub-step includes the instance experience module 290 updating the illustration approach 830 to produce the updated illustration approach 842 to include one or more of a variety of aspects to make the lesson less challenging.

The variety of aspects to make the lesson less challenging includes a less challenging viewpoint perspective, another viewpoint perspective aligned with another selected learner computing entity of the set of learner computing entities, a smaller scale of the view, a smaller scope of the view, a slower speed of the delivery, a lower number of the views, and less highlighting of the view. For example, the instance experience module 290 updates the illustration approach 830 to include the other viewpoint perspective aligned with another selected learner computing entity (e.g., associated with favorable comprehension) of the set of learner computing entities to produce the updated illustration approach 842 when at least one of the learners 28-1 and 28-2 answer too many questions incorrectly. For instance, the instance experience module 290 updates the illustration approach 800 to provide a 25° clockwise rotation of the view and a 11% zoom in to produce the updated illustration approach 842 when the second comprehension evaluation 840 indicates that the learner 28-2 did not fully understand the first learning illustrative model 832.

A second sub-step of the modifying of the fundamental illustrative model 770 to illustrate the second set of learning assets 816 of the second learning object 750-2 includes identifying a second teaching asset 812 of the second learning object 750-2 as part of the second set of learning assets 816. For example, the instance experience module 290 accesses second teaching assets 780-2 to select the piston and the exhaust valve as the second teaching asset 812 to teach and/or assess with regards to the exhaust stroke.

A third sub-step includes identifying a second assessment asset 814 of the second learning object 750-2 as part of the second set of learning assets 816. For example, the instance experience module 290 accesses second assessment asset 782-2 to select an action vector directional arrow for the piston closing in on the exhaust valve, another action vector directional arrow indicating the direction of exhaust flowing out through the exhaust valve, and an assessment question of "which stroke?"

A fourth sub-step includes generating a multi-dimensional representation of the second set of learning assets 816. For example, the instance experience module 290 generates a three-dimensional rendering of a combination of the representations of the exhaust valve, the piston, the arrows, and the text of the question to produce the second set of learning assets 816.

A fifth sub-step of the modifying of the fundamental illustrative model 770 to illustrate the second set of learning assets 816 of the second learning object 750-2 includes integrating the multi-dimensional representation of the second set of learning assets 816 and the fundamental illustrative model 770 in accordance with the updated illustration approach 842 to produce the second learning illustrative model 844. For example, the instance experience module 290 combines the second set of learning assets 816 and the fundamental illustrative model 770 (e.g., remaining assets of the example including the cylinder walls, the exhaust valve, and the spark plug) and generates a three-dimensional rendering utilizing the updated illustration approach 842 (e.g., with the 11% zoom and 25 degree clockwise rotation) to produce the second learning illustrative model 844. For instance, the instance experience module 290 generates a new side view cutout representation of the three-dimensional rendering of the piston and associated parts to illustrate the exhaust stroke with better intended comprehension and pose the question.

Having produced the second learning illustrative model 844, in a fifth step of the method for improving the learning comprehension of the lesson, the instance experience module 290 sends the second learning illustrative model 844 to the set of learner computing entities. For example, the instance experience module 290 outputs, via the human interface module 18-1, the second learning illustrative model 844 as human output 162-1 to the learner 28-1. For instance, the learner 28-1 is able to visualize the new side view of the piston travel in the cylinder and the air fuel mixture entering the cylinder through the open intake valve along with the question, which stroke?

As another example of the sending of the second learning illustrative model 844, the instance experience module 290 outputs, via the human interface module 18-2, the second learning illustrative model 844 as human output 162-2 to the learner 28-2. For instance, the learner 28-2 visualizes the same new side view of the piston travel in the cylinder etc. Alternatively, a learner provides input to alter a perspective of the view for the learner where the second learning illustrative model 844 is further modified to provide another alternative perspective for the learner.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing system, the method comprises:
    detecting, by a computing entity of the computing system, an illustrative asset that is common to a first set of assets and a second sets of assets, wherein the first set of assets represents a first learning object that includes a first set of bullet-points for a first piece of information regarding a topic, wherein the second set of assets represents a second learning object that includes a second set of bullet-points for a second piece of information regarding the topic;
    rendering, by the computing entity, a three-dimensional (3-D) model of the illustrative asset and a three-dimensional (3-D) model of the first set of assets in accordance with an illustration approach and with regards to the first set of knowledge bullet-points to transform the first set of knowledge bullet-points into 3-D frames of a first descriptive asset using the illustration approach, wherein the first descriptive asset represents the first learning object;
    issuing, by the computing entity, the 3-D frames of the first descriptive asset to a set of other computing entities of the computing system;
    obtaining, by the computing entity, an evaluation of the first descriptive asset associated with the set of other computing entities;
    modifying, by the computing entity, the illustration approach based on the evaluation of the first descriptive asset to produce an updated illustration approach; and
    rendering, by the computing entity, the 3-D model of the illustrative asset and a 3-D model of the second set of assets in accordance with the updated illustration approach and with regards to the second set of knowledge bullet-points to transform the second set of knowledge bullet-points into 3-D frames of a second descriptive asset using the updated illustration approach, wherein the second descriptive asset represents the second learning object.

2. The method of claim 1 further comprises:
    sending, by the computing entity, the 3-D frames of the second descriptive asset to the set of other computing entities.

3. The method of claim 1, wherein the obtaining the evaluation of the first descriptive asset associated with the set of other computing entities comprises:
    rendering the 3-D model of the illustrative asset and the 3-D model of the first set of assets in accordance with the illustration approach and with regards to the first set of knowledge bullet-points to transform the first set of knowledge bullet-points into the 3-D frames of the first descriptive asset using the illustration approach, wherein the first set of assets includes a first assessment asset of the first learning object;
    obtaining a first assessment response associated with the set of other computing entities; and
    generating the evaluation based on the first assessment response and the first assessment asset.

4. The method of claim 1, wherein the modifying the illustration approach based on the evaluation of the first descriptive asset to produce the updated illustration approach comprises:
    when the evaluation indicates that a learner comprehension level is greater than a maximum comprehension threshold, updating the illustration approach to produce the updated illustration approach to include one or more of:
        a more challenging viewpoint perspective,
        a viewpoint perspective aligned with a selected other computing entity of the other computing entities,
        a larger scale of a view,
        a larger scope of the view,
        a faster speed of delivery,
        a higher number of views, and
        more highlighting of the view; and
    when the evaluation indicates that the learner comprehension level is less than a minimum comprehension threshold son, updating the illustration approach to produce the updated illustration approach to include one or more of:
        a less challenging viewpoint perspective,
        another viewpoint perspective aligned with another selected other computing entity of the other computing entities,
        a smaller scale of the view,
        a smaller scope of the view,
        a slower speed of the delivery,
        a lower number of the views, and
        less highlighting of the view.

5. A computing device of a computing system comprises:
    an interface;
    a local memory; and
    a processor operably coupled to the interface and the local memory, wherein the processor module functions to:
        detect an illustrative asset that is common to a first set of assets and a second sets of assets, wherein the first set of assets represents a first learning object that includes a first set of bullet-points for a first piece of information regarding a topic, wherein the second set of assets represents a second learning object that includes a second set of bullet-points for a second piece of information regarding the topic;
  render a three-dimensional (3-D) model of the illustrative asset and a three-dimensional (3-D) model of the first set of assets in accordance with an illustration approach and with regards to the first set of knowledge bullet-points to transform the first set of knowledge bullet-points into 3-D frames of a first descriptive asset using the illustration approach, wherein the first descriptive asset represents the first learning object;
  issue, via the interface, the 3-D frames of the first descriptive asset to a set of other computing entities of the computing system;
  obtain an evaluation of the first descriptive asset associated with the set of other computing entities;
  modify the illustration approach based on the evaluation of the first descriptive asset to produce an updated illustration approach; and
  render the 3-D model of the illustrative asset and a 3-D model of the second set of assets in accordance with the updated illustration approach and with regards to the second set of knowledge bullet-points to transform the second set of knowledge bullet-points into 3-D frames of a second descriptive asset using the updated illustration approach, wherein the second descriptive asset represents the second learning object.

6. The computing device of claim 5, wherein the processor further functions to:
  send, via the interface, the 3-D frames of the second descriptive asset to the set of other computing entities.

7. The computing device of claim 5, wherein the processor functions to obtain the evaluation of the first descriptive asset associated with the set of other computing entities by:
  rendering the 3-D model of the illustrative asset and the 3-D model of the first set of assets in accordance with the illustration approach and with regards to the first set of knowledge bullet-points to transform the first set of knowledge bullet-points into the 3-D frames of the first descriptive asset using the illustration approach, wherein the first set of assets includes a first assessment asset of the first learning object;
  obtaining a first assessment response associated with the set of other computing entities; and
  generating the evaluation based on the first assessment response and the first assessment asset.

8. The computing device of claim 5, wherein the processor functions to modify the illustration approach based on the evaluation of the first descriptive asset to produce the updated illustration approach by:
  when the evaluation indicates that a learner comprehension level is greater than a maximum comprehension threshold, updating the illustration approach to produce the updated illustration approach to include one or more of:
    a more challenging viewpoint perspective,
    a viewpoint perspective aligned with a selected other computing entity of the other computing entities,
    a larger scale of a view,
    a larger scope of the view,
    a faster speed of delivery,
    a higher number of views, and
    more highlighting of the view; and
  when the evaluation indicates that the learner comprehension level is less than a minimum comprehension threshold son, updating the illustration approach to produce the updated illustration approach to include one or more of:
    a less challenging viewpoint perspective,
    another viewpoint perspective aligned with another selected other computing entity of the other computing entities,
    a smaller scale of the view,
    a smaller scope of the view,
    a slower speed of the delivery,
    a lower number of the views, and
    less highlighting of the view.

9. A non-transitory computer readable memory comprises:
  a first memory element that stores operational instructions that, when executed by a processor, causes the processor to:
    detect an illustrative asset that is common to a first set of assets and a second sets of assets, wherein the first set of assets represents a first learning object that includes a first set of bullet-points for a first piece of information regarding a topic, wherein the second set of assets represents a second learning object that includes a second set of bullet-points for a second piece of information regarding the topic;
    render a three-dimensional (3-D) model of the illustrative asset and a three-dimensional (3-D) model of the first set of assets in accordance with an illustration approach and with regards to the first set of knowledge bullet-points to transform the first set of knowledge bullet-points into 3-D frames of a first descriptive asset using the illustration approach, wherein the first descriptive asset represents the first learning object; and
    issue the 3-D frames of the first descriptive asset to a set of computing entities;
  a second memory element that stores operational instructions that, when executed by the processor, causes the processor to:
    obtain an evaluation of the first descriptive asset associated with the set of computing entities;
  a third memory element that stores operational instructions that, when executed by the processor, causes the processor to:
  modify the illustration approach based on the evaluation of the first descriptive asset to produce an updated illustration approach; and
  a fourth memory element that stores operational instructions that, when executed by the processor module, causes the processor to:
    render the 3-D model of the illustrative asset and a 3-D model of the second set of assets in accordance with the updated illustration approach and with regards to the second set of knowledge bullet-points to transform the second set of knowledge bullet-points into 3-D frames of a second descriptive asset using the updated illustration approach, wherein the second descriptive asset represents the second learning object.

10. The computer readable memory of claim 9 further comprises:
  a fifth memory element stores operational instructions that, when executed by the processor, causes the processor to:
    send the 3-D frames of the second descriptive asset to the set of computing entities.

11. The computer readable memory of claim 9, wherein the processor functions to execute the operational instructions stored by the second memory element to cause the processor to obtain the evaluation of the first descriptive asset associated with the set of computing entities by:
- rendering the 3-D model of the illustrative asset and the 3-D model of the first set of assets in accordance with the illustration approach and with regards to the first set of knowledge bullet-points to transform the first set of knowledge bullet-points into the 3-D frames of the first descriptive asset using the illustration approach, wherein the first set of assets includes a first assessment asset of the first learning object;
- obtaining a first assessment response associated with the set of computing entities; and
- generating the evaluation based on the first assessment response and the first assessment asset.

12. The computer readable memory of claim 9, wherein the processor functions to execute the operational instructions stored by the third memory element to cause the processor to modify the illustration approach based on the evaluation of the first descriptive asset to produce the updated illustration approach by:
- when the evaluation indicates that a learner comprehension level is greater than a maximum comprehension threshold, updating the illustration approach to produce the updated illustration approach to include one or more of:
  - a more challenging viewpoint perspective,
  - a viewpoint perspective aligned with a selected other computing entity of the other computing entities,
  - a larger scale of a view,
  - a larger scope of the view,
  - a faster speed of delivery,
  - a higher number of views, and
  - more highlighting of the view; and
- when the evaluation indicates that the learner comprehension level is less than a minimum comprehension threshold son, updating the illustration approach to produce the updated illustration approach to include one or more of:
  - a less challenging viewpoint perspective,
  - another viewpoint perspective aligned with another selected other computing entity of the other computing entities,
  - a smaller scale of the view,
  - a smaller scope of the view,
  - a slower speed of the delivery,
  - a lower number of the views, and
  - less highlighting of the view.

* * * * *